(12) United States Patent
Takahashi et al.

(10) Patent No.: US 8,654,176 B2
(45) Date of Patent: Feb. 18, 2014

(54) OPERATING SYSTEM THAT INCLUDES AN IMAGE DATA RECEIVING DEVICE AND AN OPERATION DEVICE FOR PROCESSING IMAGE DATA SETS

(75) Inventors: Masafumi Takahashi, Sakura (JP); Tatsuo Sudo, Chiba (JP); Takuya Kinoshita, Chiba (JP); Katsuo Doi, Sakurai (JP); Mitsunori Nojima, Kashiba (JP); Kenji Mameda, Kashihara (JP); Takashi Nakajima, Tsu (JP); Aya Enatsu, Chiba (JP); Yohei Iwami, Tenri (JP); Toshihide Hagawa, Chiba (JP); Azusa Umemoto, Kizugawa (JP); Minehiro Konya, Daito (JP)

(73) Assignee: Sharp Kabushiki Kaisha, Osaka (JP)

( * ) Notice: Subject to any disclaimer, the term of this patent is extended or adjusted under 35 U.S.C. 154(b) by 1218 days.

(21) Appl. No.: 12/527,850

(22) PCT Filed: Jun. 12, 2008

(86) PCT No.: PCT/JP2008/060774
§ 371 (c)(1),
(2), (4) Date: Aug. 19, 2009

(87) PCT Pub. No.: WO2008/153098
PCT Pub. Date: Dec. 18, 2008

(65) Prior Publication Data
US 2010/0118115 A1    May 13, 2010

(30) Foreign Application Priority Data

Jun. 14, 2007 (JP) ................................ 2007-158020
Oct. 17, 2007 (JP) ................................ 2007-270697
Jan. 31, 2008 (JP) ................................ 2008-022042

(51) Int. Cl.
*H04N 7/18* (2006.01)
*H04N 5/232* (2006.01)
*H04N 5/76* (2006.01)
*H04M 1/02* (2006.01)
*H04H 40/27* (2008.01)

(52) U.S. Cl.
USPC ................ 348/14.04; 348/333.05; 348/231.2; 455/3.06; 455/556.1

(58) Field of Classification Search
USPC ........... 348/207.1, 207.2, 552, 734, 578, 553, 348/571, 14.02–14.04, 333.01, 333.05, 348/231.2, 231.3; 455/556.1, 556.2, 3.06; 340/12.54; 707/736, 781
See application file for complete search history.

(56) References Cited

U.S. PATENT DOCUMENTS

| 4,745,402 A | 5/1988 | Auerbach |
| 5,005,084 A * | 4/1991 | Skinner .................... 348/734 |

(Continued)

FOREIGN PATENT DOCUMENTS

| CN | 2524458 Y | 12/2002 |
| CN | 1748958 A | 3/2006 |

(Continued)

OTHER PUBLICATIONS

English version of ISR (PCT/JP2009/059813).

(Continued)

*Primary Examiner* — Victor Kostak
(74) *Attorney, Agent, or Firm* — Birch, Stewart, Kolasch & Birch, LLP

(57) ABSTRACT

A television (100) includes: an image data receiving section (105) for receiving, from the outside, image data storing therein process specifying information; and a controlling section (107) for controlling an image processing section (103) so as to carry out a process specified by the process specifying information stored in the received image data. Thus, it is possible to cause the television (100) to carry out the desired process by causing the television (100) to receive the image data including the process specifying information for specifying the process which should be carried out by the television (100).

14 Claims, 31 Drawing Sheets

(56) References Cited

U.S. PATENT DOCUMENTS

| | | | |
|---|---|---|---|
| 6,025,869 A * | 2/2000 | Stas et al. ............ | 725/28 |
| 6,048,301 A * | 4/2000 | Sabuda .................. | 600/9 |
| 6,446,192 B1 * | 9/2002 | Narasimhan et al. ....... | 712/29 |
| 6,636,953 B2 | 10/2003 | Yuasa et al. | |
| 7,099,490 B1 | 8/2006 | Fujita et al. | |
| 7,343,559 B1 | 3/2008 | Fujita et al. | |
| 7,599,960 B2 * | 10/2009 | Yamamoto et al. ............ | 1/1 |
| 7,991,271 B2 * | 8/2011 | Candelore ................ | 386/326 |
| 2002/0023266 A1 | 2/2002 | Kawana et al. | |
| 2003/0093806 A1 * | 5/2003 | Dureau et al. ............... | 725/107 |
| 2003/0142236 A1 * | 7/2003 | Aratani et al. ............... | 348/554 |
| 2003/0172383 A1 | 9/2003 | Takagi et al. | |
| 2003/0208778 A1 * | 11/2003 | Aratani et al. ............... | 725/139 |
| 2004/0041918 A1 * | 3/2004 | Chan et al. ................. | 348/222.1 |
| 2004/0080537 A1 | 4/2004 | Adler | |
| 2004/0104806 A1 | 6/2004 | Yui et al. | |
| 2004/0107352 A1 | 6/2004 | Yui et al. | |
| 2004/0133909 A1 | 7/2004 | Ma | |
| 2004/0145660 A1 * | 7/2004 | Kusaka ................... | 348/211.2 |
| 2004/0229656 A1 | 11/2004 | Takahashi et al. | |
| 2005/0044112 A1 * | 2/2005 | Yamamoto et al. ......... | 707/104.1 |
| 2005/0086692 A1 * | 4/2005 | Dudkiewicz et al. ......... | 725/46 |
| 2005/0097599 A1 | 5/2005 | Plotnick et al. | |
| 2005/0125829 A1 | 6/2005 | Ozaki | |
| 2005/0172131 A1 | 8/2005 | Nakayama et al. | |
| 2005/0246746 A1 | 11/2005 | Yui et al. | |
| 2005/0254072 A1 | 11/2005 | Hirai et al. | |
| 2005/0289117 A1 | 12/2005 | Hiraishi et al. | |
| 2006/0010269 A1 | 1/2006 | Leibbrandt | |
| 2006/0056678 A1 | 3/2006 | Tanaka et al. | |
| 2006/0078160 A1 | 4/2006 | Fujita et al. | |
| 2006/0218608 A1 | 9/2006 | Miura et al. | |
| 2006/0227364 A1 * | 10/2006 | Frank et al. ................. | 358/1.15 |
| 2007/0013676 A1 | 1/2007 | Obata | |
| 2008/0141128 A1 | 6/2008 | Takahashi et al. | |
| 2009/0153390 A1 | 6/2009 | Zackschewski et al. | |
| 2009/0279872 A1 * | 11/2009 | Umemoto et al. ............ | 386/124 |
| 2009/0298531 A1 | 12/2009 | Inohiza | |

FOREIGN PATENT DOCUMENTS

| | | |
|---|---|---|
| CN | 101035214 A | 9/2007 |
| EP | 0 838 939 A2 | 4/1998 |
| EP | 1 187 068 A2 | 3/2002 |
| EP | 1 791 327 A1 | 5/2007 |
| GB | 2 405 546 A | 3/2005 |
| JP | 5-38518 B2 | 6/1993 |
| JP | 7-30872 A | 1/1995 |
| JP | 8-98051 A | 4/1996 |
| JP | 9-204389 A | 8/1997 |
| JP | 11-348386 A | 12/1999 |
| JP | 2000-83191 A | 3/2000 |
| JP | 2000-261750 A | 9/2000 |
| JP | 2001-216189 A | 8/2001 |
| JP | 2001-245024 A | 9/2001 |
| JP | 2001-339648 A | 12/2001 |
| JP | 2002-10227 A | 1/2002 |
| JP | 2002-202924 A | 7/2002 |
| JP | 2002-229452 A | 8/2002 |
| JP | 2002-229912 A | 8/2002 |
| JP | 2002-230018 A | 8/2002 |
| JP | 2002-297487 A | 10/2002 |
| JP | 2002-328867 A | 11/2002 |
| JP | 2002-335479 A | 11/2002 |
| JP | 2003-61003 A | 2/2003 |
| JP | 2003-125337 A | 4/2003 |
| JP | 2003-131853 A | 5/2003 |
| JP | 2003-134451 A | 5/2003 |
| JP | 2003-224811 A | 8/2003 |
| JP | 2003-248697 A | 9/2003 |
| JP | 2004-80382 A | 3/2004 |
| JP | 2004-80538 A | 3/2004 |
| JP | 2004-509527 A | 3/2004 |
| JP | 3522635 B2 | 4/2004 |
| JP | 2004-220696 A | 8/2004 |
| JP | 2004-221974 A | 8/2004 |
| JP | 2004-260768 A | 9/2004 |
| JP | 2004-274260 A | 9/2004 |
| JP | 2004-289279 A | 10/2004 |
| JP | 2004-310744 A | 11/2004 |
| JP | 2004-320465 A | 11/2004 |
| JP | 2005-39737 A | 2/2005 |
| JP | 2005-78076 A | 3/2005 |
| JP | 2005-94570 A | 4/2005 |
| JP | 2005-167774 A | 6/2005 |
| JP | 2005-223390 A | 8/2005 |
| JP | 2005-303605 A | 10/2005 |
| JP | 2006-11626 A | 1/2006 |
| JP | 2006-135600 A | 5/2006 |
| JP | 2006-246319 A | 9/2006 |
| JP | 2006-250998 A | 9/2006 |
| JP | 2006-345450 A | 12/2006 |
| JP | 2007-074068 A | 3/2007 |
| JP | 2007-124414 A | 5/2007 |
| JP | 2007-129346 A | 5/2007 |
| JP | 3944118 B2 | 7/2007 |
| JP | 2007-194796 A | 8/2007 |
| JP | 2007-288426 A | 11/2007 |
| JP | 2007-310730 A | 11/2007 |
| JP | 2007-316939 A | 12/2007 |
| JP | 2008-171081 A | 7/2008 |
| WO | WO 2005/084023 A1 | 9/2005 |
| WO | WO 2007/029918 A | 3/2007 |
| WO | WO-2007/052591 A1 | 5/2007 |

OTHER PUBLICATIONS

Office Action mailed Mar. 7, 2012 for co-pending U.S. Appl. No. 12/092,407.

U.S. Advisory Action mailed Jun. 8, 2012 from co-pending U.S. Appl. No. 12/092,407.

Kiyoyoshi, Masahiro "Implementation and Evaluation of a Login System Triggered by Signature-Embedded Image" Shimane University, Interdisciplinary Graduate School of Science and Engineering, Department of Mathematics and Computer Science, Computer Science, Feb. 21, 2005.

ISO/IEC 14496-13/FDIS, "Information technology—Coding of audio-visual objects—Part 13: Intellectual Property Management and Protection (IPMP) extensions" May 21, 2004.

Search Report for corresponding European Patent Application No. 08765518.9 dated May 24, 2011.

* cited by examiner

200: TELEVISION(IMAGE DATA RECEIVING DEVICE)
500: OPERATION IMAGE DATA SET
200: MOBILE PHONE TERMINAL (OPERATION DEVICE)

500
EXIF AREA — 520
MAKER NOTE AREA — 521
THUMBNAIL IMAGE AREA — 522
IMAGE AREA — 510

FIG. 4

| AREA | SIZE | TITLE | REMARKS |
|---|---|---|---|
| 0 ~ 12 | 13 BYTES | "TV CONTROL" | IDENTIFICATION CODE INDICATIVE OF CONTROL INFORMATION |
| 13 ~ 14 | 2 BYTES | MAKER CODE | IDENTIFICATION CODE FOR IDENTIFYING DEVICE MAKER |
| 15 | 4 BITS | MODE | UPPER 4 BITS<br>0000: REMOTE CONTROL COMPATIBLE MODE<br>0001: DISPLAY CONTROL MODE<br>0010: URI MODE<br>0011: APPLICATION MODE |
| 15 | 4 BITS | SYSTEM CODE | LOWER 4 BITS<br>CODE FOR IDENTIFYING DEVICE |
| 16 | 1 BYTE | DEVICE CODE | CODE FOR IDENTIFYING DEVICE |
| 17 ~ 18 | 2 BYTES | COMMAND DATA | CODE INDICATIVE OF CONTROL |
| 19 ~ 20 | 2 BYTES | EXPANDED DATA SIZE | VALUE INDICATIVE OF A SIZE OF EXPANDED DATA |
| 21 ~ | 65535 BYTES OR SMALLER | EXPANDED DATA | ADDITIONAL DATA FOR CONTROL |

FIG. 5

| CODE (HEXADECIMAL NUMBER) | FUNCTION | PROCESS |
| --- | --- | --- |
| 0000 | RESET | RESET DISPLAY CONDITION OF IMAGE TO INITIAL VALUE(ENTIRE DISPLAY,ROTATION BY 0°,STANDARD COLOR, STANDARD LUMINANCE) |
| 0001 | SCALE DOWN | SCALE DOWN DISPLAYED IMAGE BY 10% |
| 0002 | SCALE UP | SCALE UP DISPLAYED IMAGE BY 10% |
| 001x | SPECIFY SCALE FACTOR (IN VIEW OF WIDTH) | IMAGE IS DISPLAYED IN VIEW OF IMAGE WIDTH. 100% IS CONDITION UNDER WHICH IMAGE IS DISPLAYED WITH SCREEN WIDTH USED FULLY. |
| 002x | SPECIFY SCALE FACTOR (IN VIEW OF WIDTH) | IMAGE IS DISPLAYED IN VIEW OF IMAGE HEIGHT. 100% IS CONDITION UNDER WHICH IMAGE IS DISPLAYED WITH IMAGE HEIGHT USED FULLY. |
| 003x | SPECIFY SCALE FACTOR (IN VIEW OF ENTIRE DISPLAY) | IMAGE IS DISPLAYED IN VIEW OF FULL-SCREEN DISPLAY. 100% IS CONDITION UNDER WHICH ENTIRE IMAGE IS DISPLAYED WITH IT JUST FITTED IN SCREEN. |
| 004x | SPECIFY SCALE FACTOR (IN VIEW OF FULL-SCREEN DISPLAY) | IMAGE IS DISPLAYED IN VIEW OF IMAGE FULL-SCREEN DISPLAY. 100% IS CONDITION UNDER WHICH IMAGE IS DISPLAYED SO THAT NO BLANK SPACE REMAINS. |
| 0050 | ROTATION BY 0° (ABSOLUTELY) | IMAGE IS DISPLAYED WITH ITS ANGLE KEPT |
| 0051 | ROTATION BY 90° (ABSOLUTELY) | IMAGE IS DISPLAYED WITH IT ROTATED TO LEFT BY 90° |
| 0052 | ROTATION BY 180° (ABSOLUTELY) | IMAGE IS DISPLAYED WITH IT ROTATED TO LEFT BY 180° |
| 0053 | ROTATION BY 270° (ABSOLUTELY) | IMAGE IS DISPLAYED WITH IT ROTATED TO LEFT BY 270° |
| 0054 | HORIZONTAL INVERSION (ABSOLUTELY) | IMAGE IS HORIZONTALLY INVERTED. IF ROTATION IS REQUIRED, IMAGE IS INVERTED AND THEN ROTATED SO AS TO BE DISPLAYED. |
| 0055 | VERTICAL INVERSION (ABSOLUTELY) | IMAGE IS VERTICALLY INVERTED. IF ROTATION IS REQUIRED, IMAGE IS INVERTED AND THEN ROTATED SO AS TO BE DISPLAYED. |
| 0059 | ROTATION BY 90° (RELATIVELY) | CURRENT DISPLAY STATE IS ROTATED TO LEFT BY 90° |
| 005A | ROTATION BY 180° (RELATIVELY) | CURRENT DISPLAY STATE IS ROTATED TO LEFT BY 180° |
| 005B | ROTATION BY 270° (RELATIVELY) | CURRENT DISPLAY STATE IS ROTATED TO LEFT BY 270° |
| 005C | HORIZONTAL INVERSION (RELATIVELY) | CURRENT DISPLAY STATE IS HORIZONTALLY INVERTED |
| 005D | VERTICAL INVERSION (RELATIVELY) | CURRENT DISPLAY STATE IS VERTICALLY INVERTED |
| 0060 | STANDARD COLOR | IMAGE IS DISPLAYED WITH STANDARD COLOR |
| 0061 | MONOCHROME | IMAGE IS DISPLAYED IN MONOCHROME |
| 0062 | SEPIA | IMAGE IS DISPLAYED IN SEPIA |
| 0064 | BRILLIANT | IMAGE IS DISPLAYED WITH ITS CHROMA INCREASED |
| 0065 | TINT | IMAGE IS DISPLAYED WITH ITS CHROMA DECREASED |
| 0066 | BRILLIANTLY | CHROMA OF IMAGE IS INCREASED |
| 0067 | TINTED | CHROMA OF IMAGE IS DECREASED |
| 0068 | STANDARD LUMINANCE | WITH STANDARD BRIGHTNESS |
| 0069 | BRIGHT | IMAGE IS DISPLAYED WITH IT MADE BRIGHT |
| 006A | DARK | IMAGE IS DISPLAYED WITH IT MADE DARK |
| 006B | BRIGHTLY | IMAGE IS DISPLAYED WITH IT MADE BRIGHTER |

FIG. 6

| VALUE OF x | SCALE FACTOR |
|---|---|
| 0 | 10% |
| 1 | 25% |
| 2 | 50% |
| 3 | 75% |
| 4 | 100% |
| 5 | 150% |
| 6 | 200% |
| 7 | 500% |
| 8 | 750% |
| 9 | 1000% |

FIG. 13
(a)
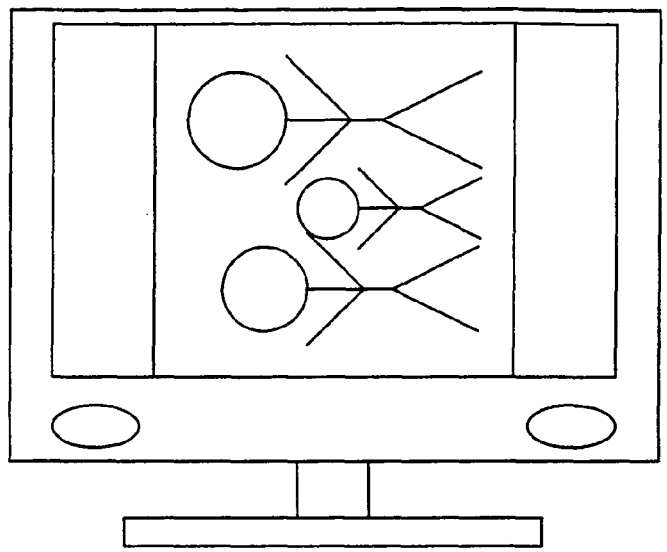
(b)
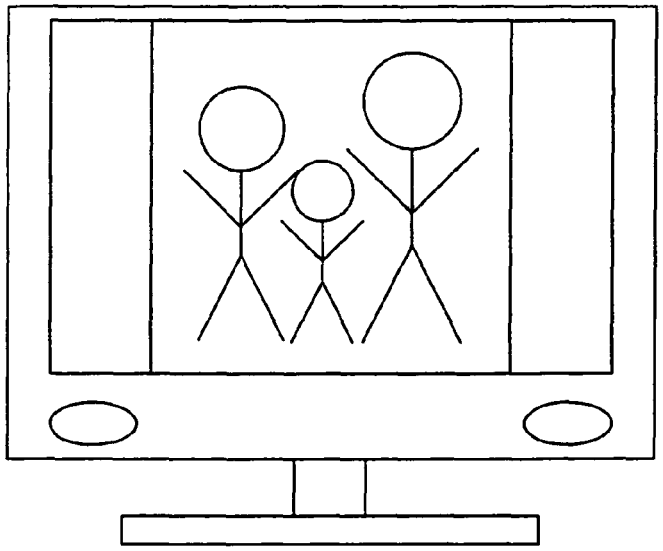

FIG. 18
(a)
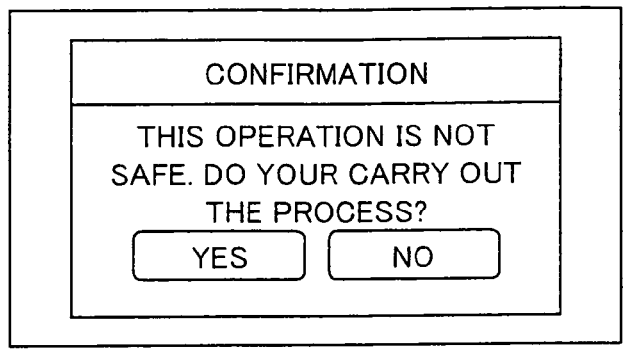
(b)
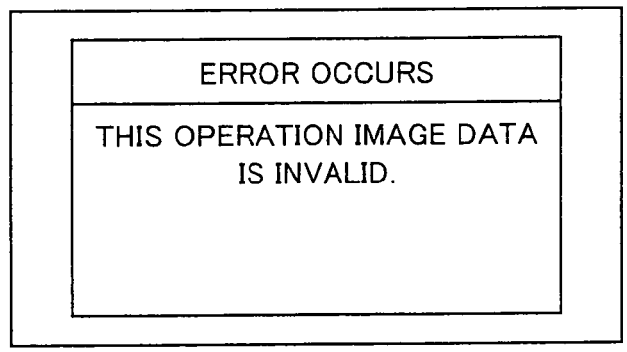
(c)
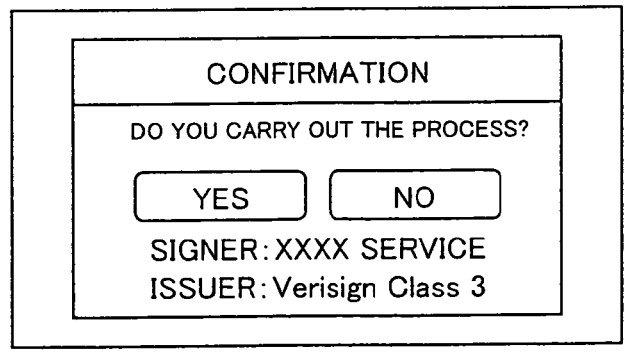

FIG. 20
(a)
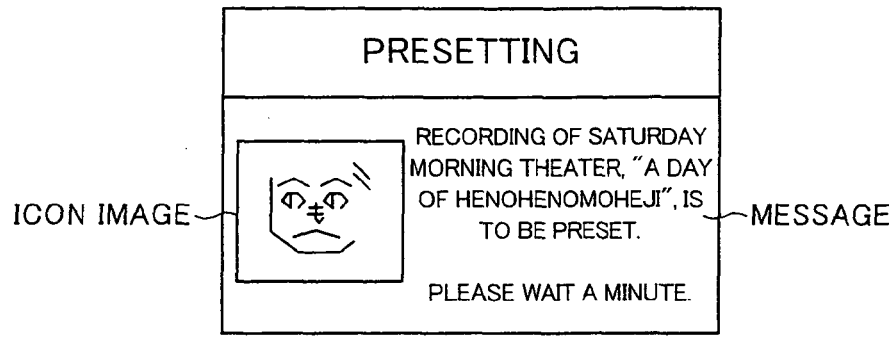
ICON IMAGE — PRESETTING — MESSAGE
RECORDING OF SATURDAY MORNING THEATER, "A DAY OF HENOHENOMOHEJI", IS TO BE PRESET.
PLEASE WAIT A MINUTE.
(b)
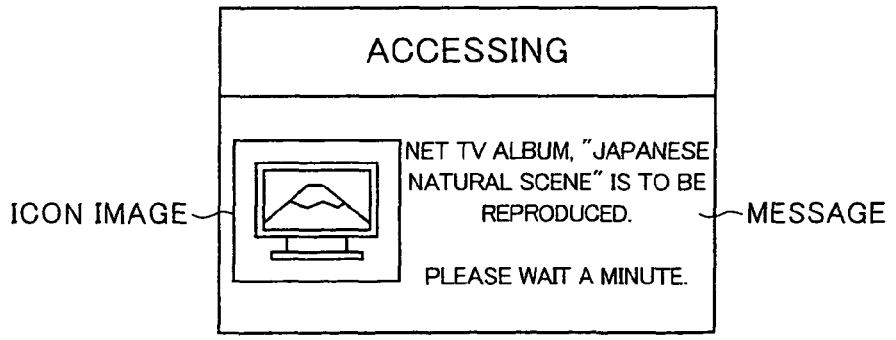
ICON IMAGE — ACCESSING — MESSAGE
NET TV ALBUM, "JAPANESE NATURAL SCENE" IS TO BE REPRODUCED.
PLEASE WAIT A MINUTE.

F I G. 22
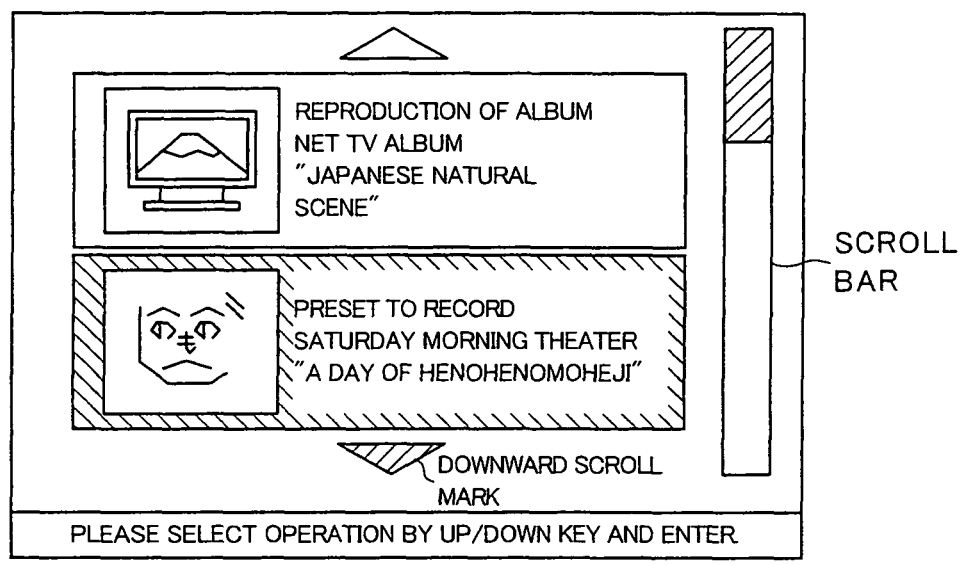

OPERATING SYSTEM THAT INCLUDES AN IMAGE DATA RECEIVING DEVICE AND AN OPERATION DEVICE FOR PROCESSING IMAGE DATA SETS

TECHNICAL FIELD

The present invention relates to (i) an image data receiving device for receiving an image data set, (ii) an operation device for operating the image data receiving device, (iii) and an operation system including them. Further, the present invention relates to a data structure of an image data set used to operate the image data receiving device. Moreover, the present invention relates to (I) a method in which the image data receiving device controls itself and (II) a method in which the operation device controls the image data receiving device. Also, the present invention relates to (a) a program for causing a computer to operate as the image data receiving device, (b) a program for causing a computer to operate as the operation device, and (c) a storage medium for storing the programs therein.

BACKGROUND ART

With popularization of a digital camera, particularly, a mobile phone with camera having a digital camera function, photographs have been widely treated as image data sets. Under such situation, there have been widely used devices such as a television which captures image data sets from a digital camera or a mobile phone and displays images of the captured image data sets and a printer which prints images of the captured image data sets.

Further, there has been widely adopted a technique for allowing these devices to transfer the image data sets by wireless communications. Examples of a general protocol for transferring image data sets by wireless communications include: a high-speed infrared communication protocol such as IrSimple (registered trademark); a short-distance wireless communication protocol such as Bluetooth (registered trademark); and the like. By adopting such wireless communications, it is possible to easily cause a television to display photographs taken by a mobile phone.

Further, as a television which can receive image data sets by infrared communications, there is a television which determines whether a received infrared signal is an image data set transmitted from a mobile phone and the like or an operation signal transmitted from an infrared remote controller and controls the television itself in accordance with the operation signal in case where the received infrared signal is the operation signal.

Incidentally, if the television having the image data receiving function has an image processing function, it is possible to conceive such case that a photograph transmitted from a mobile phone is displayed on the television and an image of the photograph displayed on the television is processed.

However, in such case, user has to at first use a mobile phone to transmit an image data set to the television and then to take an infrared remote controller instead of the mobile phone and further to operate the television so that the television carries out desired image processing with use of the infrared remote controller. In this manner, the user has to perform such complicate operations.

As a technique for exclusively solving such a special problem, a display processing device of Patent Document 1 is known. The display processing device of Patent Document 1 receives an image data set and displays an image based on the received image data set while scrolling or scaling up/down the image in accordance with image display control information incorporated into the received image data set. That is, only by transmitting an image data set incorporating image display control information therein to the display processing device, it is possible to cause the display processing device to carry out image processing such as scrolling or scaling up/down of the image.

In case of operating the conventional television having the image data receiving function, this raises as described above such problem that the user has to use both the image transmission device (mobile phone and the like) for transmitting an image data set to the television and the infrared remote controller for operating the television, which results in complicate and troublesome operations.

Such problem can be solved by transmitting an operation signal similar to the operation signal of the infrared remote controller from the mobile phone to the television. However, in this case, the mobile phone for operating the television is required to have not only the image data transmission function but also a function for transmitting the operation signal. That is, a general mobile phone having no function for transmitting the operation signal cannot operate the television. This is inconvenience for the user. Further, a signal for the infrared remote controller is generally unsuitable for transmission of large amount of data. This raises such problem that it is impossible to give an instruction for executing complicate operations.

Further, even if the mobile phone is arranged so that it is possible to transmit from the mobile phone the operation signal similar to the operation signal of the infrared remote controller as described above, this raises such problem that each of a server and the mobile phone has to additionally have a function for processing a special communication protocol so as to transmit the operation signal from the server to the mobile phone in case of operating the television with a combination of the mobile phone and the server of the Internet.

Besides, the operation signal is not information which cannot be viscerally understood by the user. Thus, in case where a plurality of operation signals are accumulated in the mobile phone, it is difficult to select a desired operation signal from them. This problem occurs also in such an arrangement that operation signals received on the side of the television are accumulated and the user selects one thereafter.

Further, the display processing device of Patent Document 1 processes an image, displayed on the basis of the received image data set, in accordance with the image display control information incorporated into the image data set. Thus, even if the technique of Patent Document 1 is applied to the television, a process that the television can carry out is limited to a process for an image based on the image data set transmitted to the television, so that it is impossible to freely operate the television unlike the infrared remote controller.

Note that, for convenience in descriptions, the conventional problems were explained by taking the television as an example, but similar problems generally occur in image data receiving devices each having the image data receiving function. For example, as to a printer which prints an image of an image data set received from a digital camera, a printing operation cannot be stopped by the digital camera. In order to stop the printing operation, the user has to directly operate the printer or has to operate a computer connected to the printer. This is so inconvenience.

PATENT DOCUMENT 1

Japanese Unexamined Patent Publication Tokukai 2004-310744 (Publication date: Nov. 4, 2004)

DISCLOSURE OF INVENTION

The present invention was made in view of the foregoing problems, and an object of the present invention is to provide an image data receiving device which can be freely operated also by an operation device which has only an image data transmission function.

In order to solve the foregoing problems, an image data receiving device according to the present invention comprises: image data receiving means for receiving, from the outside, an image data set storing therein process specifying information for specifying a process which should be carried out by the image data receiving device itself; and control means for controlling the image data receiving device itself so as to carry out the process specified by the process specifying information stored in the image data set, wherein the process specifying information specifies at least a process carried out with respect to an image other than an image stored in the image data set or a process other than the process carried out with respect to the image.

Further, in order to solve the foregoing problems, a control method according to the present invention is a method in which an image data receiving device controls the image data receiving device itself, said control method comprising the steps of: (i) receiving, from the outside, an image data set storing therein process specifying information for specifying a process which should be carried out by the image data receiving device itself; and (ii) controlling the image data receiving device itself so as to carry out the process specified by the process specifying information stored in the image data set, wherein the process specifying information specifies at least a process carried out with respect to an image other than an image stored in the image data set or a process other than the process carried out with respect to the image.

According to the foregoing arrangement, the image data receiving device controls the image data receiving device itself so as to immediately carry out the process specified by the process specifying information upon receiving the image data set storing therein the process specifying information. Thus, in case of causing the image data receiving device to carry out a certain process, the image data receiving device is caused to receive the image data set storing therein the process specifying information which specifies that process, thereby causing the image data receiving device to carry out the process. Thus, the user can operate the image data receiving device from the outside by using the operation device which transmits the image data set storing therein the process specifying information.

Moreover, the image data receiving device controls the image data receiving device itself so as to immediately carry out the process specified by the process specifying information upon receiving the image data set storing therein the process specifying information. Thus, when the image data receiving device is caused to receive the image data set storing therein the process specifying information, the image data receiving device carries out the process, specified by the process specifying information, without any delay. Thus, the user can operate the image data receiving device from the outside by using the operation device, which transmits the image data set storing therein the process specifying information, as if the user controls the image data receiving device by using an infrared remote controller.

Further, according to the arrangement, any device can function as the operation device for operating the image data receiving device as long as the device can transmit the image data set storing therein the process specifying information.

Besides, as the communication protocol used to transmit/receive the image data set, it is general to adopt a protocol which allows a larger amount of data to be more surely transmitted at higher speed than a remote controller communication protocol which transmits/receives a simple operation signal. Thus, according to the arrangement, it is possible to realize complicate control which requires a large amount of data.

Note that, any device can be used as the image data receiving device as long as the device includes at least means recited in claims. Any process may be carried out as the process which is specified by the process specifying information and whose execution is controlled in the image data receiving device, as long as the process can be carried out by the device and is a process other than a process carried out with respect to an image of the image data set or the process can be carried out by the device and is a process carried out with respect to an image other than an image stored in the received image data. That is, among processes which can be carried out by the device, any process other than the process carried out with respect to the received image may be carried out.

For example, as long as the image data receiving device is a television receiver which receives a broadcast content item broadcasted by a specified channel so as to output a video and/or sound of the broadcast content item, it is possible to realize such control that a channel receiving the broadcast content item is switched to a channel specified by the process specifying information. Further, as long as the television receiver has a function of presetting to view a program or a function of presetting to record a program, a process for presetting to view a program or presetting to record a program may be controlled in accordance with the process specifying information.

In order to solve the foregoing problems, an operation device according to the present invention, which operates an image data receiving device, comprises image data transmitting means for transmitting, to the image data receiving device, an image data set storing therein process specifying information for specifying a process which should be carried out by the image data receiving device, wherein the process specifying information specifies at least a process carried out with respect to an image other than an image stored in the image data set or a process other than the process carried out with respect to the image.

Further, an operation method according to the present invention is a method in which an operation device operates an image data receiving device, said method comprising the step of transmitting, to the image data receiving device, an image data set storing therein process specifying information for specifying a process which should be carried out by the image data receiving device, wherein the process specifying information specifies at least a process carried out with respect to an image other than an image stored in the image data set or a process other than the process carried out with respect to the image.

According to the arrangement, the process specifying information for specifying a process which should be carried out by the image data receiving device can be transmitted to the image data receiving device. This makes it possible to realize such effect that the operation device can operate the image data receiving device by the image data set.

Note that, the operation device may be arranged so as to further include: image data storage means for storing the image data set storing therein the process specifying information; image data obtaining means for obtaining the image data set storing therein the process specifying information; or image data generation means for generating an image data set which includes an image and process specifying information for specifying a process to be carried out by the image data receiving device.

In order to solve the foregoing problems, a data structure according to the present invention is an image data structure of an image data set containing an image, comprising process specifying information for specifying a process which should be carried out by an image data receiving device having received the image data set and for specifying at least a process carried out with respect to an image other than an image stored in the image data set or a process other than the process carried out with respect to the image, wherein the image included in the image data set is displayed in an operation device for operating the image data receiving device by transmitting the image data set to the image data receiving device and the image allows the process specified by the process specifying information to be identified.

According to the arrangement, it is possible to realize such effect that a process specified by the process specifying information can be carried out by causing the image data receiving device to receive the image data set.

Further, according to the arrangement, it is possible to cause the image data receiving device to display an image expressing the process specified by the process specifying information. Thus, it is possible to realize such effect that the user using the operation device to operate the image data receiving device can confirm with his/her eyes what process is to be carried out in the image data receiving device by transmitting the image data set.

Note that, also an operation system including the image data receiving device and the operation device is included in the scope of the present invention.

That is, an operation system according to the present invention includes an image data receiving device and an operation device for operating the image data receiving device, wherein the operation device includes image data transmitting means for transmitting, to the image data receiving device, an image data set storing therein process specifying information for specifying a process which should be carried out by the image data receiving device, and the image data receiving device includes: image receiving means for receiving the image data set transmitted from the image data transmitting means; and control means for controlling the image data receiving device itself so as to carry out the process specified by the process specifying information stored in the image data set, wherein the process specifying information specifies at least a process carried out with respect to an image other than an image stored in the image data set or a process other than the process carried out with respect to the image.

Note that, each of the image data receiving device and the operation device may be realized by a computer. In this case, (i) an image display program which causes the image display device to be realized in a computer by causing the computer to operate as the foregoing means and (ii) a computer-readable storage medium storing therein the program are included in the scope of the present invention.

BRIEF DESCRIPTION OF DRAWINGS

FIG. 4, showing the embodiment of the present invention, is a diagram illustrating an example of description of process specifying information stored in a maker note region of the image data set illustrated in FIG. 3.

FIG. 5, showing the embodiment of the present invention, is a diagram illustrating command codes stored in the image data set of FIG. 3 as the process specifying information and a list of processes assigned to the command codes.

FIG. 6, showing the embodiment of the present invention, is a diagram illustrating a relation between a display scale factor and a code for expressing the display scale factor in the command code of FIG. 5.

FIG. 13 shows the embodiment of the present invention, and FIG. 13(a) is an explanatory drawing illustrating how an image based on a display image data set having been received is displayed in the image data receiving device (television), and FIG. 13(b) is an explanatory drawing illustrating how an image processed in accordance with an operation image data set having been received is displayed in the image data receiving device (television).

FIG. 18, showing the embodiment of the present invention, is a diagram illustrating an example of how a display image displayed in the image data receiving device (television) is arranged in the processes of FIG. 17. FIG. 18(a) illustrates an example of a display image displayed in case where there is no digital signature. FIG. 18(*b*) illustrates an example of a display image displayed in case where the digital signature is invalid. FIG. 18(*c*) illustrates an example of a display image displayed in case where an issuer of the digital signature is not reliable.

FIG. 20 shows the embodiment of the present invention, and each of FIG. 20(*a*) and FIG. 20(*b*) illustrates an example of how a display image displayed in the image data receiving device (television) is arranged.

FIG. 22, showing the embodiment of the present invention, is a diagram illustrating an example of how a display image displayed in the image data receiving device (television) of FIG. 21 is arranged.

FIG. 26(*a*) illustrates a display image displayed before reception of the image data is completed. FIG. 26(*b*) illustrates a display image displayed while a process specified by the process specifying information is being carried out. FIG. 26(*c*) illustrates an image displayed after the process specified by the process specifying information is completed.

FIG. 28(*a*) illustrates a specific example in case where a process is completed right before starting to obtain a resource specified by URL having been read out. FIG. 28(*b*) illustrates a specific example in case where a process is completed right before completing display of a specified content item in accordance with the specified resource. FIG. 28(*c*) illustrates a specific example in case where a process is completed right before completing display of all information sets included in the specified content item. FIG. 28(*d*) illustrates a specific example in case where a process is completed right before completing display of all information sets included in the specified content item by scrolling an image to the end of the page.

FIG. 29(*a*) illustrates a display image displayed in the television in case where a process is completed right before starting to obtain a resource specified by URL having been read out. FIG. 28(*b*) illustrates a display image displayed in the television in case where a process is completed right before completing display of a specified content item in accordance with the specified resource. FIG. 29(*c*) illustrates a display image displayed in the television in case where a process is completed right before completing display of all information sets included in the specified content item.

REFERENCE NUMERALS

Figure 1:
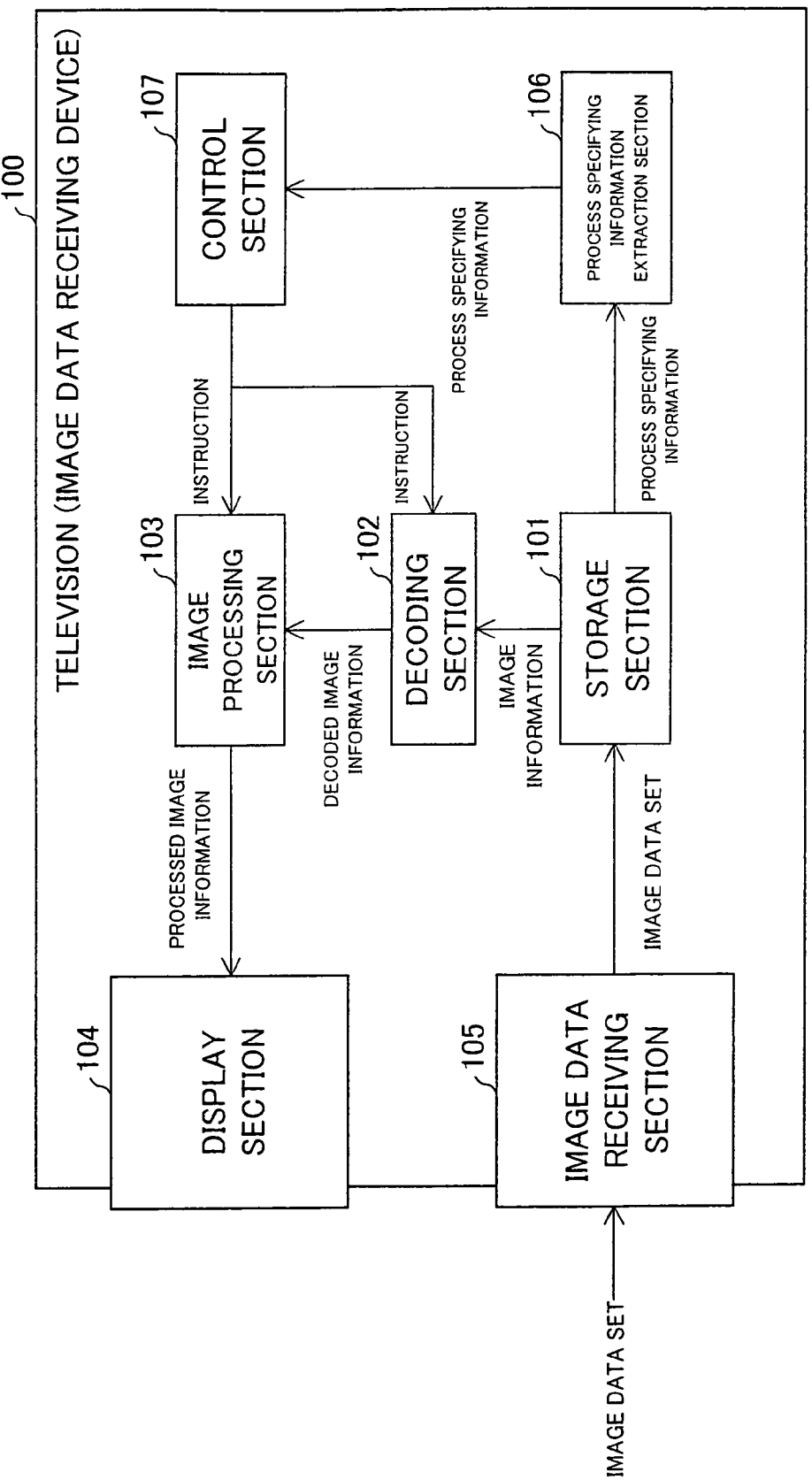
FIG. 1, showing an embodiment of the present invention, is a block diagram illustrating essential parts of an image data receiving device (television).

1 Operation system
100 Television (image data receiving device)
101 Storage section
102 Decoding section
103 Image processing section (image processing means)
104 Display section
105 Image data receiving section (image data receiving means)
106 Process specifying information extraction section (process specifying information extraction means)
107 Control section (Control means)
111 Communication section (data receiving means, data transmitting means)
112 Display image generation section
200 Mobile phone terminal (operation device)
201 Storage section (image data storage means)
202 Display image generation section (image display means)
203 Display section
204 Image data selection section (image data selecting means)
205 Image data transmitting section (image data transmitting means)

BEST MODE FOR CARRYING OUT THE INVENTION

Embodiment 1

One embodiment of the present invention is described as follows with reference to the attached drawings.
(Operation System)

Figure 2:
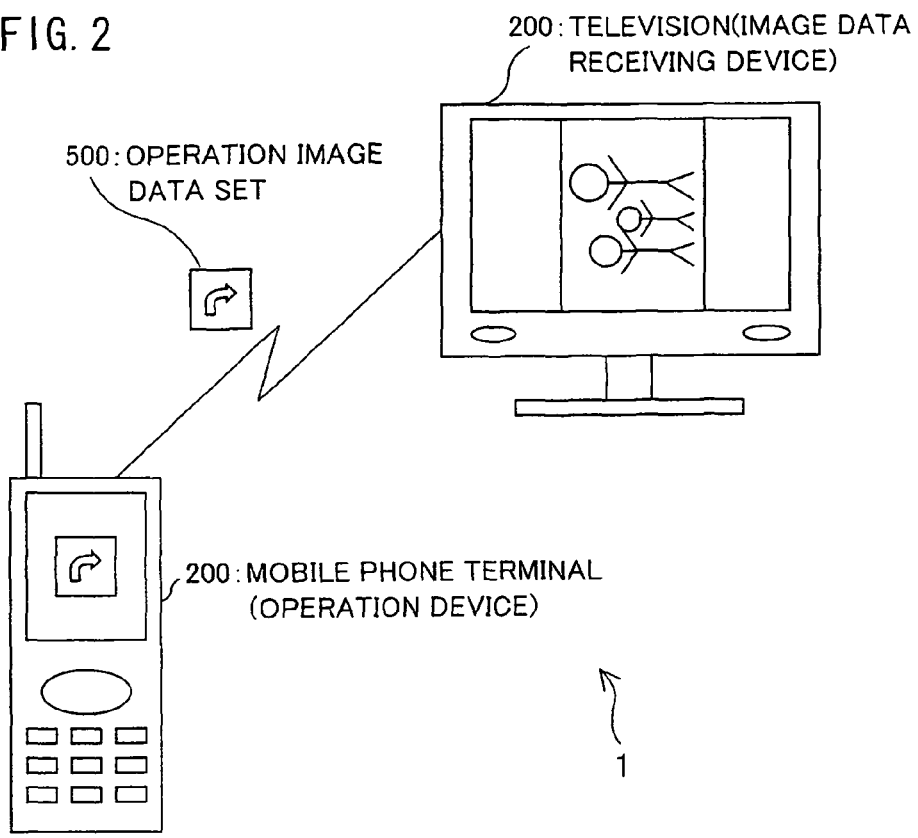
FIG. 2, showing the embodiment of the present invention, is a block diagram schematically illustrating an arrangement of an operation system.

First, with reference to FIG. 2, an arrangement of an operation system 1 according to the present embodiment is described.

FIG. 2 schematically illustrates an arrangement of the operation system 1. As illustrated in FIG. 2, the operation system 1 includes at least: an image data receiving device 100 for receiving an image data set; and an operation device 200 for operating the image data receiving device 100.

In the operation system 1, the image data receiving device 100 is realized as a television receiver (hereinafter, referred to as "television"). Hereinafter, the image data receiving device 100 is referred to as "television 100". The television 100 has not only a basic function as a television for receiving and displaying broadcast content items but also at least an image data receiving function for receiving an image data set. Note that, the television 100 is ordinarily placed in a user's house.

Further, in the operation system 1, the operation device 200 is realized as a mobile phone terminal. Hereinafter, the operation device 200 is referred to as "mobile phone terminal 200". The mobile phone terminal 200 has not only a basic function as a mobile phone for carrying out voice communications with other mobile phone terminal but also at least an image data transmission function for transmitting image data. Note that, the mobile phone terminal 200 is ordinarily held by a user in the vicinity of the television 100.

The television 100 and the mobile phone terminal 200 are arranged at least so that the mobile phone terminal 200 can transfer an image data set to the television 100. Favorable examples of a protocol for transferring the image data set by wireless communications include: a high speed infrared communication protocol such as IrSimple (registered trademark); a short distance wireless communication protocol such as Bluetooth (registered trademark); and the like. In case of adopting IrSimpleShot (registered trademark) for transferring an image data set based on IrSimple at high speed, a transfer rate of the image data is up to 4 Mpbs. Thus, the image data set can be instantaneously transferred from the mobile phone terminal 200 to the television 100.

Note that, if there is no need to consider drop of the usability which is caused by connection means for connecting the television 100 and the mobile phone terminal 200, it may be so arranged that the television 100 and the mobile phone terminal 200 are connected to each other via connection means such as a conducting wire and an optical fiber so as to transfer an image data set by wired communications via the connection means.

As detailed later, the mobile phone terminal 200 can transmit an operation image data set 500 to the television 100. The operation image data set 500 is a normal image data set having a general format such as JPEG format and TIFF format. The operation image data set 500 internally includes process specifying information for specifying a process which should be carried out by the television 100. While, the television 100 carries out the process, specified by the process specifying information stored in the operation image data set 500 received from the mobile phone terminal 200, immediately after receiving the operation image data set 500.

Thus, the mobile phone terminal 200 transfers the operation image data 500, storing therein the process specifying information for specifying the process to be carried out, to the television 100, so as to cause the television 100 to carry out the desired process. That is, the mobile phone terminal 200 functions as a remote controller for remote controlling the television 100. For example, in case of rotating an image displayed in the television 100 to the right by 90°, the user transmits from the mobile phone terminal 200 to the television 100 the operation image data set storing therein process specifying information for specifying a process for "rotating the image to the right by 90°" as illustrated in FIG. 2.

The process specifying information for controlling the television 100 is stored in the image data set and transferred to the television 100 as described above. Thus, in controlling the television 100, any arrangement may be adopted as long as there is a transfer path for transferring the image data set to the television 100. In other words, basically, any device may serve as a remote controller for remote controlling the television 100 as long as the device can transfer the image data set to the television 100 by using a transfer path for transferring the image data set. As a result, the present invention can be used without changing conventionally provided various image data obtaining methods, e.g., downloading of images from the Internet, attachment of images to a mail, downloading of images from the Internet by a bar code reader, transfer of images from other mobile phone, etc.

Note that, the television 100 may be operable by a normal infrared remote controller besides the mobile phone terminal 200. However, in the operation system 1, the television 100 can be controlled by the mobile phone terminal 200, so that the user can freely operate the television 100 by using only the mobile phone terminal 200 in case of transmitting a photograph from the mobile phone terminal 200 to the television 100 so as to display the photograph in the television 100 and rotate the displayed photo by 90°.

Note that, in the operation system 1 according to the present embodiment, the image data receiving device operated by the operation device is realized as the television 100, but the present invention is not limited to this. That is, the operation system according to the present invention can be realized also by adopting any device having the image data receiving function instead of the television 100. For example, it is possible to arrange an operation system which operates a printer for receiving an image data set and printing the received image data.

Further, in the operation system 1 according to the present embodiment, the operation device for operating the image data receiving device is realized as the mobile phone terminal 200, but the present invention is not limited to this. That is, the operation system according to the present invention can be realized also by adopting any device having the image data transmitting function instead of the mobile phone terminal 200. For example, it is possible to arrange an operation system in which a digital camera having the image data transmitting function is used as the operation device.

Note that, in shipping the aforementioned image data receiving device, e.g., a television or a printer as a product, it is effective to incorporate into the same package a CD-ROM or a memory card storing therein operation images for controlling the product thereby realizing convenience for users.

(Operation Image Data)

Next, with reference to FIG. 3 to FIG. 6, the following description explains a data structure of an operation image data set 500 transferred from the mobile phone terminal 200 to the television 100.

Figure 3:
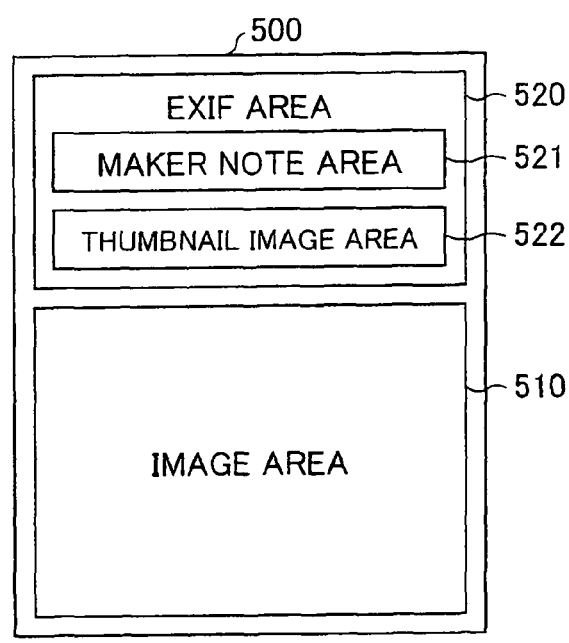
FIG. 3, showing the embodiment of the present invention, is a data structure diagram illustrating a data structure of an image data set used to operate the image data receiving device (television).

FIG. 3 is a data structure diagram schematically illustrating a data structure of the operation image data set 500. As illustrated in FIG. 3, the operation image data set 500 is schematically an image data set, based on JPEG format, which includes an image area 510 and an EXIF area 520.

The image area 510 is an area for storing therein a compressed image which should be displayed. While, the EXIF area 520 is an area for storing therein meta information concerning image information stored in the image area 510. The EXIF area 520 includes a maker note area 521 which can be used with a specification thereof freely determined by a maker of a digital camera or the like. Further, the EXIF area 520 includes a thumbnail image area 522 which stores therein a thumbnail image obtained by scaling down a main image stored in the image area 510.

The operation image data 500 used to operate the television 100 is realized by storing the process specifying information into the aforementioned maker note area 521.

Note that, in the image area 510 or the thumbnail image area 522, an image which expresses a process specified by the process specifying information stored in the maker note area 521, that is, a so-called icon image may be stored. As a result, in case where an image of the operation image data set 500 is displayed as in a normal image data set in the mobile phone terminal 200, it is possible to show the user a process stored in the operation image data set 500.

However, in the image area 510 or the thumbnail image area 522, image information such as a photograph which should be displayed may be stored as in a normal image data set. In this case, the television 100 having received the operation image data set 500 can display an image based on the operation image data set 500 (image information stored in the image area 510) and can process the image as specified by the process specifying information of the operation image data set.

A main characteristic of the operation image data set 500 is the process specifying information stored in the maker note area 521. With reference to FIG. 4, the arrangement of the maker note area 521 is further detailed as follows.

FIG. 4 is a drawing illustrating the arrangement of the aforementioned maker note area 521. The maker note area 521 includes plural small areas (an area 0, an area 1, an area 2, ... from the leading area in this order) divided so that each of the divided areas corresponds to a single byte. With reference to FIG. 4, information sets respectively stored in the small areas of the maker note area 521 are as follows.

In each of the areas 0 to 12, there is stored an identification code (herein, text sequence "TV CONTROL") declaring that the maker note area 521 includes process specifying information.

In each of the areas 13 and 14, a maker code is stored. In each of lower four bits of the area 15, a system code is stored. In the area 16, a device code is stored. The maker code, the system code, and the device code allow an operation target device (television 100 herein) to be specified. Note that, in association between the code and the operation target device, it is possible to adopt association conventionally used in an infrared remote controller without any modification.

In the operation target device, the maker note area 521 is referred to in any one out of a remote controller compatible mode, a display control mode, a URI mode, and an application mode. Four upper bits of the area 15 are used to specify a mode, out of the four modes, in which the maker note 521 should be referred to. A relation between a value stored in the four upper bits of the area 15 and the mode is as illustrated in FIG. 4.

In each of the areas 17 and 18, a command code referred to in the remote controller compatible mode or the display control mode is stored. The command code stored in each of the areas 17 and 18 is a 2-bytes code specifying a process that the operation target device should carry out. Each command code is associated to any process in advance.

The remote controller compatible mode and the display control mode are different from each other in how the command code and the process are associated to each other. That is, a single command code may specify different processes in the remote controller compatible mode and the display control mode. Thus, the operation target device first specifies by referring to four upper bits of the area 15 and interprets the command code in the specified mode, thereby specifying the process specified by the command code.

FIG. 5 illustrates a list of command codes and processes respectively associated to the command codes in the display control mode.

As illustrated in FIG. 5, a command code 0059 (indicated by hexadecimal number) is interpreted as specifying a process for relatively rotating a current display state of an image to the left by 90° in the display control mode. Further, a command code 005B is interpreted as specifying a process for relatively rotating a current display state of an image to the left by 270° (to the right by 90°).

In FIG. 5, each of command codes 001x to 004x is a command code which specifies a process for scaling up/down an image with a scale factor indicated by x. A relation between x and the scale factor in each command code is as illustrated in FIG. 6. For example, a command code 0044 (indicated by hexadecimal number) specifies a process for minimizing a size of an image under such condition that the image is displayed so as to cover an entire screen. Further, a command code 0034 specifies a process for minimizing a size of an image under such condition that whole the image is displayed within the screen.

Note that, a manner in which an operation signal of a conventional infrared remote controller is associated to a process is adopted as a manner in which a command code is associated to a process in the remote controller mode. Thus, all the processes conventionally controllable by the infrared remote controller can be specified as command codes.

In the area 21, expanded data whose data size is variable is stored. The areas 19 to 20 previous to the area 21 are used to specify the data size of the expanded data. A first example of information stored in the area 21 as the expanded data is URL (Uniform Resource Locator) referred to in the URL mode.

For example, in case where URL "http://www.sharp-.co.jp¥0" is stored in the area 21 as the expanded data, 23 (indicated by decimal number) is stored in each of the areas 19 and 20 as a data size of the expanded data. Note that, a text (¥0) of a text code 0 indicative of an end of the URL is added to the end of the URL stored as the expanded data. The data size stored in each of the areas 19 and 20 is counted including also the text of the text code 0.

Further, also an application name referred to in an application mode and an argument rendered to the application can be stored in the area 21 as the expanded data. An example thereof is as follows. An application name "tv-album" and an argument "1234333398762345" may be stored into the area 21 as expanded data "tv-album¥01234333398762345¥0". Herein, the text of the text code 0 is added to an end of the application name and to an end of the argument. In this case, 26 (indicated by decimal number) serving as a data size of the expanded data including the text of the text code 0 is stored in each of the areas 19 to 21.

Note that, the application whose name is "tv-album" is an application to use a network album service. Further, the argument rendered to the application is an album ID for specifying an album to be viewed in the network album service. Note that, the network album service referred to herein will be further detailed in describing the television 100 later.

Note that, the foregoing description explained the case where the operation image data set is an image data set based on the JPEG format for convenience in description, but any data set can be used as the operation image data set as long as the image data set is based on a format which allows the process specifying information to be stored. For example, the image data may be constituted by embedding the maker note area 521 into an image data set based on the TIFF format. Further, the operation image data set may be realized by storing and embedding the process specifying information into a text chunk of an image data set based on PNG (Portable Network Graphics).

(Image Data Receiving Device)

Next, an arrangement of the image data receiving device 100, that is, the television 100 is described as follows with reference to FIG. 1.

FIG. 1 is a block diagram illustrating essential parts of the television 100. As illustrated in FIG. 1, the television 100 includes a storage section 101, a decoding section 102, an image processing section (image processing means) 103, a display section 104, an image data receiving section (image data receiving means) 105, a process specifying information extraction section 106, and a control section (control means) 107.

The television 100 has an image displaying function for displaying an image, included in image data stored in the storage section 101, in the display section 104. The image displaying function is realized by cooperation of the storage section 101, the decoding section 102, the image processing section 103, and the display section 104.

The storage section 101 is means for storing an image data set and is constituted of RAM (random access memory) for example. Note that, the storage section 101 may be constituted of non-volatile memory such as a flash memory. Further, the storage section 101 may be fixedly included in the television 100 or may be a removable memory (memory card) provided on the television 100 like an SD card.

The decoding section 102 is means for developing image information included in an image data set. More specifically, the decoding section 102 reads out compressed (or encoded) image information included in an image data set stored in the storage section 101 and immediately develops (decodes) the image information into a displayable format. The decoding section 102 corresponds to image data sets of various formats such as JPEG format and TIFF format and carries out a developing process corresponding to a format of an image data set to be developed. The image information developed by decoding section 102 is supplied to the image processing section 103.

The image processing section 103 is means for processing the image information included in the image data set. More specifically, the image processing section 103 carries out image processing such as image rotation, scaling up, scaling down, vertical inversion, horizontal inversion, scrolling, color tone change, monochromatization, fade-in process, fade-out process, and the like, with respect to the developed image information supplied from the decoding section 102. The image processing carried out by the image processing section 103 is selected in accordance with an instruction from the control section 107 as described below. The image processed by the image processing section 103 is supplied to the display section 104.

The display section 104 is means for displaying the image information included in the image data set. More specifically, the display section 104 displays the processed image information supplied from the image processing section 103. The display section 104 is constituted of a liquid crystal display panel for example. Note that, the display section 104 may be constituted of other display device such as cathode ray tube. However, by using a large liquid crystal display panel as the display device, it is possible to display a high-definition image such as a photograph clearly.

Further, the television 100 has an image display controlling function for controlling the aforementioned image displaying function in accordance with the received image data set. The image display controlling function is realized by cooperation of the image data receiving section 105, the process specifying information extraction section 106, and the control section 107.

The image data receiving section 105 is means for receiving the image data set transmitted from the mobile phone terminal 200. More specifically, the image data receiving section 105 includes an infrared receiving section for receiving an infrared ray emitted from the mobile phone terminal 200 so as to convert the infrared ray into an electric signal. The image data receiving section 105 converts the electric signal obtained by the infrared receiving section into digital data in accordance with a predetermined infrared communication protocol (IrSimple for example), thereby obtaining the image data set transmitted from the mobile phone terminal 200. The image data set obtained by the image data receiving section 105 is stored into the storage section 101.

The process specifying information extraction section 106 is means for extracting process specifying information from the image data set received by the image data receiving section 105. More specifically, the process specifying information extraction section 106 determines whether process specifying information is included in the image data set stored in the storage section 101 or not. If the process specifying information is included in the image data set, the process specifying information extraction section 106 reads out the process specifying information. Then, the process specifying information extraction section 106 transmits the read out process specifying information to the control section 107. Further, in case where the process specifying information is not included in the stored image data set, the process specifying information extraction section 106 notifies to the control section 107 that the process specifying information is not included, that is, the received image data set is a display image data set.

The control section 107 is means for controlling the image receiving device (television 100) itself so as to carry out a process specified by the process specifying information included in the image data set received by the image data receiving section 105. Specifically, the control section 107 instructs the image processing section 103 to carry out the image processing specified by the process specifying information transmitted from the process specifying information extraction section 106, thereby controlling the image displaying function of the image data receiving device itself.

In response to the instruction, the image processing section 103 carries out the image processing, specified by the process specifying information, with respect to the image information, supplied from the decoding section 102, and supplies the processed image information to the display section 104. As a result, the image displayed in the display section 104 is updated into an image subjected to the image processing specified by the process specifying information.

Examples of the image data set received by the image data receiving section 105 include: an operation image data set storing therein process specifying information; and a normal image data set storing therein no process specifying information (hereinafter, this data set is referred to as "display image data set"). Further, the image information included in the operation image data set may be image information which should be displayed in the television 100 (e.g., a photograph or the like) or may be image information which does not have to be displayed in the television 100 (e.g., an icon image expressing a process specified by the process specifying information).

In case where an image size of the image data set received by the image data receiving section 105 is large (its horizontal resolution is 640 or more and its vertical resolution is 480 or more for example), the image data may include image information which should be displayed regardless of whether the process specifying information is included in the image data set or not.

In case where an image size of a newly received image data set is larger than a predetermined threshold value (its horizontal resolution is 640 or more and its vertical resolution is 480 or more for example) or in case where the newly received image data set is a display image data set, the decoding section 102 develops image information of the image data set.

As a result, in case where the image size of the newly received image data set is larger than the predetermined threshold value, image information inputted to the image processing section 103 is updated to image information of the newly received image data set, and in case where the image size of the newly received image data set is smaller than the predetermined threshold value, image information inputted to the image processing section 103 is kept as it is. Further, also in case where the newly received image data set is a display image data set, image information inputted to the image processing section 103 is updated to the image information of the newly received image data set.

Further, in case where the newly received image data set is an operation image data set, the image processing section 103 carries out the image processing specified by the process specifying information stored in the operation image data set, and in case where the newly received image data set is a display image data set, the image processing section 103 carries out image processing of a preset default.

As a result, (1) in case where the newly received image data set is a display image data set, an image obtained by carrying out the image processing of the default with respect to image information of the image data set is displayed regardless of its image size, and (2) in case where the newly received image data set is an operation image data set and an image size of the image data set is larger than the predetermined threshold value, an image subjected to the image processing specified by the process specifying information of the image data set is displayed, (3) in case where the newly received image data set is an operation image data set and an image size of the image data set is smaller than the predetermined threshold value, there is displayed an image obtained by carrying out the image processing specified by the process specifying information of the image data set with respect to an image displayed in receiving the image data set.

The processes of the television 100 which are carried out in accordance with a type of an image data set are shown in the following Table 1.

TABLE 1

| | Large image size (horizontal resolution is 640 or more pixels or vertical resolution is 480 or more pixels) | Small image size (horizontal resolution is less than 640 pixels and vertical resolution is less than 480 pixels) |
| --- | --- | --- |
| Display image data set (having no process specifying information) | Decoding process Default image processing | Decoding process Default image processing |
| operation image data set (having process specifying information) | Decoding process Specified image processing | Specified image processing (with respect to an image being displayed) |

Note that, the image data receiving section 105 may be arranged so as to receive not only the image data set but also the process specifying information which is not stored in the image data set as a digital data set. In this case, it may be so arranged that: when any digital data set received by the image data receiving section 105 is stored in the storage section 101, the process specifying information extraction section 106 first analyzes a name or header information of the digital data set and determines whether the digital data set is an image data set or process specifying information. Further, in case where the digital data is the process specifying information, the process specifying information extraction section 106 reads out all the digital data sets stored in the storage section 101 and notifies the read out process specifying information to the control section 107.

Figure 7:
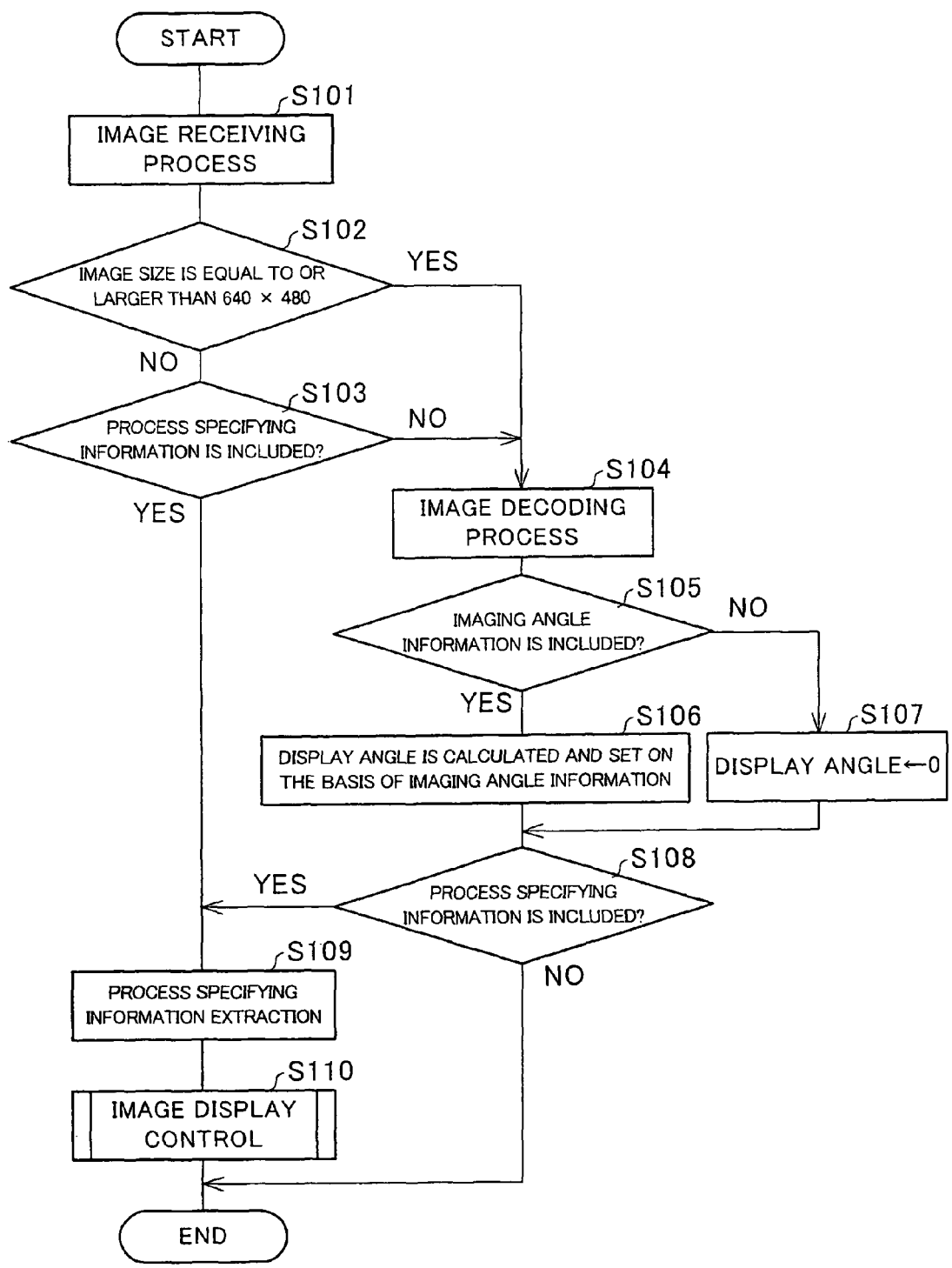
FIG. 7, showing the embodiment of the present invention, is a flowchart illustrating processes carried out when the image data receiving device (television) receives an image data set.
Figure 8:
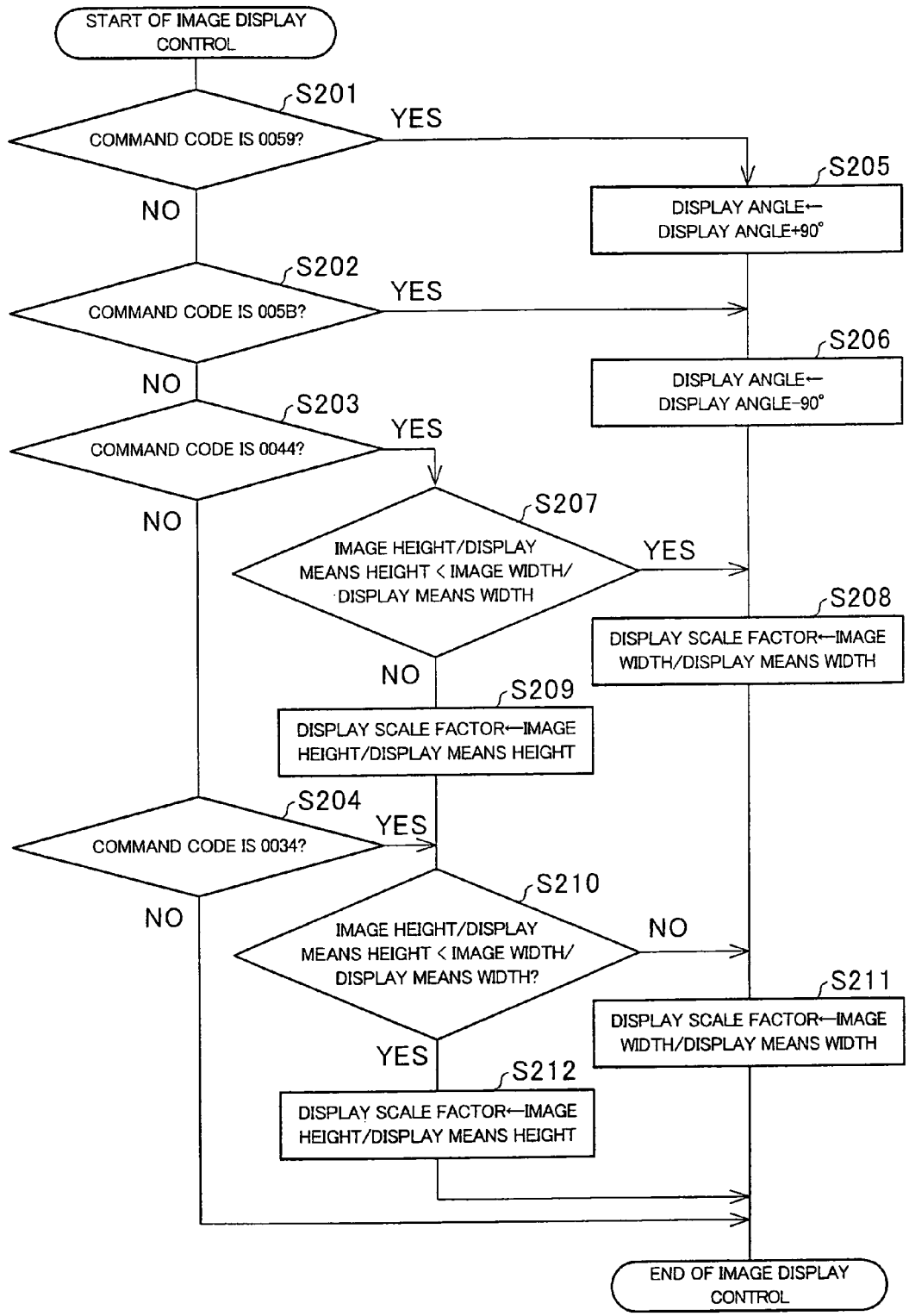
FIG. 8, showing the embodiment of the present invention, is a flowchart illustrating an example of a flow of an image control method carried out by the image data receiving device (television) in accordance with process specifying information.

Next, with reference to FIG. 7 and FIG. 8, the following description explains processes carried out by the television 100 when the television 100 receives an image data set.

FIG. 7 is a flowchart illustrating a flow of processes carried out by the television 100 when the television 100 receives an image data set.

Upon detecting an infrared ray emitted from the mobile phone terminal 200, the image data receiving section 105 starts reception of an image data set. The image data receiving section 105 stores the received image data set into the storage section 101 (S101).

When the received image data set is stored into the storage section 101, the decoding section 102 determines an image size of the received image data set in accordance with JPEG header information of the image data set (S102). In case where the image size of the received image data set is smaller than the predetermined threshold value (its horizontal resolution is less than 640 and its vertical resolution is less than 480) (S102: No), the process specifying information extraction section 106 further determines whether the received image data set has process specifying information or not (S103).

In case where the image size of the image data set received in S101 is larger than the predetermined threshold value (S102: Yes) or in case where the image size of the image data set received in S101 is smaller than the predetermined threshold value (S102: No) and the image data set is a display image data set having no process specifying information (S103: No), the decoding section 102 develops image information of the image data set received in S101 and supplies the developed image information to the image processing section 103 (S104).

Next, the image processing section 103 processes the image information supplied from the decoding section 102 by carrying out the image processing of default and outputs the processed image information to the display section 104. In FIG. 7, the image processing of default is a process for rotating the image so as to correct a slant of the image which is caused by a camera slanted in taking the image.

Specifically, it is determined whether or not imaging angle information is included in EXIF information of the image data set received in S101 (S105), and if the imaging angle information is included (S105: Yes), there is carried out the image processing for rotating the image by a display angle calculated in accordance with the imaging angle information (S106). Further, in case where the imaging angle information is not included in the image data received in S101 (S105: No), the image processing section 103 outputs the image information, supplied from the decoding section 102, to the display section 104 without any modification (S107).

Next, the process specifying information extraction section 106 determines again whether or not process specifying information is stored in the image data set received in S101 (S108). The step S108 is a determination step provided in consideration for a case where the image size of the image data set received in S101 is equal to or larger than the predetermined threshold value but the image data set is an operation image data set including process specifying information. When it is determined in S108 that the process specifying information is not stored in the received image data set (S108: No), a series of processes is ended.

In case where the image size of the image data set received in S101 is smaller than the predetermined threshold value (S102: No) and process specifying information is stored in the image data set (S103: Yes) or in case where the image size of the image data set received in S101 is larger than the predetermined threshold value (S102: Yes) and process specifying information is stored in the image data set (S108: Yes), the process specifying information extraction section 106 extracts the process specifying information from the received image data set and transmits the extracted process specifying information to the control section 107 (S109). As a result, in case where the image data set received in S101 is an operation image data set, the process specifying information of the image data set is necessarily transmitted to the control section 107.

The control section 107 instructs the image processing section 103 to carry out the image processing specified by the process specifying information transmitted from the process specifying information extraction section 106. The image processing section 103 carries out the image processing, specified by the process specifying information, in response to the instruction given by the control section 107 (S110).

FIG. 8 is a flowchart illustrating a flow of the image display control (S109 of FIG. 7) carried out by the television 100 in accordance with the process specifying information.

The image display control in accordance with the process specifying information extracted from the received image data set is realized by the image processing section 103 and the control section 107.

If a command code included in the process specifying information is 0059 (indicated by hexadecimal number) (S201: Yes), the control section 107 instructs the image processing section 103 to carry out the image processing for relatively rotating the image to the left by 90° from the current display state. In response to the instruction, the image processing section 103 carriers out the image processing for relatively rotating the image to the left by 90° from the current display state and outputs the processed resultant to the display section 104 (S205).

If a command code included in the process specifying information is 005B (indicated by hexadecimal number) (S202: Yes), the control section 107 instructs the image processing section 103 to carry out the image processing for relatively rotating the image to the right by 90° from the current display state. In response to the instruction, the image processing section 103 carriers out the image processing for relatively rotating the image to the right by 90° from the current display state and outputs the processed resultant to the display section 104 (S206).

If a command code included in the process specifying information is 0034 (indicated by hexadecimal number) (S203: Yes), the control section 107 instructs the image processing section 103 to carry out the image processing for maximizing a display size of the image under such condition that the entire image is displayed in the display screen without changing an aspect ratio of the image. In response to the instruction, the image processing section 103 carries out the image processing for calculating a ratio $\alpha$ of a vertical width of the display screen with respect to a vertical width of the image and a ratio $\beta$ of a horizontal width of the display screen with respect to a horizontal width of the image so as to scale up or scale down the image by using a smaller value of the ratios $\alpha$ and $\beta$ as a display scale factor (S207 to S209).

In case where a command code included in the process specifying information is 0044 (indicated by hexadecimal number) (S204: Yes), the control section 107 instructs the image processing section 103 to carry out the image processing for minimizing a display size of the image under such condition that the entire image is displayed in the display screen without changing an aspect ratio of the image. In response to the instruction, the image processing section 103 carries out the image processing for calculating a ratio $\alpha$ of a vertical width of the display screen with respect to a vertical width of the image and a ratio $\beta$ of a horizontal width of the display screen with respect to a horizontal width of the image so as to scale up or scale down the image by using a larger value of the ratios $\alpha$ and $\beta$ as a display scale factor (S210 to S212).

Note that, for convenience in illustration, the flowchart of FIG. 8 illustrates the flow of the image display control carried out by the television 100 in such a simplified manner that the number of adoptable command codes is four. That is, the number of command codes adoptable by the television 100 is not limited to four of FIG. 8. Further, as illustrated in FIG. 8, the television 100 does not have to carry out all the commands, and in response to an impossible command, the television 100 may bring the image display control to an end without any operation as in S202: No. In this case, a caution indicating that the process cannot be carried out may be outputted.

As described above, in the television 100, the image data receiving section 105 functions as image data receiving means for receiving, from the mobile phone terminal 200, the operation image data set storing therein process specifying information for specifying a process which should be carried out by the image data receiving device (television 100).

Further, the control section 107 functions as control means for controlling the image data receiving device so as to immediately carry out the process, specified by the process specifying information stored in the received image data set, upon receiving the operation image data set. Particularly, the television 100 includes the image processing section 103 for processing an image of the image data set by carrying out the image processing, and the control section 107 functions as control means for controlling the image processing section 103 so as to carry out the image processing specified by the process specifying information.

Thus, in case of causing the television 100 to carry out certain image processing, the television 100 is caused to receive the operation image data set storing therein the process specifying information which specifies the image processing, thereby causing the television 100 to carry out the image processing. As a result, the user can control the image displaying function of the television 100 from the outside by transmitting the operation image data set from the mobile phone terminal 200.

Note that, the foregoing description explained the example where the operation image data set is used to control the image displaying function of the television 100, but a function of the television 100 which can be controlled in accordance with the operation image data set is not limited to the image displaying function. That is, the function of the television 100 which can be controlled by using the operation image data set is not limited to the aforementioned image displaying function but may be any function of the television 100.

For example, it may be so arranged that a channel for receiving a broadcast content item is switched, to a channel specified by the process specifying information. Further, if the television 100 has a function of presetting to view a program or a function of presetting to record a program, a registration process in which viewing or recording is preset may be controlled in accordance with the process specifying information.

Note that, the television 100 may adopt such operation that an image display mode for displaying a received image and a broadcast receiving mode for viewing a broadcast content item are clearly separated from each other. In this case, when the television 100 receives an operation image data set for specifying a process related to viewing a broadcast content item (switching a channel for example) in the image display mode or when the television 100 receives an operation image data set for specifying a process related to display of an image in the broadcast mode, it is impossible to immediately carry out a process the user intends.

Thus, in case where a channel switching operation image data set is received in the image display mode for example, it is preferable to cause the display section 104 to output at least any one of (i) a message indicative of a procedure for switching into the broadcast receiving mode and (ii) a message indicating that it is possible to switch a channel by switching into the broadcast receiving mode. Likewise, in case where image data indicative of a display target image is received in the broadcast receiving mode, it is preferable to cause the display section 104 to output at least any one of (I) a message indicative of a procedure for switching into the image display mode and (II) a message indicating that it is possible to display a large image by switching into the image display mode. Further, in case where an operation image data set indicative of an instruction to carry out image processing is received in the broadcast receiving mode, it is preferable to cause the display section 104 to output at least any one of (a) a message indicative of a procedure for switching into the image display mode and (b) a message indicating that it is possible to carry out the image processing by switching a channel into the image display mode.

Figure 9:
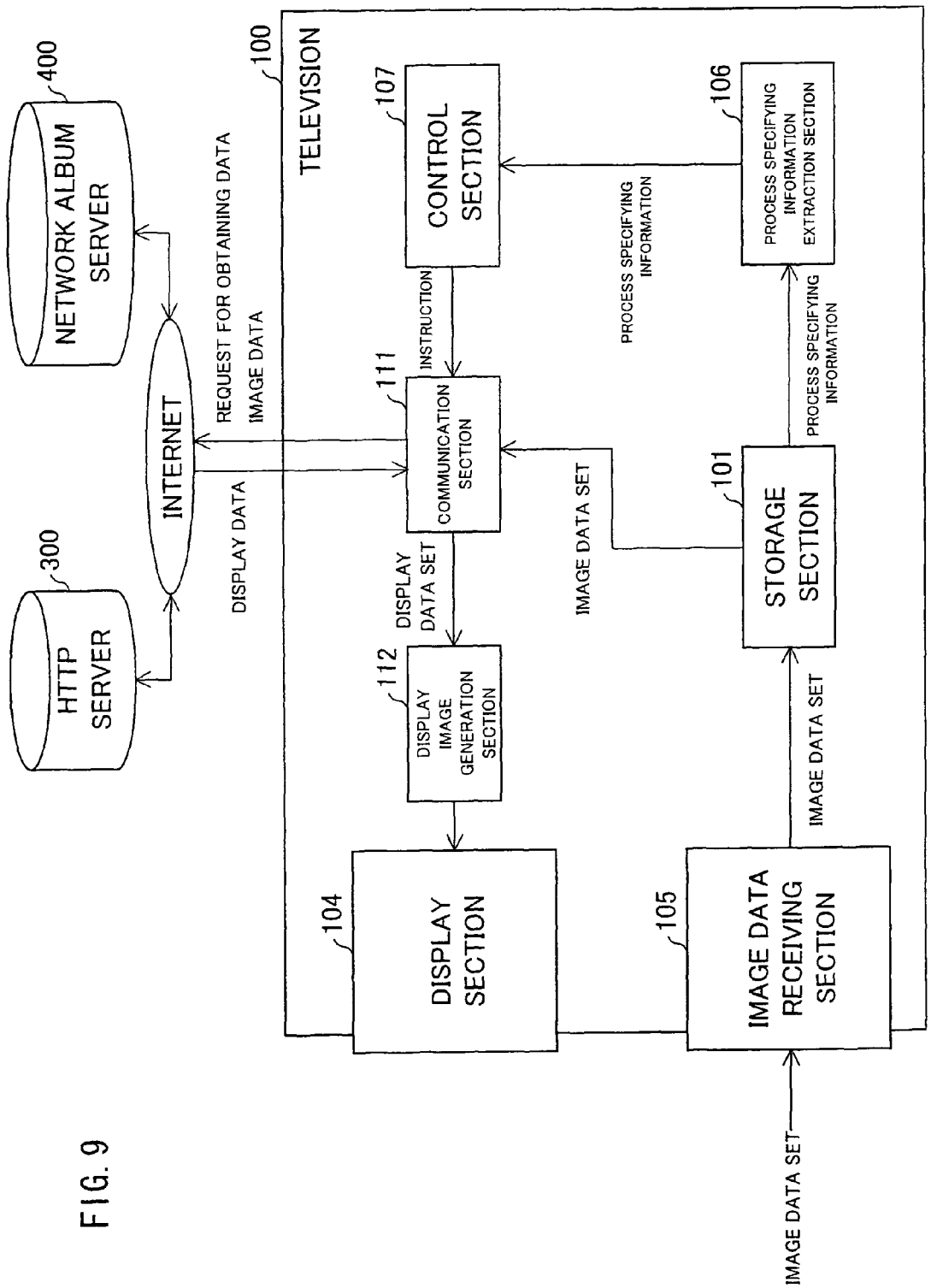
FIG. 9, showing the embodiment of the present invention, is a block diagram illustrating essential parts of the image receiving device (television).

Further, if the television 100 has a data communication function, the data communication function may be controlled by using an operation image data set. With reference to FIG. 9, the following describes an example where the operation image data set is used to control the data communication function of the television 100.

FIG. 9 is a block diagram illustrating an arrangement of the television 100 which allows its data communication function to be controlled in accordance with the operation image data set. In FIG. 9, the decoding section 102 and the image processing section 103 of FIG. 1 are omitted and a communication section (data receiving means, data transmitting means) 111 and a display image generation section 112 are newly illustrated. Note that, the storage section 101, the display section 104, the image data receiving section 105, the process specifying information extraction section 106, and the control section 107 are arranged in the same manner as in FIG. 1.

In case where process specifying information of the operation image data set received by the image data receiving section 105 includes URL (Uniform Resource Locator) and the process specifying information is indicative of an instruction for display a web page whose location is specified by the URL (in case where a URL mode is specified in a maker note area of the operation image data), the control section 107 instructs the communication section 11 to obtain a display data set for displaying the web page.

The communication section 111 is means for carrying out data communications with other communication device via the Internet. In response to the instruction given by the control section 107, the communication section 111 transmits a request for obtaining the display data set to an HTTP server 300 and obtains the display data set as a response thereto. The display data set received by the communication section 111 is supplied to the display image generation section 112.

The display image generation section 112 is means for generating a display image in accordance with the display data set which the communication section 111 has received from other communication device. For example, if the display data set received by the communication section 111 is an HTML (Hypertext Markup Language) document, text information and the like are arranged in accordance with the HTML document so as to generate a display image to be displayed as a web page. The display image generated by the display image generation section 112 is supplied to the display section 104 and is displayed in the display section 104.

In the foregoing manner, the television 100 is caused to receive the operation image data set storing therein the process specifying information including URL of the desired web page, thereby causing the television 100 to display the web page. At this time, the control section 107 functions as control means for controlling the communication section 111 so as to receive a display data set, specified by URL included in the process specifying information, from the communication device specified by URL included in the process specifying information of the operation image data set.

Further, various kinds of web services can be used in the television 100 by adopting the same manner. The following describes an example where a network album service is used in the television 100.

Note that, the network album service is a kind of web services realized by (i) a network album server which classifies photograph data sets into plural albums and manages them and (ii) a client who downloads a photograph data set group belonging to his/her desired album from the network album server and displays a list of photographs of the downloaded photograph data set group or displays the photographs as slide show.

In case where the process specifying information of the operation image data set received by the image data receiving section 105 includes an album ID and the process specifying information is indicative of an instruction to display an album specified by the album ID (that is, in case where an application mode is specified and "tv-album" is specified as an application name in the maker note area of the operation image data set), the control section 107 instructs the communication section 110 to obtain a photograph data set group of the album from the network album server 400.

In response to this instruction, the communication section 111 transmits a request for obtaining data including the album ID to the network album server 400 and obtains the photograph data set group of the album specified by the album ID as a response. The photograph data set group received by the communication section 111 is supplied to the display image generation section 112. The display image generation section 112 generates a display image so as to display a list of photographs of the photograph data set group obtained by the communication section 111 or so as to display the photographs as slide show. The display image generated by the display image generation section 112 is displayed in the display section 104.

In this manner, the television 100 is caused to receive the operation image data set storing therein the process specifying information including the album ID of the desired album, thereby causing the television 100 to display the photographs of the album. At this time, the control section 107 functions as control means for controlling the communication section 111 so as to receive the photograph data set group, specified by the album ID included in the process specifying information, from a predetermined network album 400.

Further, in case where the process specifying information of the operation image data set received by the image data receiving section 105 includes an album ID and the process specifying information is indicative of an instruction to add an image data set to an album specified by the album ID, the control section 107 instructs the communication section 111 to upload the image data set to the network album server 400.

In response to this instruction, the communication section 111 transmits the image data set to the network album server 400 as well as the album ID. The network album server 400 classifies the image data set, transmitted from the television 100, into the album specified by the album ID, transmitted as well as the image data set, so as to manage the image data set.

In the foregoing manner, the television 100 is caused to receive the operation image data set storing therein process specifying information for specifying a process for uploading the image data set, thereby uploading the image data set to the network album server 400. At this time, the control section 107 functions as control means for controlling the communication section 111 so as to transmit the image data set to a predetermined network album server 400.

Lastly, the television 100 may be arranged so that the control section 107 confirms whether the received image data set includes an authenticated digital signature or not, and only in case where the authenticated digital signature is included in the image data set, the control section 117 controls the television 100 so as to carry out a process specified by the process specifying information stored in the image data set.

Further, it may be so arranged that: a list of processes allowed to be carried out by the television 100 is stored in the storage section 101 in advance, and the control section 107 determines whether or not the process specified by the process specifying information stored in the received image data set is a process included in the list, and only in case where the process specified by the process specifying information is a process included in the list, the control section 107 controls the television 100 so as to carry out the process specified by the process specifying information.

As a result, it is possible to prevent execution of a process specified by process specifying information included in image data set generated by a willful third party or an unfavorable process which is not included in the list. Thus, it is possible to reduce a possibility that the television 100 may carry out an unexpected process, thereby realizing greater security in the operation system 1. This arrangement can be used also to carry out a process specified only by an operation image data set obtained by paying a fee.

The same arrangement makes it possible to allow the television 100 to display a single high-quality photograph. For example, in case where "tv-photo" is specified as an application name, the control section 107 instructs the communication section 111 to obtain a photograph, specified by its control data set (process specifying information), from the network album server 400. Note that, it is preferable that an image of the operation image data set stored in the mobile phone 200 is an image obtained by scaling down a photograph obtained from the network album server 400, but the image of the operation image data set does not have to be identical to the scaled-down image, and an image obtained by partially cutting off the obtained image may be used as the image of the operation image data set. Further, the arrangement can be used so that: if an advertising image is used as an operation image data set and the advertising image is obtained and transmitted to the television 100, the television 100 displays a high-definition image required by the user (e.g., an album or a photograph of a talent appearing on TV commercial).

Further, the network album server 400 may be arranged so that: when the television 100 accesses the network album server 400, a product name, a product number, and setting information of the television 100 are transmitted together, and an album or a photograph which have been modified so as to correspond to these information sets is transmitted to the television 100 in return. A simple example thereof is as follows. An album or a photograph which have been modified so as to be most suitable for resolution of the display section 104 of the television 100 is transmitted in return. There are a plurality of methods for transmitting these information sets, but it is easy and effective to adopt such method that these information sets are stored in a user agent included in a header of an HTTP protocol.

Note that, the foregoing description explained the network album server 400 as a server in the Internet, but the arrangement is not limited to this, and a server connected to a home LAN may be used. In this case, it is effective to combine with DLNA (Digital Living Network Alliance) (registered trademark). Also DLNA adopts a protocol based on HTTP in transferring data, so that detail explanation thereof is omitted here. In this case, it may be so arranged that: when the mobile phone 200 transmits an image data set (e.g., photograph) including control information (process specifying information), there is a displayed such a condition that an input of the television 100 switches to an input terminal to which a server (including a recording function) is connected, and the server reproduces a recorded video.

As described above, the television (image data receiving device) 100 may be arranged so that the control section 107 confirms whether or not a digital signature is included in an operation image data set received from the mobile phone terminal (operation device) 200, and only in case where the digital signature is included in the operation image data set, the control section 107 controls the television 100 so as to carry out a process specified by process specifying information stored in the operation image data set.

First, an advantage in arranging the television 100 in the foregoing manner is described as follows with reference to FIG. 2.

As illustrated in FIG. 2, the mobile phone terminal 200 displays an image area of the operation image data set 500 or an icon image stored in a thumbnail image area. The icon image expresses a process specified by the process specifying information stored in the operation image data set 500. The user confirms the icon image and then transmits the operation image data set 500 to the television 100. At this time, the user can visually recognize a process, which corresponds to the operation image data set 500 to be transmitted to the television 100, without directly referring to the process specifying information described in a language which is hard for the user to understand.

However, as in the case of fishing fraud willfully using a function of a mailer or a Web browser, there is a possibility that process specifying information which does not correspond to the icon image may be willfully embedded into the operation image data set 500. Specifically, the icon image viewed by the user does not express process specifying information for specifying a process which the television 100 actually carries out, so that the television 100 may carry out an unexpected process if the user uses the operation image data set 500 in reliance thereon.

Particularly, the operation image data set 500 may be distributed to the operation device such as the mobile phone terminal 200 via various routes, e.g., copied from any medium, downloaded from a Web server, received by an e-mail, or a similar manner. Thus, a willful third party may interpolate the process specifying information of the operation image data set 500. Thus, it is preferable to use a digital signature so as to enhance the reliability of the operation image data set so that the user can use the operation image data set 500 with security.

Figure 14:
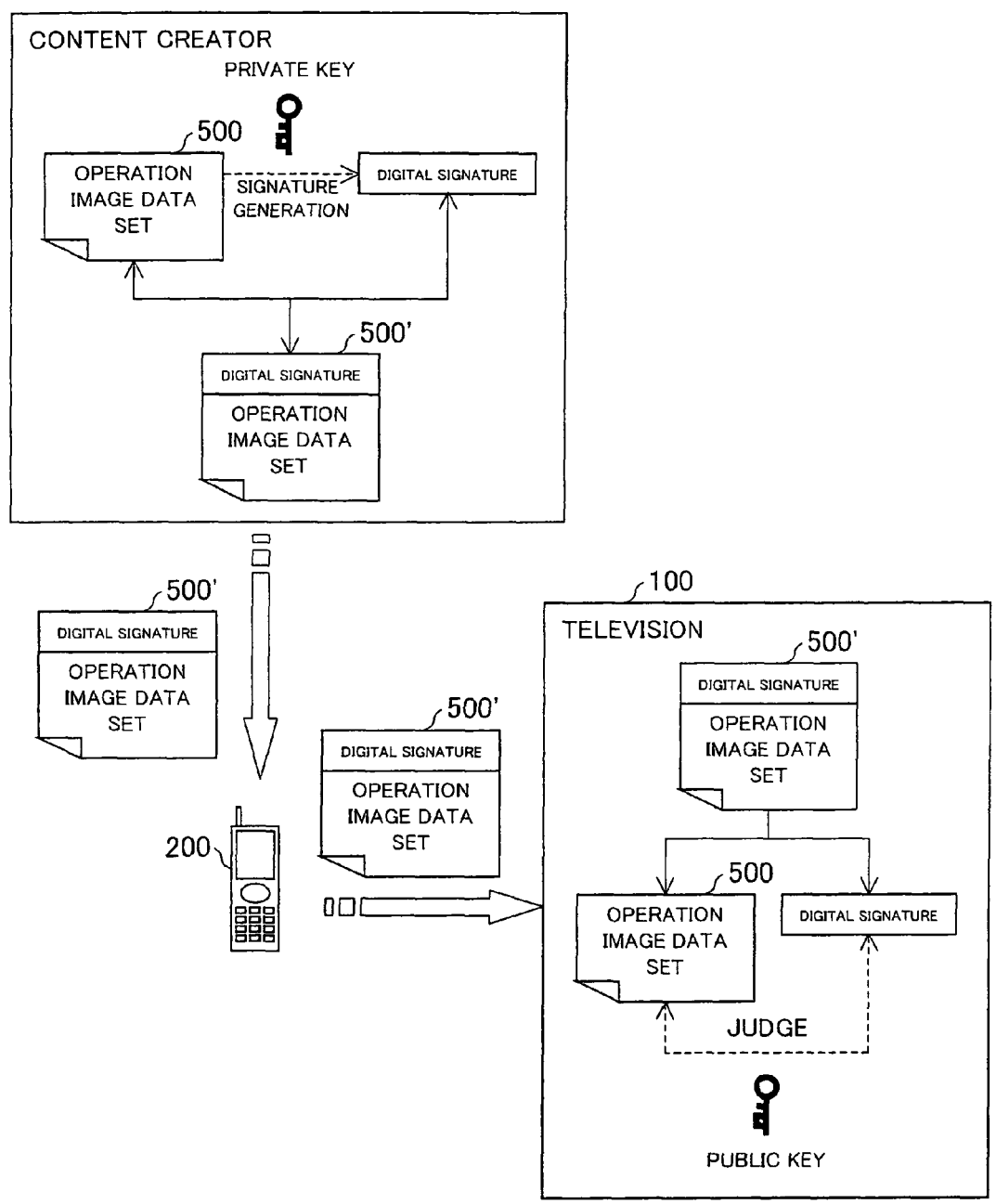
FIG. 14, showing the embodiment of the present invention, is a diagram schematically illustrating a method for enhancing reliability of an operation image data set by using a digital signature.

FIG. 14 is a drawing schematically illustrating a method for using a digital signature so as to enhance the reliability of the operation image data set 500.

As illustrated in FIG. 14, a content creator generates a digital signature for the operation image data set 500 by using a private key. The digital signature generated herein is a hash value calculated from the private key and operation image data set in accordance with a signature generation algorithm. The content creator adds the generated digital signature to the operation image data set 500 so as to generate an operation image data set 500' with digital signature.

The television 100 extracts, from the operation image data set 500' with digital signature which has been obtained via the mobile phone terminal 200, the operation image data set 500 and the digital signature, and uses a public key so as to judge whether the digital signature is a valid digital signature for the operation image data set 500 or not. Specifically, the digital signature is decoded by using the public key, and whether the decoded hash value is identical to a hash value calculated from the operation image data set or not is confirmed. When it is judged that the digital signature is valid for the operation image data set 500, that is, when it is confirmed that the operation image data set 500 is not interpolated, the television 100 controls the television 100 itself so as to carry out a process specified by the process specifying information stored in the operation image data set 500 (for example, when URI is stored in the process specifying information, the television 100 accesses the URI).

Note that, as the public key that the television 100 uses to judge the digital signature, any public key may be used as long as the public key corresponds to the private key used for the user to generate the digital signature, and there is no particular limitation in a manner in which the television 100 obtains the public key. That is, the public key used by the television 100 may be obtained via a network or may be stored in the storage section in advance (for example, embedded in shipping the product from the factory). In case of operation image data sets created by plural content creators different from each other, it may be so arranged that a plurality of public keys corresponding to private keys of the respective content creators are stored in advance. Further, it may be so arranged that: the content creator embeds a digital certificate, indicating that a public key is stored in the operation image data set 500, in the operation image data set beside the digital signature, and the television 100 confirms the digital certificate and then uses the public key embedded in the operation image data set 500.

Figure 15:
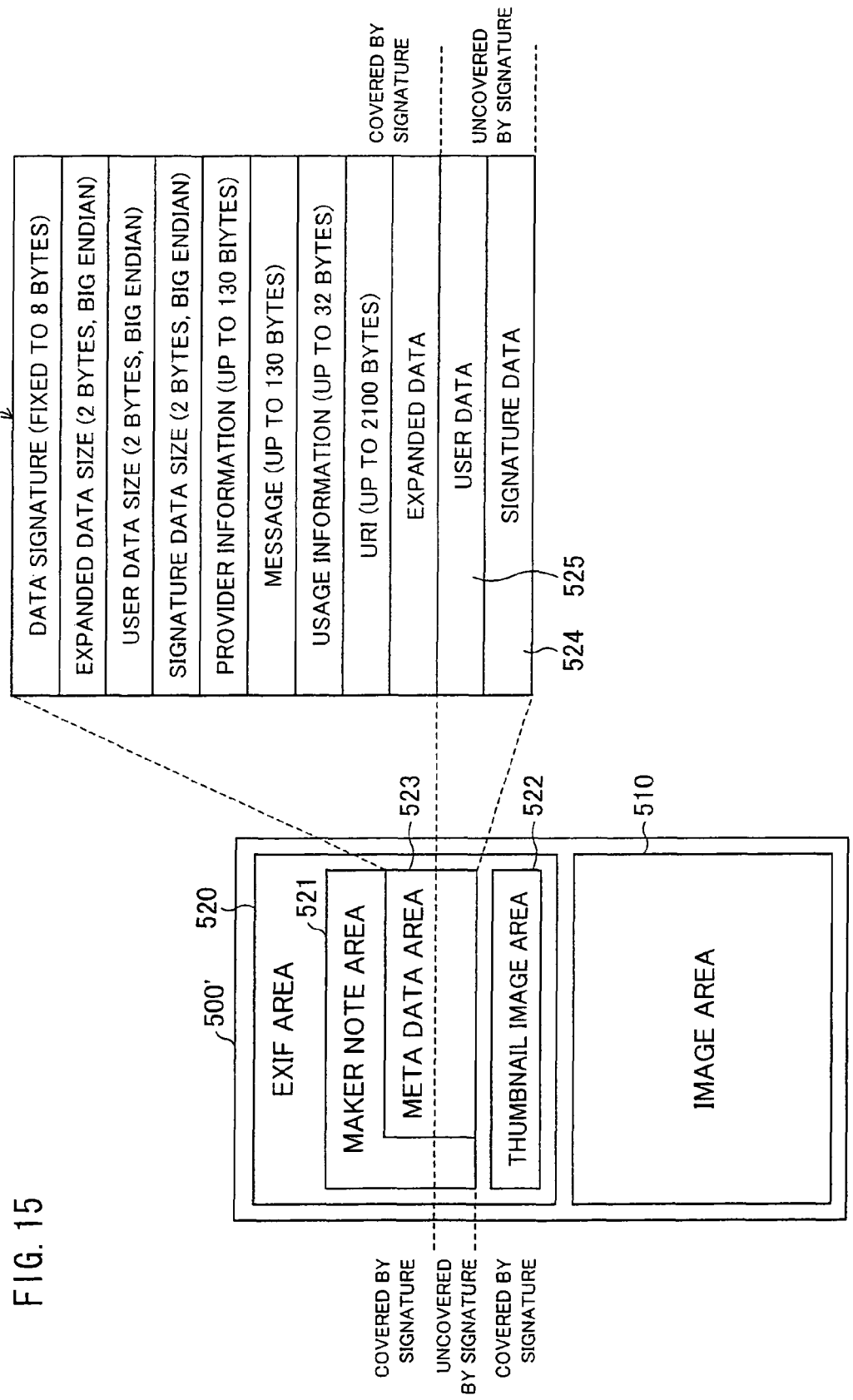
FIG. 15, showing the embodiment of the present invention, is a data structure diagram illustrating an example of a structure of an operation image data set with digital signature.

Next, with reference to FIG. 15, the following description explains a data structure of the operation image data set 500' with digital signature which can be used to enhance the reliability of the operation image data set.

FIG. 15 is a data structure diagram illustrating an example of an arrangement of the operation image data set 500' with digital signature. As illustrated in FIG. 15, a meta data area 523 is provided in a vacant area located in the end of the maker note area 521. Further, a signature data area 524 for storing therein the digital signature is provided in the end of the meta data area 523, and a user data area 525 is provided right before the signature data area 524. The digital signature stored in the signature data area 524 is a digital signature for information stored in an area other than the signature data area 524 and the user data area 525 in the operation image data set 500' with digital signature (hereinafter, such information is referred to also as "signature target data").

Generally, an image data set allows for visual confirmation, and greater visual effect can be realized with a larger data size. While, the operation image data set 500 allows an icon image to be visually confirmed by the user, and it is important not to give any stress to the user at the time when the mobile phone terminal 200 obtains the operation image data set 500, and it is necessary to determine a data size and a format with this point taken into consideration. Particularly, in case of using the mobile phone terminal 200 as a transmission terminal for transmitting an operation image data set to the television 100, it is necessary to take into consideration: such a condition that a display image resolution of the mobile phone terminal 200 is about QVGA; such a condition that a communication speed of the mobile phone terminal 200 is limited; and such a condition that the communication cost is burden for the user. Further, in an image data communication service of a part of a mobile phone network, there is a case where an image data communication server converts an image data set whose data size exceeds a predetermined value and provides the converted data to the user. For the foregoing reason, it may be optimal to set an upper limit of the data size of the operation image data set 500 to 10 KB. An example of a format which allows a data size of the operation image data set 500 to be less than the upper limit is a format in which the resolution of the image data set is QVGA or a format in which the thumbnail image area is not used.

Further, as illustrated in FIG. 15, the operation image data set 500' may include the user data area 525 storing therein a user data set. The user data set stored in the user data area 525 is restricted by a digital signature, so that the user data can be rewritten without losing the validity of the operation image data set 500', and the user data set can be added or edited by a person other than the creator of the operation image data set 500' at any time before the operation image data set 500' is received. For example, in case where the operation device for operating the television 100 is constituted of the mobile phone terminal 200 or a personal computer, the user data may be data that the user inputs via a user interface of the operation device. Examples of information stored in the operation image data set 500' as the user data set include: a mail address of a mobile phone; a comment associated to an operation image data set inputted by the user; and the like. Note that, in order to facilitate a process for adding a digital signature or a process for extracting a digital signature, it is preferable to position the user data area 525 right before or right after the signature data area 524 for storing therein the digital signature.

The meta data area 523 may include not only the aforementioned signature data area 524 and user data area 525 but also an area for storing therein information sets of FIG. 15. The information sets included in the meta data area 523 are described as follows.

A data signature is information indicating that data is in an operation image data format. Also, version information is included in the data signature. The data signature is described as follows: "EMAPV100": Embedded Meta-data for affixing on Picture Version 1.00.

An expanded data size is information indicative of a size of an expanded data area. A user data size is information indicative of a size of the user data area 525. A signature data size is information indicative of a size of the signature data area 524.

Provider information is a UTF-8 text sequence terminated with "¥0" and is indicative of a provider. A message is a UTF-8 text sequence terminated with "¥0" and is indicative of an arbitrary message. It is preferable that the television 100 can display first 16 or more letters of the provider information and/or the message.

Usage information is a UTF-8 text sequence terminated with "¥0". How to use the usage information depends on specifications of the television 100 but can be used to select an application to be started up. UR1 is a text sequence terminated with "¥0" and is indicative of data which should be obtained by the television 100.

The expanded data is any binary data. In order to support the expanded data, it is preferable that the television 100 is provided so as to treat expanded data of at least 2048 bytes. In the expanded data, a part exceeding 2048 bytes may be unprocessed by the television 100.

A user data set is an arbitrary binary data set. In order to support the user data set, it is preferable that the television 100 can treat a user data set of at least 2048 bytes.

In the user data set, a part exceeding 2048 bytes may be unprocessed by the television 100. The expanded data set and the user data set are different from each other in that the digital signature is not attached to the expanded data set but the digital signature is attached to the user data set. The signature data set is digital signature and is in conformity to pkcs#7/DER. Not only the digital signature but also an arbitrary certificate of authentication chain other than a route certificate can be included in the signature data set. A certificate (intermediate certificate) other than the route certificate is included in the signature data set, and the route certificate is stored into the television 100, thereby judging the validity of the digital signature without accessing the Internet. Such a data structure makes it possible to reduce time taken to judge the digital signature. Further, the data structure is effective also in transmitting operation information, whose operation image data set is irrelevant to the Internet, e.g., in case of presetting to record a program. Even in case where the television 100 is not connected to the Internet, it is possible to enhance the reliability by judging the digital signature.

Figure 23:
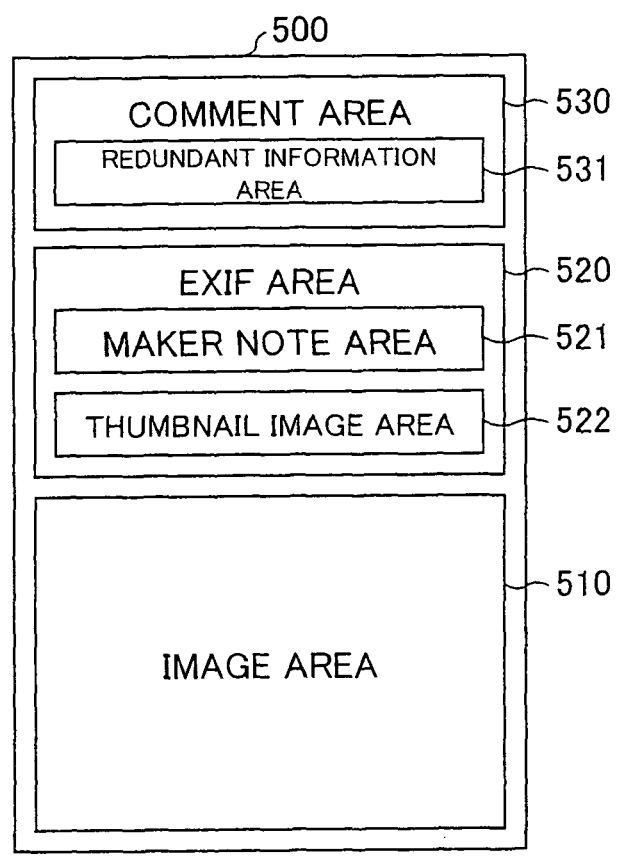
FIG. 23, showing the embodiment of the present invention, is a data structure diagram illustrating a data structure of an image data set used to operate the image data receiving device (television).

Further, in order to reduce a volume of the image data set, there is a communication path for deleting an EIF area which is not required in displaying an image. In order to make it possible to retrieve process specifying information of the image data receiving device (television) also in case where the EXIF area is deleted, it is possible to embed information, serving as a sub set of the process specifying information stored in the EXIF area, e.g., only URI of FIG. 15, in an area other than the EXIF area, e.g., in a JPEG comment area, as redundant information. In order to indicate that the data set of the comment area is redundant information of the process specifying information, it is preferable to add a data signature as in FIG. 15. For example, the digital signature and a termination text are added to URI "http://www.sharp.co.jp", and data "ELAP100http://www.sharp.co.jp¥0" is stored in the comment area. In this case, the data structure is as illustrated in FIG. 23. This data structure is different from the data structure of FIG. 3 in that the comment area 530 is provided with a redundant information area 531 which allows URI to be embedded therein as redundant information.

Next, with reference to FIG. 16 to FIG. 18, the television 100 corresponding to the operation image data set with digital signature is described as follows.

Figure 16:
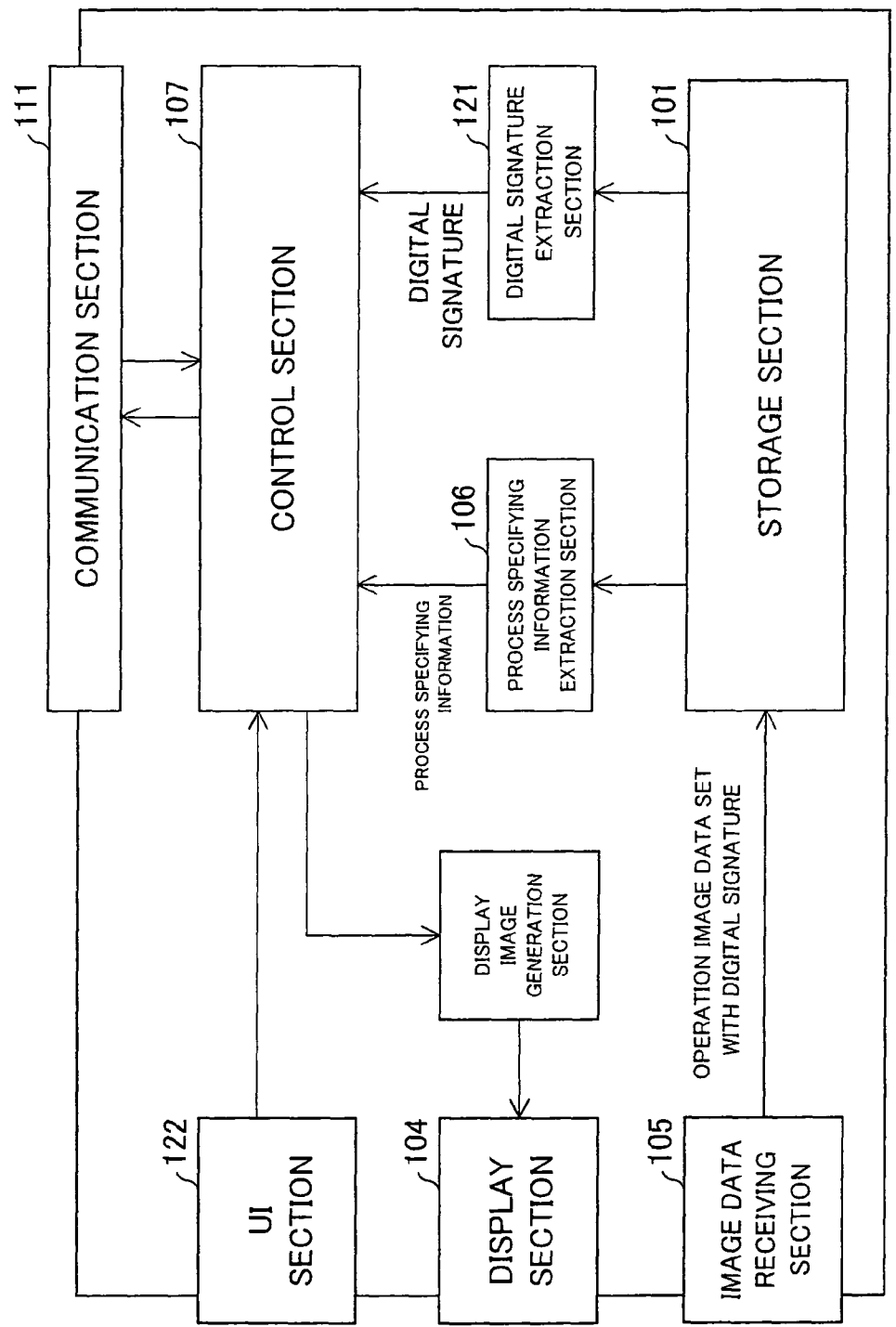
FIG. 16, showing the embodiment of the present invention, is a block diagram illustrating an example of an arrangement of an image data receiving device (television) corresponding to the operation image data set with digital signature.

FIG. 16 is a block diagram illustrating an example of an arrangement of the television 100 corresponding to the operation image data set with digital signature.

In addition to the arrangement of the television 100 of FIG. 9, the television 100 of FIG. 16 includes: a digital signature extraction section 121 for extracting a digital signature from an operation image data set with digital signature which is stored in the storage section 101; and a UI section 122 for detecting a user operation. Note that, in order to correspond to the user data set, the television 100 may further include a user data extraction section (not shown) for extracting a user data set from the operation image data set.

Figure 17:
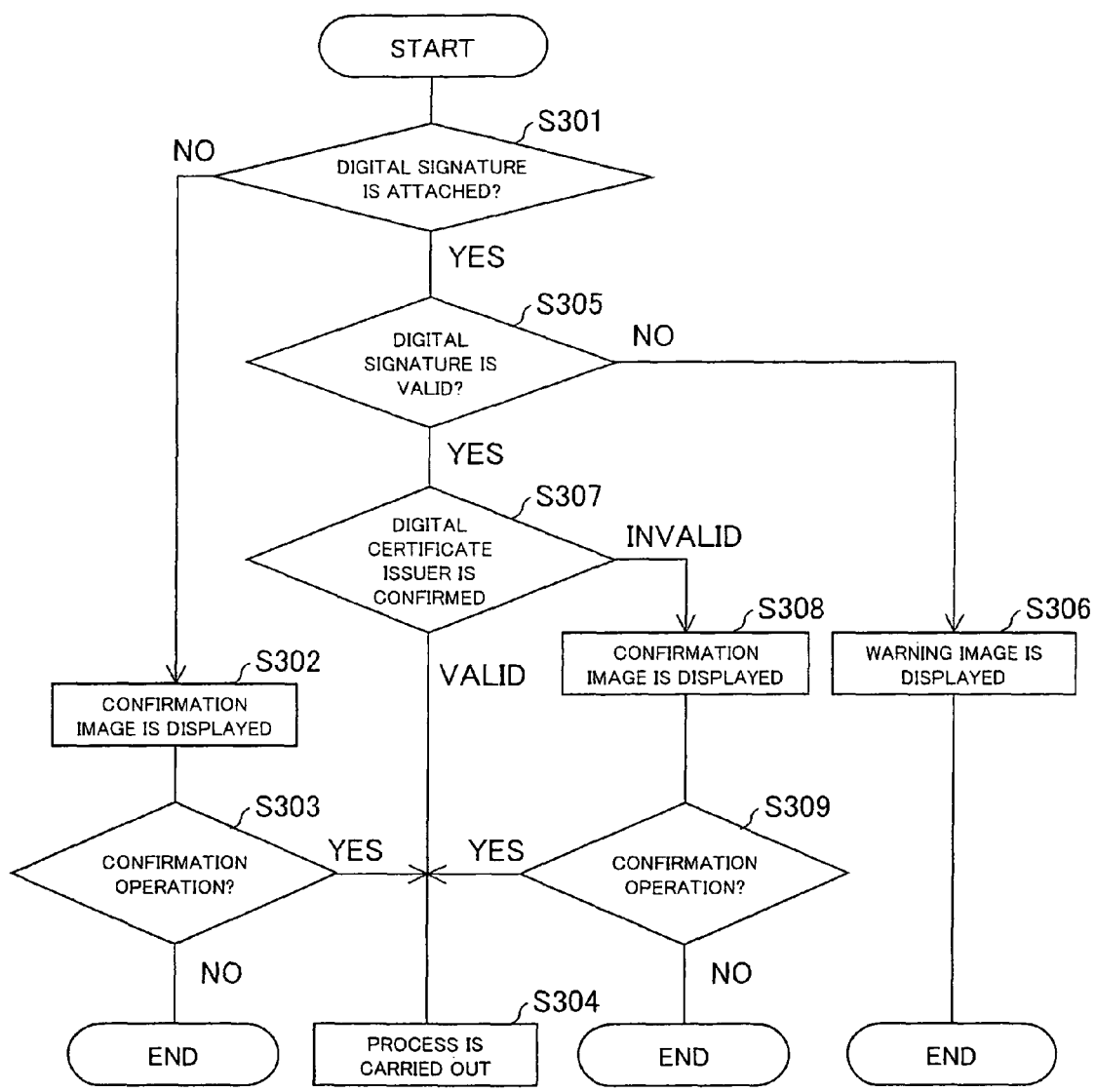
FIG. 17, showing the embodiment of the present invention, is a flowchart illustrating a flow of processes carried out by the image data receiving device (television) with respect to the operation image data set with digital signature.

FIG. 17 is a flowchart illustrating a flow of processes carried out by the television 100 with respect to the operation image data set with digital signature. FIG. 18 illustrates a display image displayed by the television 100 in the processes of FIG. 17.

As illustrated in FIG. 17, when the operation image data set is stored in the storage section 101, the control section 107 determines whether or not a digital signature is included in the operation image data set stored in the storage section 101 (S301). If the digital signature is not included (S301: No), the display image generation section 112 causes the display section 104 to display a confirmation image for inquiring the user about whether or not to carry out a process based on the operation image data set having no digital signature (S302). The UI section 122 detects an operation inputted by the user and notifies a detection result to the control section 107. FIG. 18(*a*) illustrates an example of an arrangement of the confirmation image displayed in S302.

In case where the UI section 122 detects a predetermined user operation which permits execution of the process based on the operation image data set having no digital signature (S303: Yes), the control section 107 carries out the process specified by the process specifying information stored in the operation image data set (S304). While, in case where the UI section 122 detects a predetermined user operation which refuses execution of the process based on the operation image data set having no digital signature (S303: No), the control section 107 ends a series of processes without carrying out the process specified by the process specifying information stored in the operation image data set.

In case where a digital signature is included in the operation image data set stored in the storage section 101 (S301: Yes), the control section 107 judges whether or not the digital signature extracted by the digital signature extraction section 121 is valid for a target data set of the operation image data set by using a public key stored in a digital certificate (S305). In case where the digital signature is invalid (S305: No), the display image generation section 112 causes the display section 104 to display a warning image which warns the user (S306) and ends a series of processes without carrying out the process specified by the process specifying information included in the operation image data set. FIG. 18(*b*) illustrates an example of an arrangement of the warning image displayed in S306.

While, in case where the digital signature is invalid (S305: Yes), the control section 107 determines whether an issuer of the digital certificate storing the public key therein is a highly reliable site or not (S307). In order to realize this determination, a list of highly reliable sites is stored in the storage section in advance and whether or not the issuer of the digital certificate is a site included in the list is determined.

In case where the issuer of the digital certificate is a reliable site (S307: Reliable), the control section 107 carries out the process specified by the process specifying information stored in the operation image data (S304). While, in case where the issuer of the digital certificate is not a reliable site (S307: No), the display image generation section 112 causes the display section 104 to display, as illustrated in FIG. 18(*c*), a confirmation image for inquiring the user about whether or not to carry out the process based on the operation image data set (S308). It is preferable that the confirmation image displayed in S308 is such a display image that, as illustrated in FIG. 18(c), a confirmation message such as "Execute operation?" is displayed in combination with CN information (information about a signer and a certificate issuer) included in the digital signature.

In case where the UI section 122 detects a predetermined user operation which permits execution of the process based on the operation image data set with the confirmation image of FIG. 18(c) displayed (S309: Yes), the control section 107 carries out the process specified by the process specifying information stored in the operation image data set (S304). While, in case where the UI section 122 detects a predetermined user operation which refuses execution of the process based on the operation image data set (S309: No), the control section 107 ends a series of processes without carrying out the process specified by the process specifying information stored in the operation image data set.

Note that, the control section 107 may be arranged so that: in case where it is determined that the digital signature is valid (S305: Yes), the control section 107 switches between immediate execution of the process specified by the process specifying information and execution of the process after displaying the confirmation image, in accordance with a signer (content creator) of the digital signature. In this case, a table indicative of the signer of the digital signature and a process corresponding thereto is stored in the storage section 101, and a process may be determined with reference to the table after determining whether there is any digital signature or not.

Further, FIG. 17 illustrates an example of a series of favorable processes in case where a public key used for the television 100 to judge the digital signature is stored in the digital certificate (public key certificate), and the process actually carried out by the television 100 is not limited to this. For example, in case where the television 100 judges the digital signature by using a public key which is not stored in the digital certificate, the steps S307 to S309 may be omitted.

Further, the television 100 may be arranged so that: in FIG. 18(a) and FIG. 18(c), selection of "Yes" and "No" is not carried out, but a process corresponding to "Yes" is carried out in case where the same operation image data set is received again, and a process corresponding to "No" is carried out in case where no data set is received for a while (about 10 seconds for example).

Figure 19:
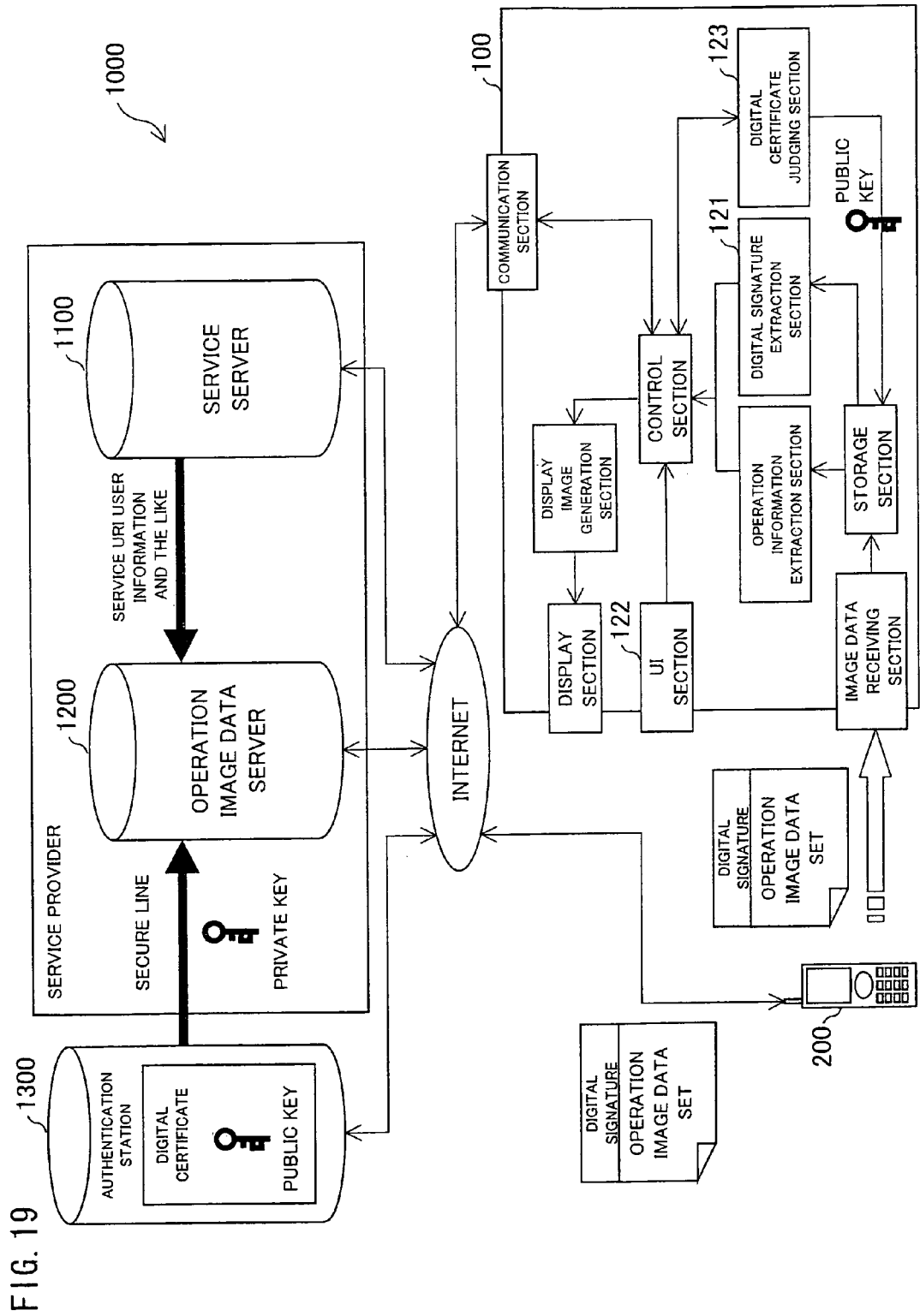
FIG. 19, showing the embodiment of the present invention, is a system structure diagram schematically illustrating a network service system using a framework of a public key infrastructure.

Next, with reference to FIG. 19, the following description explains an example of a network service system using the operation image data set with digital signature.

FIG. 19 is a system arrangement diagram schematically illustrating a network service system 1000 using a frame of a public key infrastruction.

As illustrated in FIG. 19, the network service system 1000 includes: a service server 1100 and an operation image data server 1200 which are managed by a service provider administrating a network service; a television 100 of a user using the network service; and a mobile phone terminal 200 used for the user to operate the television 100.

The operation image data server 1200 generates an operation image data set with digital signature in which URI for specifying a resource managed by the service server 1100 is embedded as process specifying information, and provides the generated operation image data set with digital signature to the mobile phone terminal 200 via the Internet. In case of such service that an operation image data set is customized for each user, the operation image data server 1200 generates an operation image data set for each user and generates a digital signature for the generated operation image data set so as to add the generated digital signature to the generated operation image data set.

The user of the television 100 uses the mobile phone terminal 200 so as to obtain the operation image data set with digital signature which has been generated by the operation image data server 1200, and then the user transmits an operation image data set obtained after confirming an icon image to the television 100. The television 100 judges validity of the digital signature stored in the received operation image data set, and if the digital signature is valid, the television 100 obtains a resource indicated by URI embedded as process specifying information from the service server 1100.

The television 100 constituting the network service system 1000 has not only a digital signature judging function for judging a digital signature but also a digital certificate judging function for judging a digital certificate. A digital certificate judging section 123 of the television 100 serves as the digital certificate judging function. An arrangement of such a television 100 is the same as in a client of an e-mail system using S/MIME. As a result, the television 100 obtains a public key with digital certificate via a network and uses the public key after judging reliability of the digital certificate.

Note that, FIG. 19 illustrates an arrangement in which the operation image data server 1200 and the television 100 respectively obtain the private key and the public key generated by an authentication station 1300, but the network service system 1000 is not limited to this arrangement. For example, it may be so arranged that: the operation image data server 1200 generates the private key and the public key, and the generated public key is provided to the television 100. Further, it may be so arranged that a public key corresponding to a private key used for the operation image data server 1200 to generate a digital signature is stored in the television 100 in advance. In the arrangement in which the television 100 obtains the public key via a network, it is preferable that the public key is embedded in a route certificate so as to guarantee the reliability of the public key.

Note that, this network service system 1000 provides the operation image data set having URI as process specifying information to the user, but the network service system 1000 is expected to exhibit the same effect also in case of providing to the user the operation image data set in which process specifying information for specifying a process other than access to URI is embedded.

An icon image stored in the operation image data set can be used to display a message from the television 100 to the user. Conventionally, each of various devices adopts a user interface which displays an icon for notifying that it takes some time to carry out a process. However, such an icon indicative of a sand clock or the like is an image which has been provided in the device in advance and fails to notify the user of a process which requires some time to carry out. In contrast, the television 100 according to the present invention uses the icon image embedded in the operation image data set, so that it is possible to realize a user interface which clearly notify the user of a process which requires some time to carry out.

FIG. 20 illustrates an example of a message displayed in the television 100.

FIG. 20(a) illustrates a message display dialogue displayed by the television 100 in receiving operation image data set storing therein process specifying information indicative of an instruction to preset to record a program. As illustrated in FIG. 20(a), (i) an icon image which allows the content of the target program to be imagined and (ii) a message text sequence (herein, "Saturday Morning Theater . . . Recoding is preset") embedded in the operation image data set are displayed with them embedded in the message display dialogue, thereby more specifically indicating the content of the process.

FIG. 20(b) illustrates a message display dialogue displayed by the television 100 in receiving an operation image data set storing therein process specifying information indicative of an instruction to access a network album. As illustrated in FIG. 20(b), (I) an icon image which allows the content of the target album to be imagined and (II) a message text sequence (herein, "Net TV Album . . . Reproduce") embedded in the operation image data set are displayed with them embedded in the message display dialogue, thereby specifically indicating the content of the process.

Upon receiving the operation image data set, the television 100 starts a process (presets to record a program or accesses the network album) specified by the process specifying information in the same manner as in FIG. 1 and FIG. 7. At the same time, the television 100 uses the decoding section 102 so as to develop the icon image stored in the operation image data set and uses the image processing section 103 (display control means) so as to output the developed icon image and the message text sequence in the display section 104. Due to such processes, the user having transmitted the operation image data set to the television 100 can be immediately notified of the icon image and the message in the dialogue as a response, so that operationality of the television 100 is improved. Note that, the icon image displayed in the dialogue is an image data set stored in the operation image data set. Further, the message is a text sequence stored in the same operation image data. An example thereof is a text sequence stored in a message field of a meta data area 523 of the JPEG data (operation image data) 500' of FIG. 15.

Note that, the icon image is displayed with it scaled up or down depending on a size or a design of the display section 104. Alternatively, it may be so arranged that only an icon is displayed without displaying any message.

The foregoing description explained the arrangement in which the process specified by the process specifying information stored in the received operation image data set is immediately carried out upon receiving the operation image data set. However, the television 100 may be arranged so that: the received operation image data set is accumulated, and the process specified by the process specifying information stored in the received operation image data set is carried out also subsequently.

Figure 21:
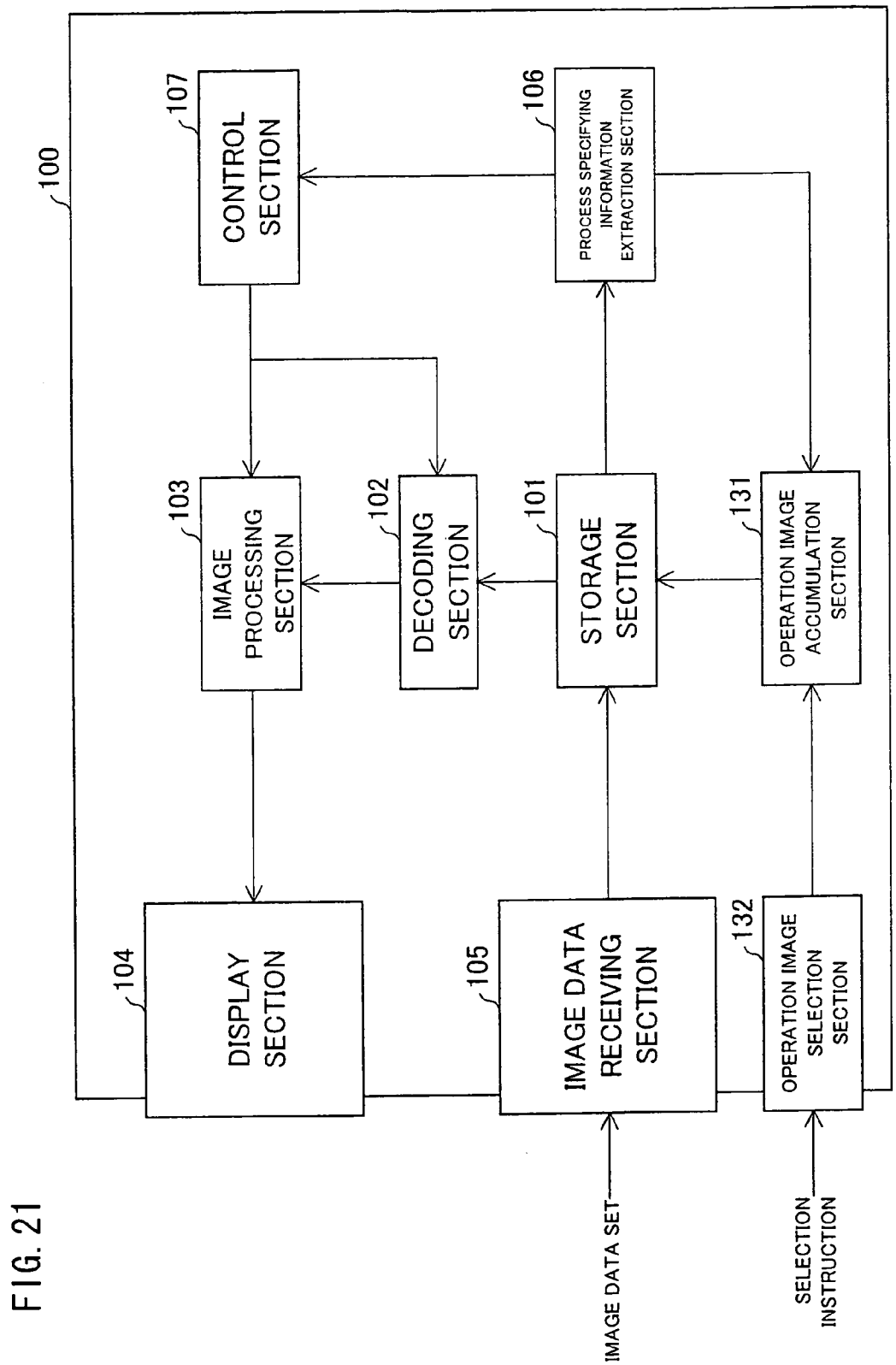
FIG. 21, showing the embodiment of the present invention, is a block diagram illustrating an example of an arrangement of an image data receiving device (television) which can accumulate operation image data sets.

FIG. 21 is a block diagram illustrating an arrangement of the television 100 which includes: an operation image data accumulation section 131 for accumulating the received operation image data set; and an operation image data selection section 132 for selecting an operation image data set, from an operation image data set group accumulated in the operation image data accumulation section 131, in accordance with a user operation. Further, FIG. 22 illustrates an example of a user interface (display image) that the television 100 displays in the display section 104 in selecting an operation image data set.

The television 100 of FIG. 21 is arranged so that: the process specifying information extraction section 106 extracts process specifying information from the received operation image data set, the extracted process specifying information is transmitted to the control section 107, and a process specified by the process specifying information is carried out, and an image data set thereof is reserved in the operation image data accumulation section 131. That is, the process specifying information stored in the image data set is used to specify a process which should be carried out by the television 100 and to determine whether or not to reserve the image data set in the operation image data accumulation section 131 (the television 100 reserves the image data set in the operation image data accumulation section 131 if the process specifying information is stored, and the television 100 does not reserve the image data set if the process specifying information is not stored). Due to the arrangement, the television 100 can accumulate the received operation image data set in the operation image data accumulation section 131.

Further, the television 100 is arranged so that it is possible to display the user interface of FIG. 22 in the display section 104 at any time. In the user interface, there are listed the icon images and the message text sequences which are stored in the operation image data set accumulated in the operation image data accumulation section 131, and the user can select a desired operation image data set from the list. In accordance with the user operation, the operation image data selection section 132 selects an operation image data set from the operation image data set group accumulated in the operation image data accumulation section 131. The operation image data set selected by the operation image data selection section 132 is transmitted to the process specifying information extraction section 106 via the storage section 101. The process specifying information extraction section 106 extracts process specifying information from the selected operation image data set and passes the extracted process specifying information to the control section 107. As a result, if the user selects an operation image data set from the list of FIG. 22, a process specified by the process specifying information stored in the selected operation image data set is carried out.

Note that, in the user interface of FIG. 22, a scroll bar displayed on the right side shows that an operation image data sets other than the displayed two operation image data sets are accumulated. Further, a downward scroll mark indicates that a further below operation image data set can be displayed in the screen by pushing the down button, so that this downward scroll mark is displayed in a manner different from a general display manner, for example, in such manner that the downward scroll mark is daubed. By arranging the user interface in this manner, it is possible for the user to easily select a desired operation image data set even in case where a large number of (herein, three or more) operation image data sets are accumulated in the operation image data accumulation section 131. An icon image of the operation image data set is essential in constituting the user interface which is easy for the user to handle as illustrated in FIG. 22.

Note that, the operation image data set itself does not serve as a remote control signal, but it is possible to add to the television 1 such an operation mode that the operation image data set is merely accumulated without immediately carrying out the process specified by the process specifying information in case where the operation image data set is received.

(Operation Device)

Next, the operation device 200 for operating the television 200, that is, the mobile phone terminal 200 is described as follows.

Figure 10:
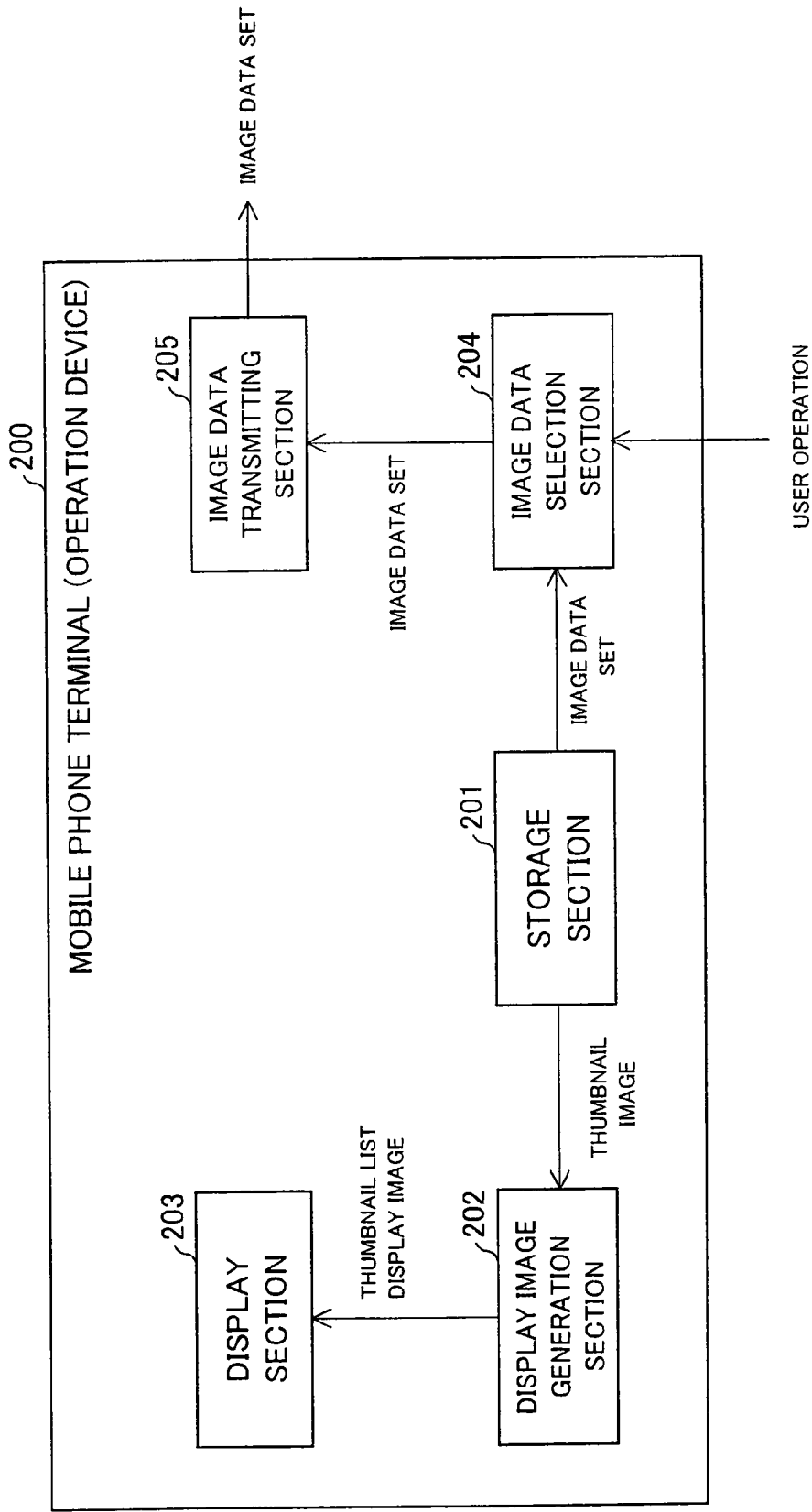
FIG. 10, showing the embodiment of the present invention, is a block diagram illustrating essential parts of an operation device (mobile phone terminal).

FIG. 10 is a block diagram illustrating essential parts of the mobile phone terminal 200. As illustrated in FIG. 10, the mobile phone terminal 200 includes: a storage section (image data storage means) 201; a display image generation section (image displaying means) 202; a display section 203; an image data selection section (image data selecting means) 204; and an image data transmitting section (image data transmitting means) 205.

The storage section 201 is means for storing an image data set therein and is constituted of RAM for example. The display image generation section 202 is means for generating an image of the image data set stored in the storage section 201, particularly, a thumbnail list display image for displaying a list of thumbnail images. The display section 203 is means for displaying the thumbnail list display image generated by the display image generation section 202 and is constituted of a liquid crystal display panel for example.

The image data selection section 204 is means for selecting, from an image data set group stored in the storage section 201, an image data set to be transmitted to the television 100. The image data selection section 204 selects an image data set in accordance with a user operation inputted while the aforementioned thumbnail list display image is being displayed.

The image data transmitting section 205 reads out the image data set, selected by the image data selection section 204, from the storage section 201, so as to transmit the read out image data set to the television 100. More specifically, the image data transmitting section 205 includes an infrared emission section and causes the infrared emission section to transmit an infrared carrier wave containing the image data set. A protocol used for the image data transmitting section 205 to transmit the image data set is the same as a protocol used for the image data receiving section 105 of the television 100 to receive the image data set. An example of the protocol is IrSimple.

Figure 11:
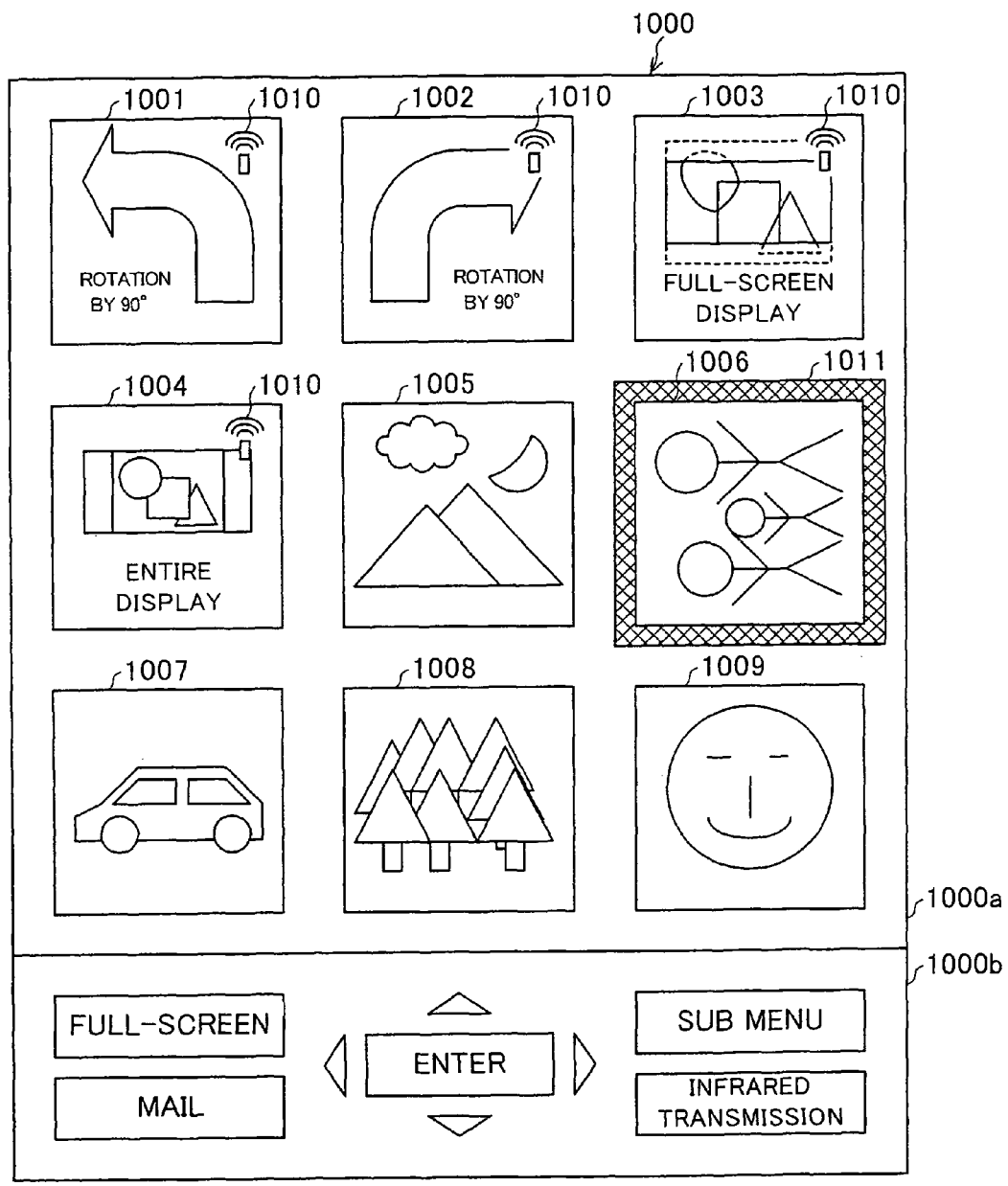
FIG. 11, showing the embodiment of the present invention, is a diagram illustrating an example of how a display image displayed in the operation device (mobile phone terminal) is arranged.

FIG. 11 illustrates an arrangement of a thumbnail list display image 1000 displayed in the display section 203 of the mobile phone terminal 200. As illustrated in FIG. 11, the thumbnail list display image 1000 includes: a thumbnail list display region 1000a for displaying a list of thumbnails; and an operation guidance display region 1000b for displaying an operation guidance.

In the thumbnail list display image 1000a, a list of thumbnails of the image data sets stored in the storage section 201 is displayed. In FIG. 11, thumbnails 1001 to 1004 of operation image data sets and thumbnails 1005 to 1009 of display image data sets are displayed.

The operation image data set storing therein not only the process specifying information but also an icon image expressing a process specified by the process specifying information. Thus, as the thumbnails 1001 to 1004 of the operation image data sets, icon images each corresponding to the process specifying information stored in each operation image data set are displayed. As a result, due to the thumbnail list display image 1000, the user can more easily recognize what process the television 100 carries out on the basis of each operation image data set.

Further, in each of the thumbnails 1001 to 1004 of the operation image data sets, a mark 1010 indicating that each operation image data set includes process specifying information is displayed so as to overlap the icon image. As a result, the user can easily identify the thumbnails 1001 to 1004 of the operation image data sets from the thumbnails 1005 to 1009 of the display image data sets.

Note that, the mark 1010 displayed in each of the thumbnails 1001 to 1004 of the operation image data sets may be written on the icon image of each operation image data set in advance or may be such that the mobile phone terminal 200 recognizes that the process specifying information is stored in the image data set and then the mark 1010 is displayed.

It is advantageous to write the mark 1010 in the icon image in advance because the image data set allows the user to recognize the operation image data set even in case of using an operation device which does not allow the user to recognize that the process specifying information is not stored in the operation image data set. While, it is advantageous to display the mark 1010 in the thumbnail image of the image data set storing therein the process specifying information because it is possible to surely notify the user whether the process specifying information is stored in the image data set.

While the display image 1000 is displayed, the user can select a desired thumbnail from the thumbnail group, displayed in the thumbnail list display region 1000a as a list, by using input means such as a cross button provided on the mobile phone terminal 200. A closing line 1011 surrounds the currently selected thumbnail. This allows the user to easily confirm a thumbnail currently selected. In FIG. 11, a thumbnail 1006 is selected.

When the user pushes an infrared transmission button with a single thumbnail selected, the image data selection section 203 selects an image data set, corresponding to the thumbnail selected at this time, as an image data set which should be transmitted. Further, the image data transmitting section 205 transmits the selected image data set to the television 100. Note that, the operation which the user should carry out to transmit an image data set is explained above, and there is no difference in the operation between the case of transmitting the operation image data set and the case of transmitting the display image data set.

Note that, FIG. 11 illustrates an example where the thumbnails 1001 to 1004 of the operation image data sets and the thumbnails 1005 to 1009 of the display image data sets are displayed in a single screen as a list, but a manner in which icon images of the operation image data sets are displayed is not limited to this. That is, it may be so arranged that: only the operation image data sets are stored in a specific folder, and image data sets (or thumbnails thereof) stored in the specific folder are displayed as a list so as to display only icon images of the operation image data sets as a list. At this time, the user may manually store the operation image data sets into the specific folder or the mobile phone terminal 200 may automatically store the operation image data sets into the specific folder.

Figure 12:
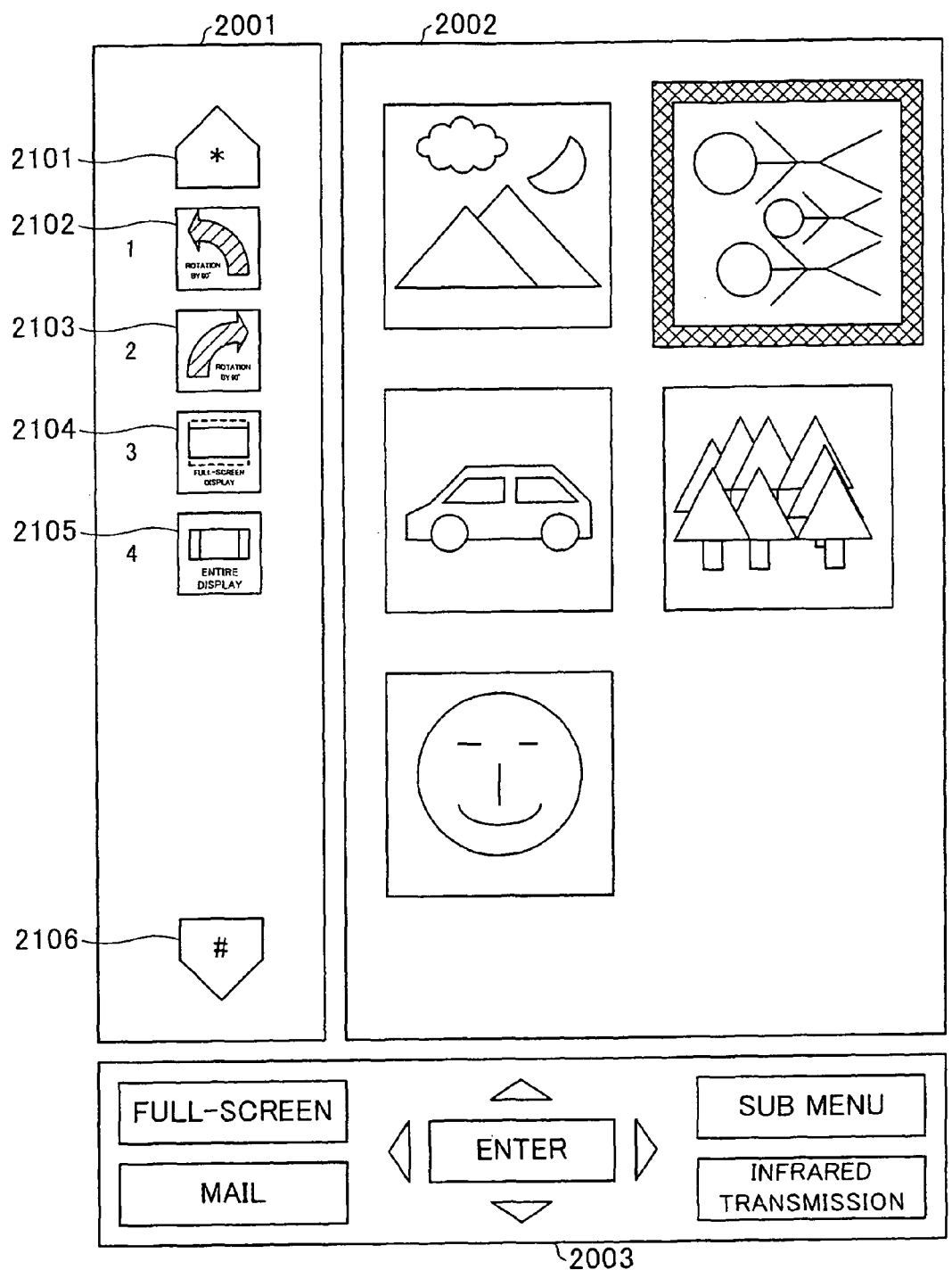
FIG. 12, showing the embodiment of the present invention, is a diagram illustrating another example of how a display image displayed in the operation device (mobile phone terminal) is arranged.

FIG. 12 illustrates an example of an arrangement of another more preferable display image 2000 displayed in the display section 203. As illustrated in FIG. 12, the display image 2000 includes: an icon image display region 2001 for displaying icon images of the operation image data sets as a list; a thumbnail list display region 2002 for displaying thumbnails of the display image data sets as a list; and an operation guidance display region 2003 for displaying an operation guidance.

Each of the icon images displayed in the icon image display region 2001 is displayed with its size smaller than a thumbnail of the display image data set. As a result, even in case where a large number of operation image data sets are stored in the storage section 201, it is possible to display a sufficient number of icon images in the icon image display region 2001 whose area size is limited. Note that, an image displayed in the icon image display region 2001 may be limited to the operation image data set stored in the image folder which is being viewed by the user or may be a list of results obtained by searching an operation image data set throughout plural folders.

Further, a page scroll-up button 2101 is displayed at the top of the icon image display region 2001, and a page scroll-down button 2106 is displayed at the bottom of the icon image display region 2001. In case where a large number of operation image data sets are stored in the storage section 201 and it is impossible to display all the icon images in the icon image display region 2001, the user pushes a # button (corresponding to "*" or "#" out of input buttons of a telephone) to switch a display of the icon image display region 2001 so that icon images which are out of sight can be displayed.

Further, on the left side of each icon image, a numeral of a numeral button (corresponding to 0 to 9 of input buttons of a telephone) corresponding to the icon image is displayed. For example, when the user pushes a button "1", the image data selection section 204 selects an operation image data set corresponding to an icon image 2102. When the user pushes a button "2", the image data selection section 204 selects an operation image data set corresponding to an icon image 2103. As a result, as long as the user pushes a numeral button corresponding to a numeral displayed on the left side of an icon image expressing a process the television 100 should carry out, it is possible to transmit, to the television 100, an operation image data set storing therein process specifying information for specifying the process.

By displaying the display image 200 of FIG. 12 instead of the thumbnail list display image 1000 used also in a conventional mobile phone terminal designed without such assumption that an operation image data set is outputted, it is possible to further improve operationality in operating the television 100 with the mobile phone terminal 200.

As described above, the mobile phone terminal 200 includes the image data transmitting section 205 serving as image data transmitting means for transmitting, to the television 100, an image data set storing therein process specifying information for specifying a process which should be carried out by the television 100.

Further, the mobile phone terminal 200 includes: the storage section 201 serving as image data storage means for storing therein a plurality of operation image data sets each storing therein process specifying information for specifying a process which should be carried out by the television 100; the display image generation section 202 serving as image displaying means for causing the display section 203 to display an icon image which is included in each of the operation image data sets stored in the storage section 201 and which expresses the process specified by the process specifying information stored in each operation image data set; and the image data selection section 204 serving as image data selecting means for selecting an image data set, which should be transmitted to the television 100, from the operation image data sets stored in the storage section 201, in accordance with a user operation inputted while the list is being displayed.

Note that, according to IrSimple (registered trademark), it is possible to transfer data by switching different transmission methods from each other. There are (i) a transmission method which covers a transfer speed ranging from 2400 bps to 115.2 kbps and (ii) a transmission method which covers a transfer speed exceeding 4 Mbps. These transmission methods are different from each other in longitudinal coverage of a communication signal. A communication method which covers a lower transfer speed results in higher longitudinal coverage. While, an image data set storing therein process specifying information is regarded mainly as an icon, so that its data size is expected to be relatively small. Thus, a communication method whose transfer speed is low and whose longitudinal coverage is high may be selected in case of transmitting an image data set storing therein process specifying information, and a communication method whose transfer speed is high and whose longitudinal coverage is low is selected in case of transmitting an image data set which does not store therein process specifying information. Such selection is automatically carried out by the image data transmitting section 205 of the mobile phone terminal 200, so that it is possible to transmit an image for control from a distant point, thereby improving the usability for the user.

(Use Case)

Lastly, with reference to FIG. 13, the following description explains a use case where a display image data set is transmitted from the mobile phone terminal 200 to the television 100 and an operation image data set is subsequently transmitted from the mobile phone terminal 200 to the television 100 so as to carry out image processing with respect to the previously transmitted display image data set in accordance with the subsequently transmitted operation image data set.

First, the user operates the mobile phone terminal 200 so as to select a display image data set to be transmitted from the mobile phone terminal 200 to the television 100. Herein, there is selected an image data set storing therein an image of 1024×768 pixels which is expressed by a thumbnail 1006. The selected image data set is transmitted to the television 100 by infrared communication.

In the television 100, when reception of the image data set is completed, the decoding section 102 determines an image size of the received image data set, and the process specifying information extraction section 106 determines whether there is process specifying information or not. The image size of the received image data set is 1024×768 pixels, and this size is larger than a predetermined threshold value, so that the decoding section 102 develops the received image data set. At this time, process specifying information is not included in the received image data set, so that the image processing section 103 carries out default image processing with respect to the developed image data and displays the image of the received image data set in the display section 104. FIG. 13(a) illustrates a display image displayed in the display section 104 of the television. As illustrated in FIG. 13(a), a photograph of the image data set transmitted from the mobile phone terminal 200 is taken with a camera slanted by 90°, so that the subject is displayed with it toppled over sideways.

Note that, as the aforementioned default image processing, an arbitrary image can be set. Herein, image processing for scaling up or down an image is set as default so as to maximize a display size of the image under such condition that the entire image is displayed in the display section 104.

Further, in case where imaging angle information indicating that the image was taken with a camera slanted by 90° is embedded in the image data set, the television 100 may automatically correct a display angle in accordance with the imaging angle information so as to display the corrected image as described above. However, it is often that an existing digital camera or mobile phone with camera fails to correctly add imaging angle information, so that a photograph may be displayed with it toppled over sideways as illustrated in FIG. 13(a).

Thus, the user operates the mobile phone terminal 200 so as to select an icon image 2103 expressing the image processing for rotating the image to the right by 90°. In response to the operation, the mobile phone terminal 200 selects an operation image data set corresponding to the selected icon image 2103 so as to transmit the selected operation image data set to the television 100.

The operation image data set corresponding to the icon image 2103 stores therein process specifying information for specifying the image processing for rotating the image to the right by 90°. Thus, the television 100 having received the operation image data set instructs the image processing section 103 to carry out the image processing for rotating the image, specified by the process specifying information, to the right by 90°. In response to the instruction, the image processing section 103 carries out the image processing for rotating the currently displayed image of the previously received image data set to the right by 90° and outputs the rotated image to the display section 104. FIG. 13(b) illustrates a display image displayed in the display section 104 at this time. The foregoing arrangement allows the photograph of FIG. 13(a) which has been toppled over sideways to be correctly displayed.

Note that, in the mobile phone terminal 200, an operation image data set stored in the storage section 201 may be stored in the storage section 201 in advance at the time of shipment or may be obtained from outside by the mobile phone terminal 200. In case of the latter, a maker of the television 100 may add the operation image data set to a mail magazine distributed to the user of the television 100 so as to distribute the operation image data set, or the user of the mobile phone terminal 200 may download the operation image data set from a website of the maker of the television 100 by using the mobile phone terminal 200.

As described above, according to the present invention, in case where the operation device obtains an image data set storing therein process specifying information from the outside, e.g., a server in the Internet, an image transmitting/receiving function and a communication protocol which are generally used to handle an image data set, e.g., a function for attaching an image to an e-mail and a function for downloading an image from a Web page are applicable to obtaining of the process specifying information.

Further, image information obtained by visualizing the stored process specifying information can be included in the image data set obtained in this manner, so that this arrangement is applicable to a general function for selecting an image data set, e.g., to selection of process specifying information aimed at an image viewer function of a mobile phone.

Embodiment 2

With reference to drawings, Embodiment 2 of the present invention is described as follows.

Figure 24:
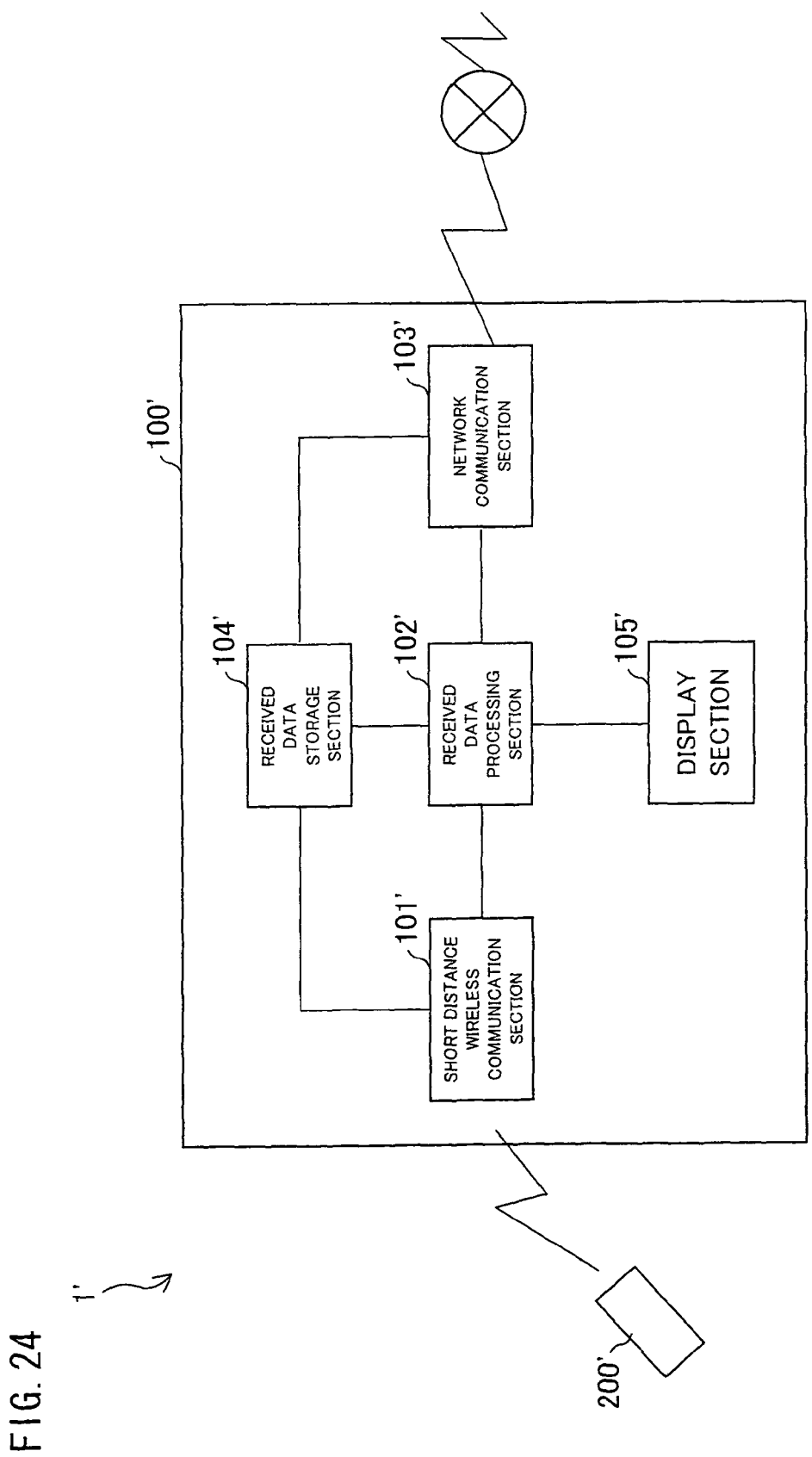
FIG. 24, showing a second embodiment of the present invention, is a block diagram illustrating an arrangement of an operation system.

FIG. 24 is a block diagram illustrating an arrangement of an operation system 1' according to the present embodiment. As illustrated in FIG. 24, the operation system 1' includes: a television (image data receiving device) 100' serving as an operated device; and a mobile phone terminal 200' serving as an operation device. The television 100' includes a short-distance wireless communication section 101', a received data processing section 102', a network communication section 103', a received data storage section 104', and a display section 105'.

The short distance wireless communication section 101' is means for receiving an image data set storing therein process specifying information from the mobile phone terminal 200'. The network communication section 103' is means for carrying out a process specified by the process specifying information stored in the image data set received by the short distance wireless communication section 101'. The received data processing section 102' is means for causing the image data set received by the short distance wireless communication section 101' to be displayed in the display section 105' and also is means for causing the display section 105' to display (i) information indicating that the short distance wireless communication section 101' is receiving the image data set and (ii) information indicating that the network communication section 103' is carrying out the process specified by the process specifying information.

In the present embodiment, examples of the process specifying information stored in the image data set received by the short distance wireless communication section 101' are two types of process specifying information. First process specifying information is indicative of an obtaining/displaying process in which a specific resource (HTML document or the like) in the Internet is obtained via a network and a content item (web page or the like) is displayed in accordance with the obtained resource. Further, second process specifying information is indicative of a transmission process in which the image data set received by the short distance wireless communication section 101' is transmitted to a specific server in the Internet. The image data set storing therein the first process specifying information is referred to as "Invitation Card" in UI so as to be amiable for the user.

Incidentally, the short distance wireless communication section 101' includes an infrared receiving section for receiving an infrared ray emitted from the mobile phone terminal 200' so as to convert the infrared ray into an electric signal, and the electric signal obtained by the infrared receiving section is measured by a predetermined protocol (IsSimpleShot for example) so as to be converted into an image data set. Thus, an operator of the mobile phone terminal 200' has to keep the infrared emission section of the mobile phone terminal 200' aimed to the television 100' until transfer of the image data set is completed.

Thus, it is preferable to arrange the television 100' so as to show, to the operator of the mobile phone terminal 200', information indicating that the image data set is being received, until the short distance wireless communication section 101' completes reception of the image data set. This arrangement allows the user to find when the operator may stop aiming the infrared emission section 100' to the television 100'.

Further, the short distance wireless communication section 101' is arranged so as to store the received image data set into the received data storage section 104'. Further, the network communication section 103' reads out the process specifying information of the image data set stored in the received data storage section 104' so as to carry out a process specified by the read out process specifying information or reads out the image data set stored in the receive data storage section 104' so as to transmit the read out image data set to the web server. Thus, the image data set received by the short distance wireless communication section 104' has to be kept in the received data storage section 104' until the network communication section 103' completes the process specified by the process specifying information (particularly, a process for transmitting the received image data set to the web server).

Thus, it is preferable that the television 100 stops a standby condition for an image data set by stopping a function of the short distance wireless communication section 101' or a similar operation until the network communication section 103' completes the process specified by the process specifying information. As a result, two or more image data sets does not have to be kept in the received data storage section 104' at the same time, so that the received data storage section 104' can be constituted of a memory having a smaller capacity, thereby reducing the cost of the television 100'.

Further, in this case, it is preferable that the television 100' shows, to the operator of the mobile phone terminal 200', information indicating that it is impossible to receive an image data set until the network communication section 103' completes the process specified by the process specifying information. As a result, it is possible to reduce such a stress of the operator of the mobile phone terminal 200 that the process specified by the process specifying information stored in the transmitted image data set is not carried out though the image data set has been transmitted.

Figure 25:
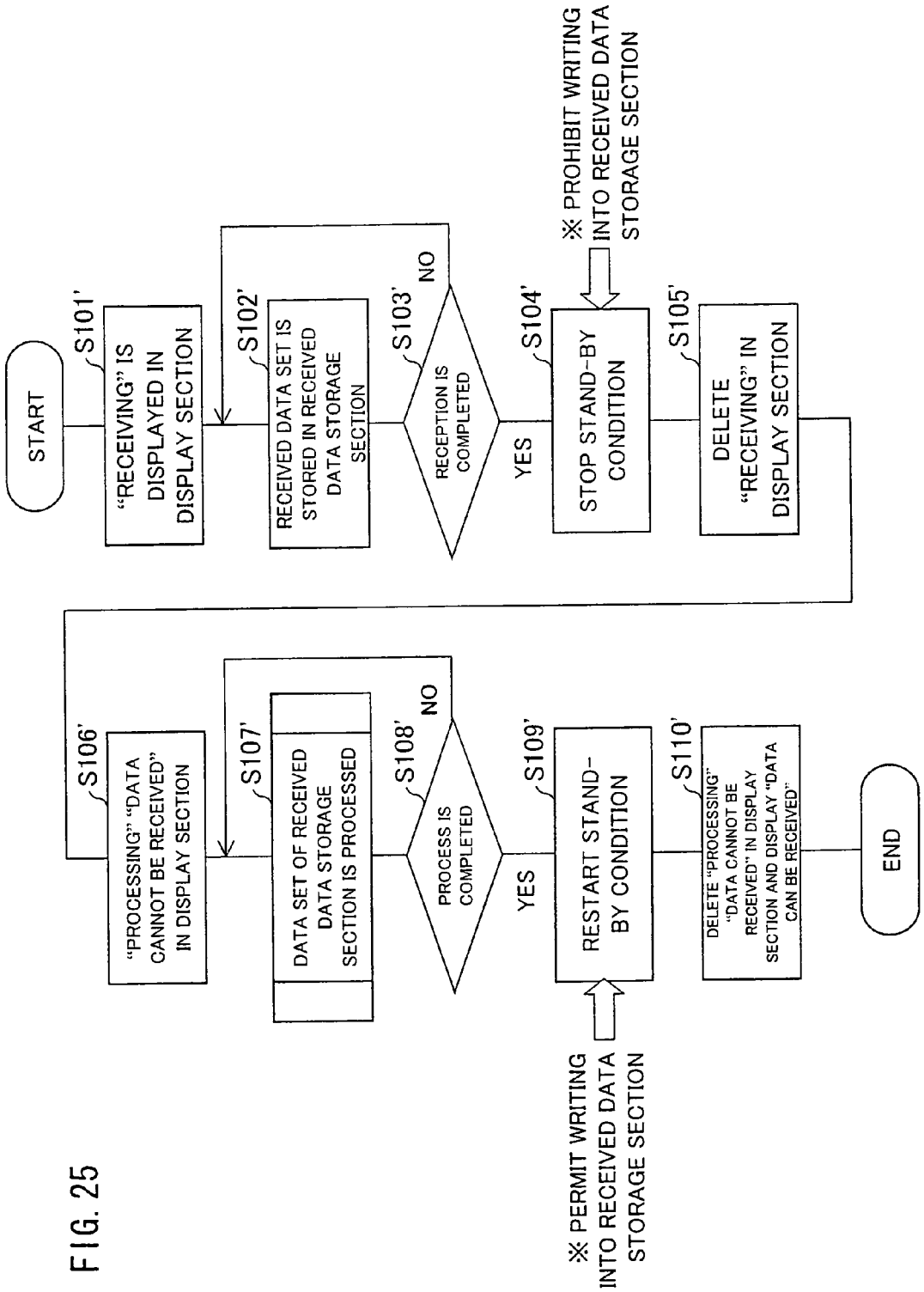
FIG. 25, showing the second embodiment of the present invention, is a flowchart illustrating a flow of processes carried out by a television 100 having received image data set.

FIG. 25 is a flowchart illustrating a flow of processes carried out by the television 100 in receiving the image data set from the mobile phone terminal 200'. The following describes the process of FIG. 25.

Figure 26:
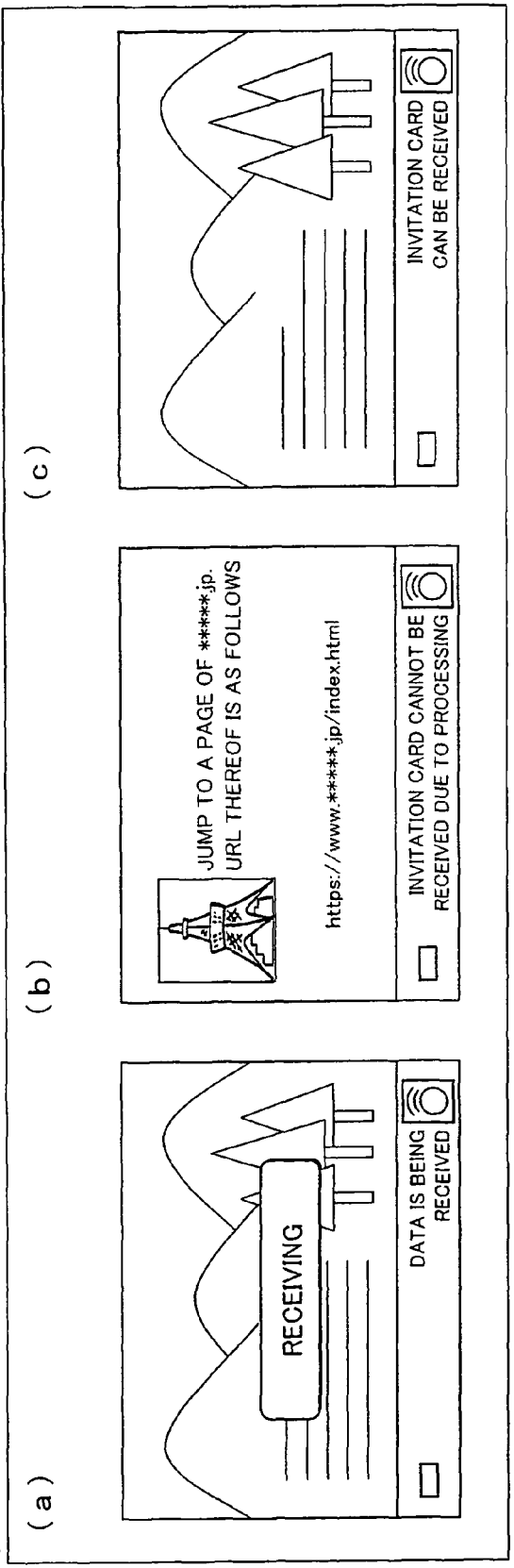
FIG. 26, showing the second embodiment, includes diagrams each illustrating a display image displayed in the television when the television receives an image data set storing therein process specifying information.

Upon starting reception of the image data set transmitted from the mobile phone terminal 200', the short distance wireless communication section 101' notifies the received data processing section 102' that the reception has bee started. In response to this notification, the received data processing section 102' displays in the display section 105' information showing that the image data set is being received (S101'). FIG. 26(a) illustrates an example of a display image displayed in the display section 105'. In the display image of FIG. 26(a), a text sequence "Receiving . . . " is displayed as the information showing that the image data set is being received.

The short distance wireless communication section 101' reserves the received image data set into the received data storage section 104' (S102'). Further, when reception of the entire image data set is completed (S103': Yes), the completion of reception is notified to the received data processing section 102'. In response to this notification, the received data processing section 102' stops the function of the short distance wireless communication section 101' (S104') and deletes from the display section 105' the information showing that the image data set is being received (S105') in order to stop the stand-by condition for new image data set.

Subsequently, the received data processing section 102' causes (i) information indicating that the process specified by the process specifying information is being carried out and (ii) information indicating that it is impossible to receive the image data set to be displayed in the display section 105 (S106'). FIG. 26(b) illustrates an example of a display image displayed in the display section 105' at this time. The display image of FIG. 26(b) displays a text sequence "The invitation card cannot be received since the process is being carried out" as information simultaneously indicating that the process specified by the process specifying information is being carried out and that the image data set cannot be received.

Subsequently, the received data processing section 102' instructs the network communication section 103' to start the process. In response to this instruction, the network communication section 103' reads out the process specifying information stored in the image data set reserved in the received data storage section 104' in S102 so as to carry out the process specified by the read out process specifying information (S107'). This process will be detailed later with reference to another drawing.

When the network communication section 103' completes the process specified by the process specifying information (S108': Yes), the received data processing section 102' starts up the function of the short distance wireless communication section 101' in order to restart the stand-by condition for a new image data set (S109').

Subsequently, the received data processing section 102' deletes, from the display section 105, (i) the information which is displayed in S106' and which indicates that the process specified by the process specifying information is being carried out and (ii) the information which indicates that a new image data set cannot be received, and the received data processing section 102' displays, in the display section 105', information which indicates that image data set can be received (S110'). FIG. 26(c) illustrates an example a display image displayed in the display section 105'. The display image illustrated in FIG. 26(c) shows a text sequence "Invitation card can be received" as the information which indicates that image data set can be received.

Figure 27:
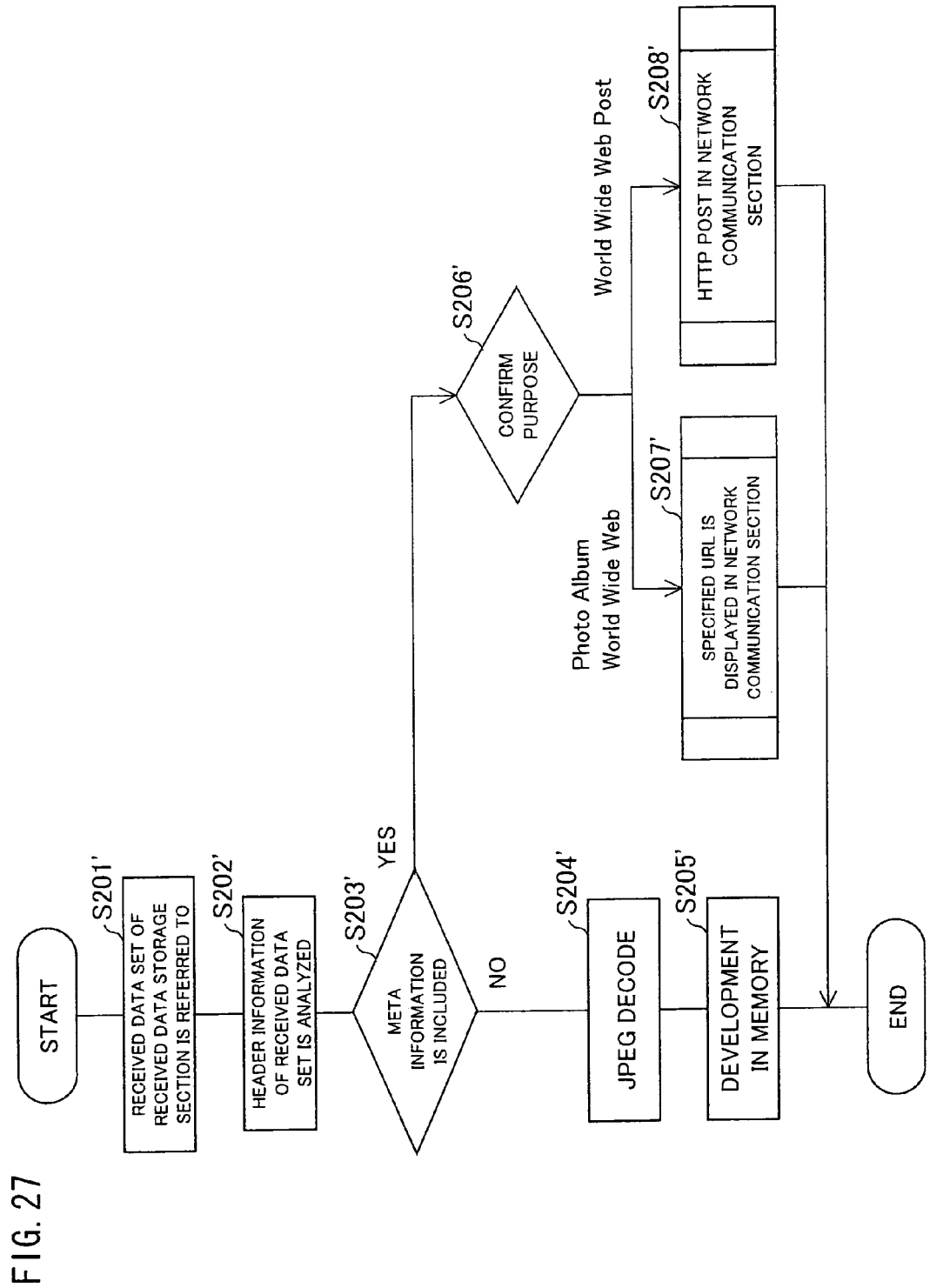
FIG. 27, showing the second embodiment, is a flowchart illustrating detail processes carried out by the television in case where the process specifying information is not stored in the received image data set and in case where the process specifying information is stored in the received image data set.

Next, with reference to FIG. 27, the step S107' included in the flowchart of FIG. 25 is detailed as follows.

First, the received data processing section 102' reads out the image data set reserved in the received data storage section 104' (hereinafter, the image data set is referred to as "received image data set") (S201') and analyzes header information of the received image data set having been read out (S202'). The received image data set is JPEG data herein, and the header information is meta information stored in an EXIF area of the JPEG data.

In case where the process specifying information is not included in the EXIF area of the received image data set as the meta information (S203': No)), the received data processing section 102' decodes the received image data set (S204') and develops the received image data set having been decoded in a memory (S205').

While, in case where the process specifying information is included in the EXIF area of the received image data set as the meta information (S203': Yes), the received image data processing section 102' instructs the network communication section 103' to carry out the process specified by the process specifying information. The network communication section 103' reads out the process specifying information from the received image data set reserved in the received image data storage section 104' and carries out a process corresponding to the process specifying information having been read out (S206' to S208').

Figure 28:
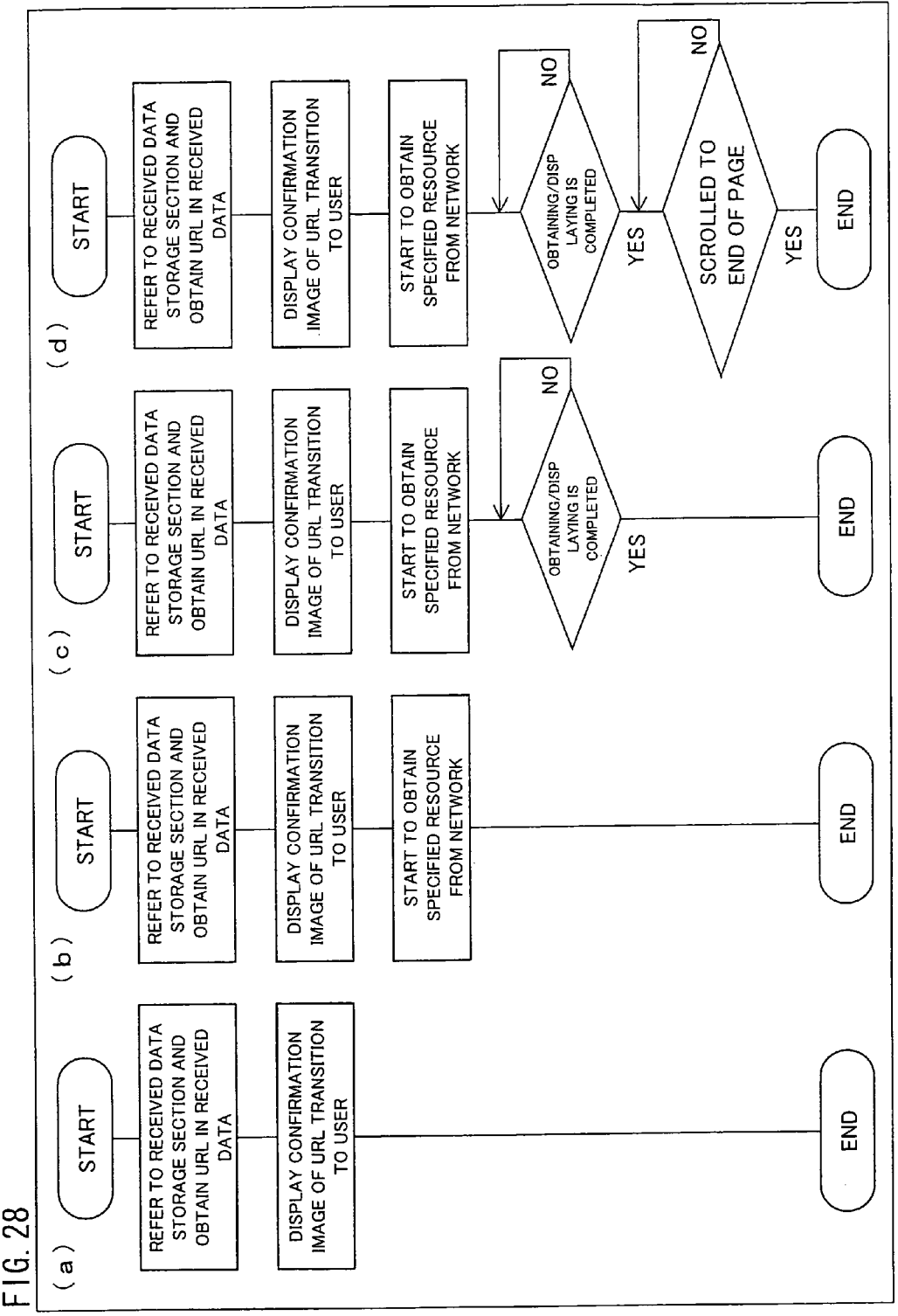
FIG. 28, showing the second embodiment of the present invention, is a flowchart illustrating an example of obtaining/displaying processes carried out by a network communication section.

Herein, FIG. 28 illustrates a specific example of a process carried out by the network communication section 103' in S207'. Note that, as to a process carried out by the network communication section 103' in S208', FIG. 30 should be referred to.

Figure 29:
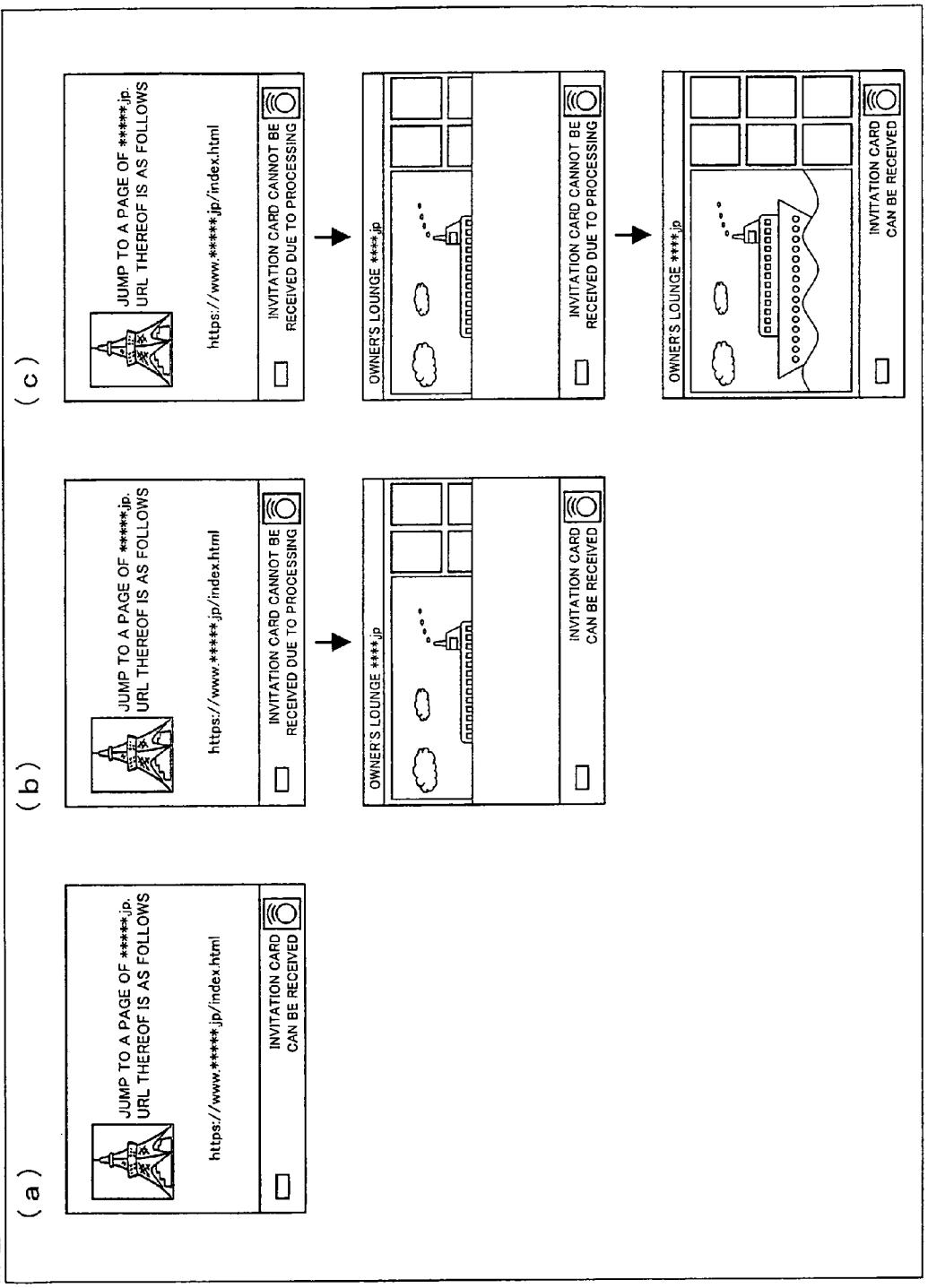
FIG. 29, showing the second embodiment of the present invention, includes diagrams each illustrating a display image displayed in the television when the network communication section carries out the obtaining/displaying processes.

FIG. 28(a) illustrates a specific example in which a confirmation image is displayed and the process is ended at the time when URL (process specifying information) is completely read out from the received image data set reserved in the received data storage section 104'. In this case, the television 100' displays the confirmation image of FIG. 29(a) and restarts the stand-by condition for a new image data set at the time when the URL is completely read out.

FIG. 28(b) illustrates a specific example in which the process is completed at the time when a resource specified by the read out URL comes to be obtained. In this case, the television 100' restarts the stand-by condition for a new image data set at the time when the specified resource comes to be obtained (see FIG. 29(b)).

FIG. 28(c) illustrates a specific example in which the process is completed at the time when display of a content item based on the specified resource is completed. In this case, the television 100' restarts the stand-by condition for a new image data set at the time when display of the specified content item is completed (see FIG. 29(c)).

FIG. 28(d) illustrates a specific example in which the process is completed at the time when all information sets included in the specified content item are completely displayed by scrolling the image to the end of the page or carrying out a similar operation. In this case, the television 100' restarts the stand-by condition for a new image data set at the time when all the information sets included in the specified content item are completely displayed. For a provider of an invitation card (received image data set), this arrangement results in such advantage that all the information sets included in the specified content item of the user of the television 100' can be surely provided.

Figure 30:
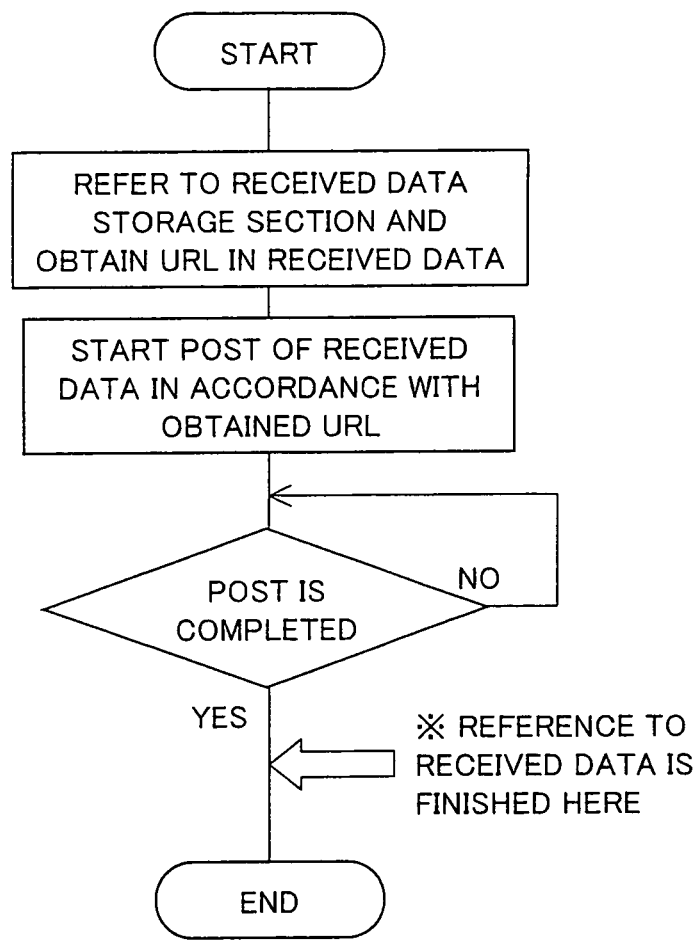
FIG. 30, showing the second embodiment of the present invention, is a flowchart illustrating an example of transmission processes carried out by the network communication section.
Figure 31:
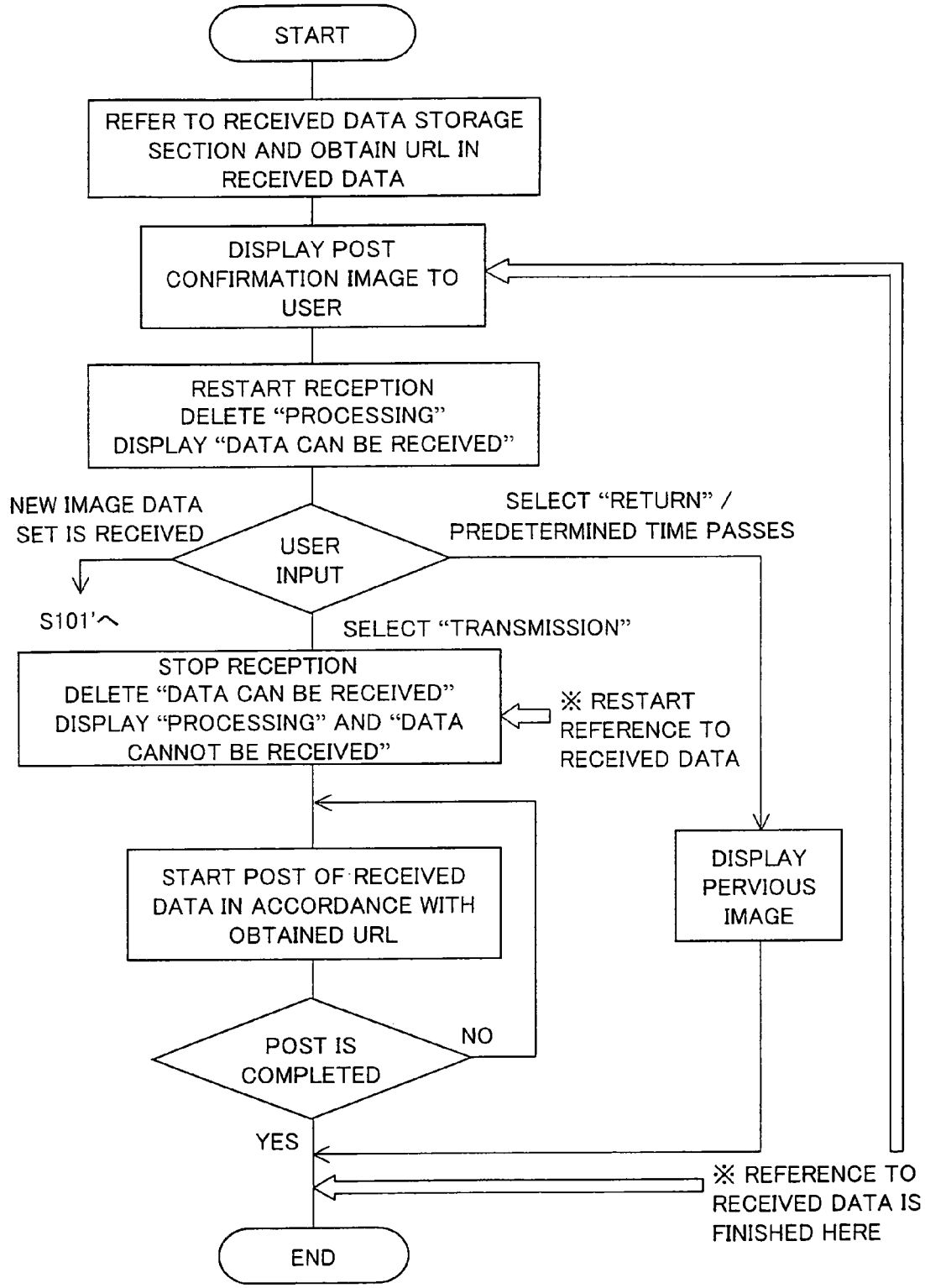
FIG. 31, showing the second embodiment of the present invention, is a flowchart illustrating a modification example of the transmission processes carried out by the network communication section.
Figure 32:
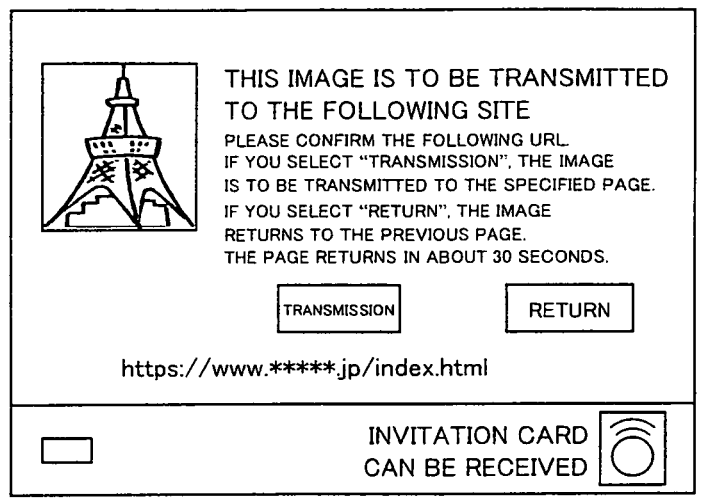
FIG. 32, showing the second embodiment of the present invention, is a diagram illustrating an image displayed in the television when the television receives image data storing therein process specifying information for specifying the transmission process.

Note that, it may be so arranged that the confirmation image of FIG. 31 is displayed also in S208'. This confirmation image allows the user to cancel transmission of an image data set as necessary. In case of displaying the confirmation image, the flowchart of FIG. 30 is changed as in FIG. 32 for example.

(Additional Description)

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each of blocks which are provided on the image data receiving device (television) 100 is realized by hardware logic or may be realized by software using a CPU as follows.

That is, the image data receiving device 100 includes: a CPU (central processing unit) which executes a control program realizing the functions; a ROM (read only memory) in which the program is stored; a RAM (random access memory) which develops the program; a storage device (storage medium) such as a memory in which the program and various kinds of data are stored; and the like. Further, the object of the present invention can be achieved as follows: a storage medium for computer-readably storing a program code (an execute form program, intermediate code program, or source program) of the control program of the image data receiving device 100 which is software for implementing the aforementioned functions is provided to the image data receiving device 100, and a computer (or CPU and MPU) reads out the program code stored in the storage medium so as to implement the program, thereby achieving the object of the present invention.

Examples of the storage medium which satisfies these conditions include: tapes, such as magnetic tape and cassette tape; disks including magnetic disks, such as floppy disks (registered trademark) and hard disk, and optical disks, such as CD-ROMs, magnetic optical disks (MOs), mini disks (MDs), digital video disks (DVDs), and CD-Rs; cards, such as IC card (including memory cards) and optical cards; and semiconductor memories, such as mask ROMs, EPROMs, EEPROMs, and flash ROMs.

Further, it may be so arranged that: the image data receiving device 100 is made connectable to communication networks, and the program code is supplied via the communication networks. The communication networks are not limited to a specific means. Specific examples of the communication network include Internet, intranet, extranet, LAN, ISDN, VAN, a CATV communication network, a virtual private network, a telephone line network, a mobile communication network, a satellite communication network, and the like. Further, a transmission medium constituting the communication network is not particularly limited. Specifically, it is possible to use a wired line such as a line in compliance with IEEE1394 standard, a USB line, a power line, a cable TV line, a telephone line, an ADSL line, and the like, as the transmission medium. Further, it is possible to use (i) a wireless line utilizing an infrared ray used in IrDA and a remote controller, (ii) a wireless line which is in compliance with Bluetooth standard (registered trademark) or IEEE802.11 wireless standard, and (iii) a wireless line utilizing HDR, a mobile phone network, a satellite line, a ground wave digital network, and the like, as the transmission medium. Note that, the present invention can be realized by a computer data signal which is realized by electronic transmission of the program code and which is embedded in a carrier wave.

Further, each block of the operation device (mobile phone terminal) 200 may be realized by hardware logic or may be realized by software using a CPU as in the aforementioned image data receiving device 100.

The present invention is not limited to the description of the embodiments above, but may be altered by a skilled person within the scope of the claims. An embodiment based on a proper combination of technical means disclosed in different embodiments is encompassed in the technical scope of the present invention.

As described above, an image data receiving device according to the present invention includes: receiving means for receiving, from the outside, an image data set storing therein process specifying information for specifying a process which should be carried out by the image data receiving device itself; and control means for controlling the image data receiving device itself so as to carry out the process, specified by the process specifying information stored in the image data set, upon receiving the image data set.

Further, as described above, a control method according to the present invention is a method in which an image data receiving device controls the image data receiving device itself, said control method comprising the steps of: (i) receiving, from the outside, an image data set storing therein process specifying information for specifying a process which should be carried out by the image data receiving device itself; and (ii) controlling the image data receiving device itself so as to carry out the process, specified by the process specifying information stored in the image data set, upon receiving the image data set.

While, as described above, an operation device according to the present invention operates an image data receiving device and includes image data transmitting means for transmitting, to the image data receiving device, an image data set storing therein process specifying information for specifying a process which should be carried out by the image data receiving device.

Further, as described above, an operation method according to the present invention is a method in which an operation device operates an image data receiving device, said operation method comprising the step of transmitting, to the image data receiving device, an image data set storing therein process specifying information for specifying a process which should be carried out by the image data receiving device.

Thus, by causing the operation device to transmit the image data set storing therein the process specifying information to the image data receiving device, it is possible to carry out the desired process with respect to the image data set. That is, it is possible to cause the operation device to serve as a remote controller, thereby freely operating the image data receiving device.

Further, as long as the image data receiving device has an image processing function, the image processing function can be controlled in accordance with the image data set.

That is, the image data receiving device according to the present invention may be arranged so as to further include image processing means for processing the image, wherein the control means controls the image processing means so that, when the process specifying information specifies the process carried out with respect to an image other than the image stored in the image data set, the process specified by the process specifying information is carried out.

Further, as long as the image data receiving device has a data communication function, it may be so arranged that the data communication function can be controlled in accordance with the image data set.

That is, the image data receiving device according to the present invention may be arranged so as to further include data receiving means which is different from the image data receiving means and which receives a data set from other communication device, wherein the control means controls the data receiving means so as to receive a data set specified by the process specifying information from a communication device specified by the process specifying information or a predetermined communication device.

Further, the image data receiving device according to the present invention may be arranged so as to further include data transmitting means for transmitting data to other communication device, wherein the control means controls the data transmitting means so as transmit a data set specified by the process specifying information to a communication device specified by the process specifying information or a predetermined communication device.

It is preferable to arrange the image data receiving device according to the present invention so as to further include operation signal receiving means which receives an operation signal for operating the image data receiving device from the outside and whose communication medium is an infrared ray unlike the image data receiving means.

The operation signal receiving means receives from the outside an operation signal for operating the image data receiving device itself and does not have to receive an image data set. Thus, by using a remote control protocol for example, it is possible to allow the image data receiving device to receive an operation signal emitted from the operation device away from the image data receiving device at a distance of several meters. While, the image data receiving means uses a high speed infrared communication protocol or a short distance wireless communication protocol for example, thereby allowing the image data receiving device to receive an image data set transmitted from an image data transmitting device away from the image data receiving device at a distance of about one meter.

That is, according to the arrangement, the image data receiving means for receiving at a high speed an image data set transmitted from the image data transmitting device located in the vicinity of the image data receiving device, the operation signal receiving means for receiving an operation signal emitted from an operation device located further away from the image data receiving device can respectively function.

Further, an operation device according to the present invention, which operates an image data receiving device, includes image data transmitting means for transmitting, to the image data receiving device, an image data set storing therein process specifying information for specifying a process which should be carried out by the image data receiving device, wherein the process specifying information specifies at least a process carried out with respect to an image other than an image stored in the image data set or a process other than the process carried out with respect to the image.

Further, an operation method according to the present invention is a method in which an operation device operates an image data receiving device, aid method comprising the step of transmitting, to the image data receiving device, an image data set storing therein process specifying information for specifying a process which should be carried out by the image data receiving device, wherein the process specifying information specifies at least a process carried out with respect to an image other than an image stored in the image data set or a process other than the process carried out with respect to the image.

According to the arrangement, process specifying information for specifying a process which should be carried out by the image data receiving device can be transmitted to the image data receiving device. Thus, the operation device exhibits such effect that it is possible to operate the image data receiving device by an image data set.

Note that, the operation device may be arranged so as to include: image data storage means for storing therein the image data set storing therein the process specifying information; image data obtaining means for obtaining the image data set storing therein the process specifying information; or image data generation means for generating an image data set containing an image and process specifying information for specifying a process which should be carried out by the image data receiving device.

It is preferable to arrange the operation device according to the present invention so as to further include: image data storage means for storing therein a plurality of image data sets each of which stores therein process specifying information for specifying a process to be carried out by the image data receiving device; image display means for causing a display section to display a list of images which are respectively included in the plurality of image data sets stored in the image data storage means and each of which allows the process specified by the process specifying information stored in each of the image data sets to be identified; and image data selecting means for selecting an image data set, which should be transmitted to the image data receiving device, from the image data sets, stored in the image data storage means, in accordance with a user operation received while the list is being displayed, wherein the image data transmitting means transmits the image data set, which has been selected by the image data selecting means, to the image data receiving device.

According to the arrangement, the display section displays a list of images which are respectively included in the image data sets stored in the operation device and each of which includes the process specifying information for specifying a process which should be carried out by the image data receiving device. This makes it possible to realize such effect that the user can select an image data set, to be transmitted to the image data receiving device, in accordance with the images displayed as a list.

Moreover, each of the images displayed in the display section as a list is an image which expresses a process specified by the process specifying information. This makes it possible to realize such effect that the user can easily recognize a process specified by an image data set corresponding to each of the images displayed as a list.

Note that, the operation device according to the present invention may be arranged so that the image data transmitting means selects a communication method in case of transmitting an image data set storing therein the process specifying information and selects another communication method in case of transmitting an image data set which does not store therein the process specifying information.

Further, a data structure according to the present invention is an image data structure of an image data set containing an image, includes process specifying information for specifying a process which should be carried out by an image data receiving device having received the image data set and for specifying at least a process carried out with respect to an image other than an image stored in the image data set or a process other than the process carried out with respect to the image, wherein the image included in the image data set is displayed in an operation device for operating the image data receiving device by transmitting the image data set to the image data receiving device and the image allows the process specified by the process specifying information to be identified.

According to the arrangement, it is possible to realize such effect that the process specified by the process specifying information can be carried out by causing the image data receiving device to receive the image data set.

Further, according to the arrangement, it is possible to allow the operation device to display the image which expresses the process specified by the process specifying information. This makes it possible to realize such effect that the user to operate the image data receiving device by using the operation device can confirm with his/her eyes the content of the process carried out by the image data receiving device by transmitting the image data set.

Note that, also an operation system including the image data receiving device and the operation device is included in the scope of the present invention.

That is, an operation system according to the present invention includes an image data receiving device and an operation device for operating the image data receiving device, wherein the operation device includes image data transmitting means for transmitting, to the image data receiving device, an image data set storing therein process specifying information for specifying a process which should be carried out by the image data receiving device, and the image data receiving device includes: image receiving means for receiving the image data set transmitted from the image data transmitting means; and control means for controlling the image data receiving device itself so as to carry out the process specified by the process specifying information stored in the image data set, wherein the process specifying information specifies at least a process carried out with respect to an image other than an image stored in the image data set or a process other than the process carried out with respect to the image.

Note that, it may be so arranged that the control means judges validity of a digital signature included in the image data set storing therein the process specifying information and controls the image data receiving device itself so as to carry out the process specified by the process specifying information only in case where the digital signature is valid.

According to the arrangement, it is possible to prevent an unexpected process specified by the process specifying information stored in the image data set from being carried out by the image data receiving device in case where the image data set is interpolated.

Further, it may be so arranged that the control means determines whether or not a digital signature is included in the image data set storing therein the process specifying information, and in case where the digital signature is not included, the control means controls the image data receiving device itself so as to carry out the process specified by the process specifying information only when a user operation for permitting the process is inputted.

According to the arrangement, it is possible to reduce a possibility that an unexpected process specified by process specifying information stored in an image data set having no digital signature may be carried out.

Further, it may be so arranged that the image data set further includes a digital signature for the process specifying information.

According to the arrangement, it is possible to enhance the reliability of the image data set in case where the image data receiving device using the image data set has a digital signature judging function. That is, it is possible to prevent an unexpected process specified by the process specifying information stored in the image data set from being carried out by the image data receiving device in case where the image data set is interpolated.

Note that, it is preferable to arrange the image data receiving device so as to further include display control means for causing a display section to display information indicating that the image data set is being received while the image data receiving means is receiving the image data set storing therein the process specifying information.

In case where the image data receiving device is arranged so as to receive the image data set transmitted with it superposed on a carrier wave having directivity, an operator of an operation device transmitting the carrier wave has to aim the transmission device toward the image data receiving means until transfer of the image data set is completed. Also in this case, the foregoing arrangement allows the operator of the transmission device to find out when the operator may stop aiming the transmission device toward the image data receiving means, so that the user does not feel excessive stress.

Further, it is preferable to arrange the image data receiving device so that the image data receiving means does not receive new image data while the process specified by the process specifying information is being carried out.

According to the arrangement, the image data receiving means does not newly receive an image data set while the process specified by the process specifying information is being carried out. Thus, a plurality of image data sets are not accumulated with them unprocessed in a memory which stores the image data sets received by the image data receiving means.

As described above, an image data receiving device according to the present invention includes: image data receiving means for receiving, from the outside, an image data set storing therein process specifying information for specifying a process which should be carried out by the image data receiving device itself; and control means for controlling the image data receiving device itself so as to immediately carry out the process, specified by the process specifying information stored in the received image data set, upon receiving the image data set.

Further, as described above, a control method according to the present invention is a method in which an image data receiving device controls the image data receiving device itself, said method comprising the steps of: receiving, from the outside, an image data set storing therein process specifying information for specifying a process which should be carried out by the image data receiving device itself; and controlling the image data receiving device itself so as to immediately carry out the process, specified by the process specifying information stored in the image data set, upon receiving the image data set.

While, as described above, an operation device according to the present invention, which operates an image data receiving device, includes image data transmitting means for transmitting, to the image data receiving device, an image data set storing therein process specifying information for specifying a process which should be carried out by the image data receiving device.

Further, as described above, an operation method according to the present invention is a method in which an operation device operates an image data receiving device, said method comprising the step of transmitting, to the image data receiving device, an image data set storing therein process specifying information for specifying a process which should be carried out by the image data receiving device.

Thus, it is possible to cause the image data receiving device to carry out a desired process by causing the operation device to transmit an image data set storing therein process specifying information to the image data receiving device. That is, the operation device is used as if a remote controller, thereby freely operate the image data receiving device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to (i) any device having an image data receiving function and (ii) an operation device for operating the device. Particularly, the present invention is favorably applicable to (I) an image data receiving device which can receive an image data set by a high speed infrared communication protocol such as IrSimple and (II) an operation device which can transmit the image data set by the same protocol.

The invention claimed is:

1. An image data receiving device, comprising:
   an image data receiving unit configured to receive, from the outside, an image data set indicative of process specifying information for specifying a process which should be carried out by the image data receiving device itself, said process specifying information being stored in an area for storing therein meta information; and
   a controlling unit configured to control the image data receiving device itself so as to carry out the process specified by the process specifying information stored in the image data set when reception of the image data set is completed, wherein
   the process specifying information specifies at least a process carried out with respect to an image displayed on a display section when the image data set is received, or a process other than the process carried out with respect to the image contained in the received image data set out of processes executable by the image data receiving device.

2. The image data receiving device as set forth in claim 1, further comprising:
   a data receiving unit which is different from the image data receiving unit and which is configured to receive a data set from other communication device, wherein
   the control is configured to control the data receiving unit so as to receive a data set specified by the process specifying information from a communication device specified by the process specifying information or a predetermined communication device.

3. The image data receiving device as set forth in claim 1, further comprising:
   a data transmitting unit configured to transmit data to other communication device, wherein
   the control unit is configured to control the data transmitting unit so as transmit a data set specified by the process specifying information to a communication device specified by the process specifying information or a predetermined communication device.

4. The image data receiving device as set forth in claim 1, wherein
   the control unit is configured to judge validity of a digital signature included in the image data set storing therein the process specifying information and controls the image data receiving device itself so as to carry out the process specified by the process specifying information only in case where the digital signature is valid.

5. The image data receiving device as set forth in claim 4, wherein data sets stored in the image data set as the meta information contain a data set which is not subjected to judgment of validity which judgment is carried out by the control units in accordance with the digital signature.

6. The image data receiving device as set forth in claim 1, wherein
   the control unit is configured to determine whether or not a digital signature is included in the image data set storing therein the process specifying information, and in case where the digital signature is not included, the control unit is configured to control the image data receiving device itself so as to carry out the process specified by the process specifying information only when a user operation for permitting the process is inputted.

7. The image data receiving device as set forth in claim 1, further comprising:
   a display control unit configured to cause a display section to display the image stored in the image data set having been received, in order to indicate that the process specified by the process specifying information is being carried out.

8. A non-transitory computer-readable storage medium, storing therein a program, causing a computer to operate as the image data receiving device as set forth in claim 1, wherein
   the program causes the computer to operate as the units included in the image data receiving device.

9. The image data receiving device as set forth in claim 1, wherein the process specifying information specifies a registration process in which viewing or recording is preset.

10. An operation device, which operates an image data receiving device, the operation device comprising:
    an obtaining unit configured to obtain, via a network, an image data set indicative of process specifying information for specifying a process which should be carried out by the image data receiving device, said image data set being provided with a digital signature, said process specifying information and said digital signature being stored in an area for storing therein meta information;
    a data rewriting unit configured to rewrite a data set, which is not restricted by the digital signature, out of data sets stored in the image data set as the meta information; and
    an image data transmitting unit configured to transmit the image data set to the image data receiving device, wherein
    the process specifying information specifies at least a process carried out with respect to an image other than an image stored in the image data set or a process other than the process carried out with respect to the image.

11. The operation device as set forth in claim 10, further comprising:
    an image data storage unit configured to store therein a plurality of image data sets each of which stores therein process specifying information for specifying a process to be carried out by the image data receiving device;
    an image display unit configured to cause a display section to display a list of images which are respectively included in the plurality of image data sets stored in the image data storage unit and each of which allows the process specified by the process specifying information stored in each of the image data sets to be identified; and
    an image data selecting unit configured to select an image data set, which should be transmitted to the image data receiving device, from the image data sets, stored in the image data storage unit, in accordance with a user operation received while the list is being displayed, wherein
    the image display unit is configured to display an image contained in each of the plurality of image data sets each storing therein the process specifying information, the image display unit is configured to display the image in such a manner that the image is capable of being identified from an image contained in an image data set storing therein no process specifying information, and
    the image data transmitting unit is configured to transmit the image data set, which has been selected by the image data selecting unit, to the image data receiving device.

12. A non-transitory computer-readable storage medium, storing therein a program, causing a computer to operate as the operation device as set forth in claim 10, wherein
    the program causes the computer to operate as the units included in the operation device.

13. An operation system comprising:
an image data receiving device; and
an operation device configured to operate the image data receiving device, wherein
the operation device includes:
an image data transmitting unit configured to transmit, to the image data receiving device, an image data set indicative of process specifying information for specifying a process which should be carried out by the image data receiving device, said process specifying information being stored in an area for storing therein meta information, and
the image data receiving device includes:
an image receiving unit configured to receive the image data set transmitted from the image data transmitting unit; and
a control unit configured to control the image data receiving device itself so as to carry out the process specified by the process specifying information stored in the image data set when reception of the image data set is completed, wherein
the process specifying information specifies at least a process carried out with respect to an image displayed on a display section of the image data receiving device when the image data receiving device receives the image data set or a process other than the process carried out with respect to the image contained in the image data set received by the image data receiving device out of processes executable by the image data receiving device.

14. A method in which an image data receiving device controls the image data receiving device itself, said method comprising:
receiving, from the outside, an image data set indicative of process specifying information for specifying a process which should be carried out by the image data receiving device itself, said process specifying information being stored in an area for storing therein meta information; and
controlling the image data receiving device itself so as to carry out the process specified by the process specifying information stored in the image data set when reception of the image data set is completed, wherein
the process specifying information specifies at least a process carried out with respect to an image displayed on a display section when the image data set is received, or a process other than the process carried out with respect to the image contained in the received image data set out of processes executable by the image data receiving device.

* * * * *